(12) United States Patent
Schaffer et al.

(10) Patent No.: US 11,465,144 B2
(45) Date of Patent: Oct. 11, 2022

(54) CARTRIDGE SYSTEMS, CAPACITIVE PUMPS AND MULTI-THROW VALVES AND PUMP-VALVE SYSTEMS AND APPLICATIONS OF SAME

(71) Applicant: VANDERBILT UNIVERSITY, Nashville, TN (US)

(72) Inventors: David K. Schaffer, Nashville, TN (US); Dmitry A. Markov, Nashville, TN (US); Ronald S. Reiserer, Nashville, TN (US); Lisa McCawley, Nashville, TN (US); Michael Geuy, Nashville, TN (US); Clayton M. Britt, Franklin, KY (US); John P. Wikswo, Brentwood, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 17/269,349

(22) PCT Filed: Aug. 20, 2019

(86) PCT No.: PCT/US2019/047307
§ 371 (c)(1),
(2) Date: Feb. 18, 2021

(87) PCT Pub. No.: WO2020/041342
PCT Pub. Date: Feb. 27, 2020

(65) Prior Publication Data
US 2021/0252510 A1    Aug. 19, 2021

Related U.S. Application Data

(60) Continuation-in-part of application No. 15/820,506, filed on Nov. 22, 2017, now Pat. No. 10,487,819,
(Continued)

(51) Int. Cl.
*B01L 3/00*      (2006.01)
*F04B 43/06*    (2006.01)
(Continued)

(52) U.S. Cl.
CPC ... *B01L 3/502715* (2013.01); *B01L 3/502738* (2013.01); *B01L 2300/123* (2013.01);
(Continued)

(58) Field of Classification Search
None
See application file for complete search history.

(56) References Cited

U.S. PATENT DOCUMENTS

| | | |
|---|---|---|
| 9,103,786 B2 | 8/2015 | Maltezos et al. |
| 2015/0238959 A1* | 8/2015 | Prakash ............ B01L 3/502715 506/7 |

(Continued)

FOREIGN PATENT DOCUMENTS

| | | |
|---|---|---|
| WO | 2010141921 A1 | 12/2010 |
| WO | 2013086505 A1 | 6/2013 |
| WO | 2016051272 A1 | 4/2016 |

OTHER PUBLICATIONS

Korean Intellectual Property Office (ISR/KR), "International Search Report for PCT/US2019/047307", Korea dated Feb. 26, 2020.

*Primary Examiner* — Matthew D Krcha
*Assistant Examiner* — Brittany I Fisher
(74) *Attorney, Agent, or Firm* — Locke Lord LLP; Tim Tingkang Xia, Esq.

(57) ABSTRACT

In one aspect of the invention, the fluidic device includes a fluidic chip includes a body having a first surface and an opposite, second surface, one or more channels formed in the body in fluidic communications with input ports and output ports for transferring one or more fluids between the input ports and the output ports, and a fluidic chip registra-
(Continued)

tion means formed on the first surface for aligning the fluidic chip with a support structure; and an actuator configured to engage with the one or more channels at the second surface of the body for selectively and individually transferring the one or more fluids through the one or more channels from at least one of the input ports to at least one of the output ports at desired flowrates.

20 Claims, 40 Drawing Sheets

Related U.S. Application Data which is a division of application No. 13/877,925, filed as application No. PCT/US2011/055432 on Oct. 7, 2011, now abandoned, said application No. PCT/US2019/047307 is a continuation-in-part of application No. 16/049,025, filed on Jul. 30, 2018, now Pat. No. 10,444,223, which is a continuation of application No. 14/363,074, filed as application No. PCT/US2012/068771 on Dec. 10, 2012, now Pat. No. 10,078,075, said application No. 16/049,025 is a continuation-in-part of application No. 16/012,900, filed on Jun. 20, 2018, now Pat. No. 10,577,574, which is a division of application No. 15/191,092, filed on Jun. 23, 2016, now Pat. No. 10,023,832, which is a continuation-in-part of application No. 13/877,925, filed on Jul. 16, 2013, now abandoned, and a continuation-in-part of application No. 14/363,074, filed on Jun. 5, 2014, now Pat. No. 10,078,075, and a continuation-in-part of application No. 14/636,300, filed as application No. PCT/US2013/071026 on Nov. 20, 2013, now Pat. No. 9,874,285, said application No. 15/191,092 is a continuation-in-part of application No. 14/651,174, filed as application No. PCT/US2013/071324 on Nov. 21, 2013, now Pat. No. 9,618,129, said application No. PCT/US2019/047307 is a continuation-in-part of application No. 16/511,379, filed on Jul. 15, 2019, now Pat. No. 10,464,064, which is a division of application No. 15/776,524, filed as application No. PCT/US2016/063586 on Nov. 23, 2016, now Pat. No. 10,532,354, which is a continuation-in-part of application No. 13/877,925, filed on Jul. 16, 2013, now abandoned, said application No. 15/191,092 is a continuation-in-part of application No. 14/363,074, filed on Jun. 5, 2014, now Pat. No. 10,078,075, and a continuation-in-part of application No. 14/646,300, filed on May 20, 2015, now Pat. No. 9,874,285, and a continuation-in-part of application No. 14/651,174, filed on Jun. 10, 2015, now Pat. No. 9,618,129, said application No. PCT/US2016/063586 is a continuation-in-part of application No. 15/191,092, filed on Jun. 23, 2016, now Pat. No. 10,023,832, said application No. 16/511,379 is a continuation-in-part of application No. PCT/US2018/034285, filed on May 29, 2019, which is a continuation-in-part of application No. 15/776,524, filed on May 16, 2018, now Pat. No. 10,532,354, and a continuation-in-part of application No. 16/012,900, filed on Jun. 20, 2018, now Pat. No. 10,577,574.

(60) Provisional application No. 62/719,868, filed on Aug. 20, 2018, provisional application No. 62/868,303, filed on Jun. 28, 2019, provisional application No. 61/390,982, filed on Oct. 7, 2010, provisional application No. 61/717,441, filed on Oct. 23, 2012, provisional application No. 61/697,204, filed on Sep. 5, 2012, provisional application No. 61/569,145, filed on Dec. 9, 2011, provisional application No. 62/183,571, filed on Jun. 23, 2015, provisional application No. 62/193,029, filed on Jul. 15, 2015, provisional application No. 62/276,047, filed on Jan. 7, 2016, provisional application No. 62/295,306, filed on Feb. 15, 2016, provisional application No. 61/729,149, filed on Nov. 21, 2012, provisional application No. 61/808,455, filed on Apr. 4, 2013, provisional application No. 61/822,081, filed on May 10, 2013, provisional application No. 62/259,327, filed on Nov. 24, 2015, provisional application No. 62/677,468, filed on May 29, 2018.

(51) Int. Cl.
*F04B 43/14* (2006.01)
*F04B 43/04* (2006.01)
*B01L 9/00* (2006.01)
*F04B 43/12* (2006.01)
*F16K 99/00* (2006.01)

(52) U.S. Cl.
CPC ....... *B01L 2400/0481* (2013.01); *F04B 43/06* (2013.01); *F04B 43/14* (2013.01); *F16K 99/0057* (2013.01); *F16K 2099/0084* (2013.01)

(56) References Cited

U.S. PATENT DOCUMENTS

2016/0158758 A1    6/2016  Johnson et al.
2017/0152081 A1*   6/2017  Crivelli ............... B65D 51/002

* cited by examiner

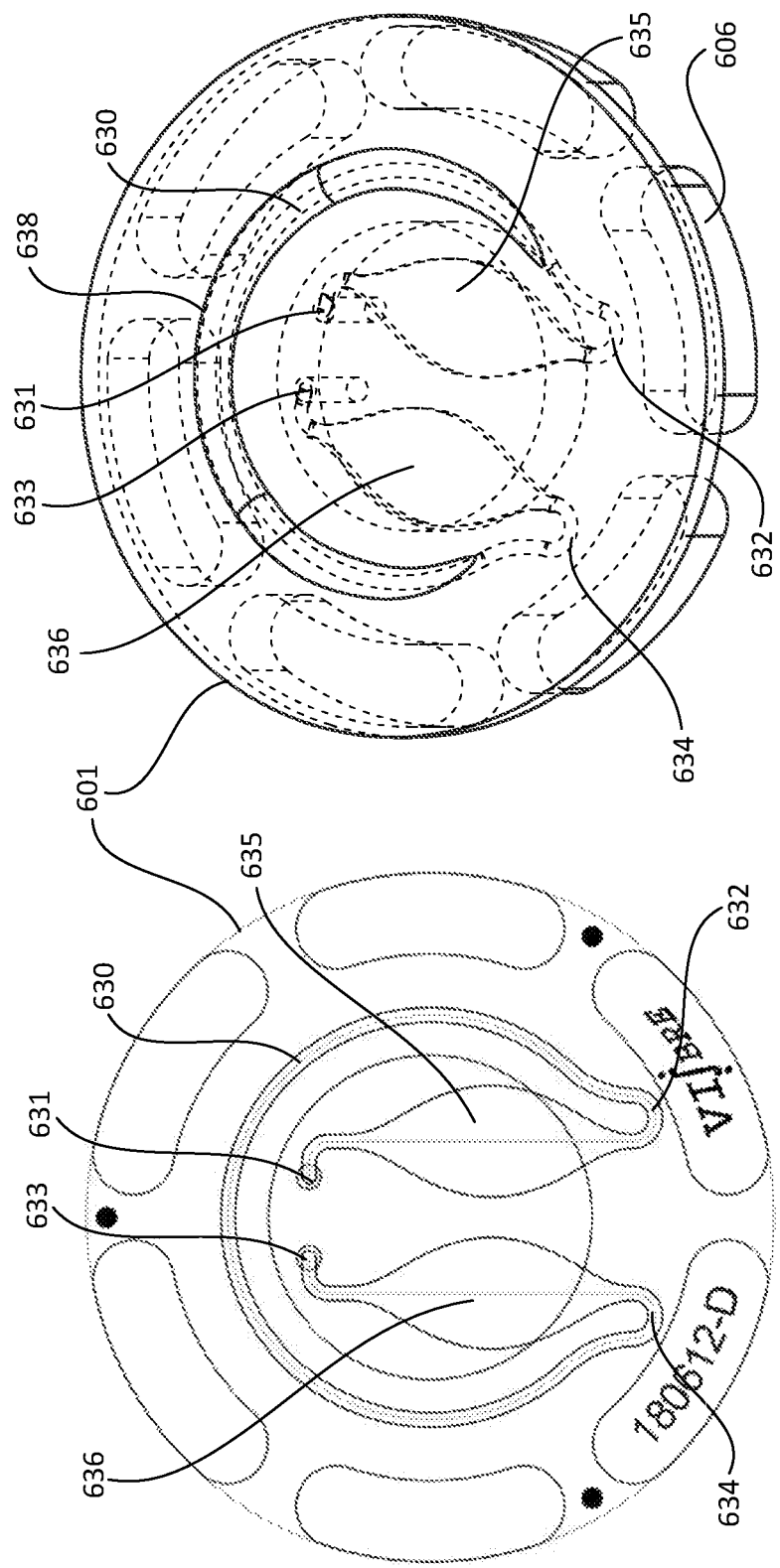

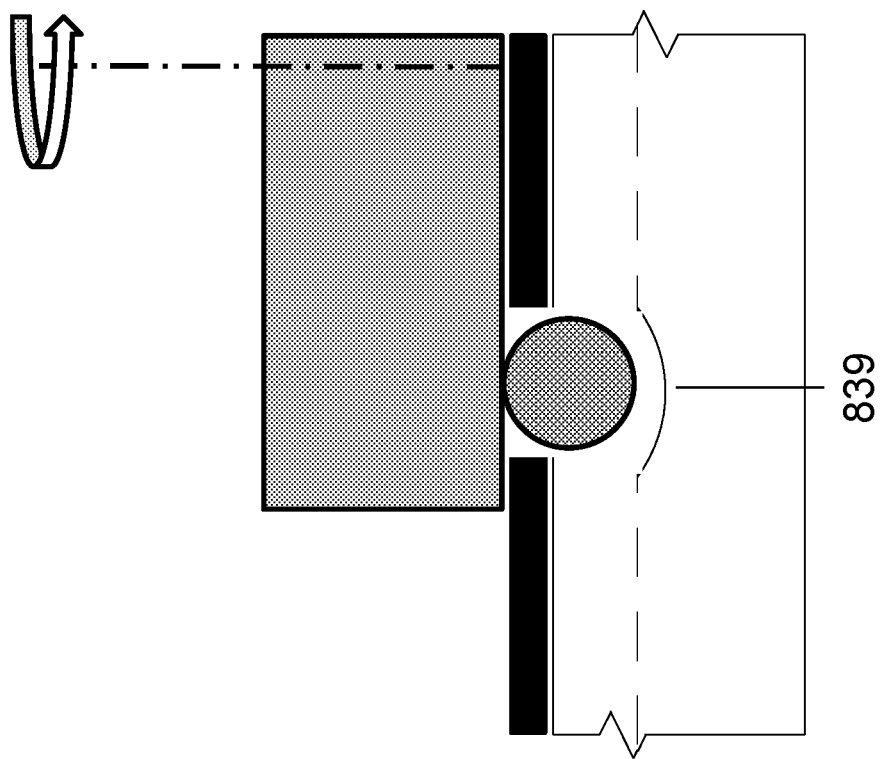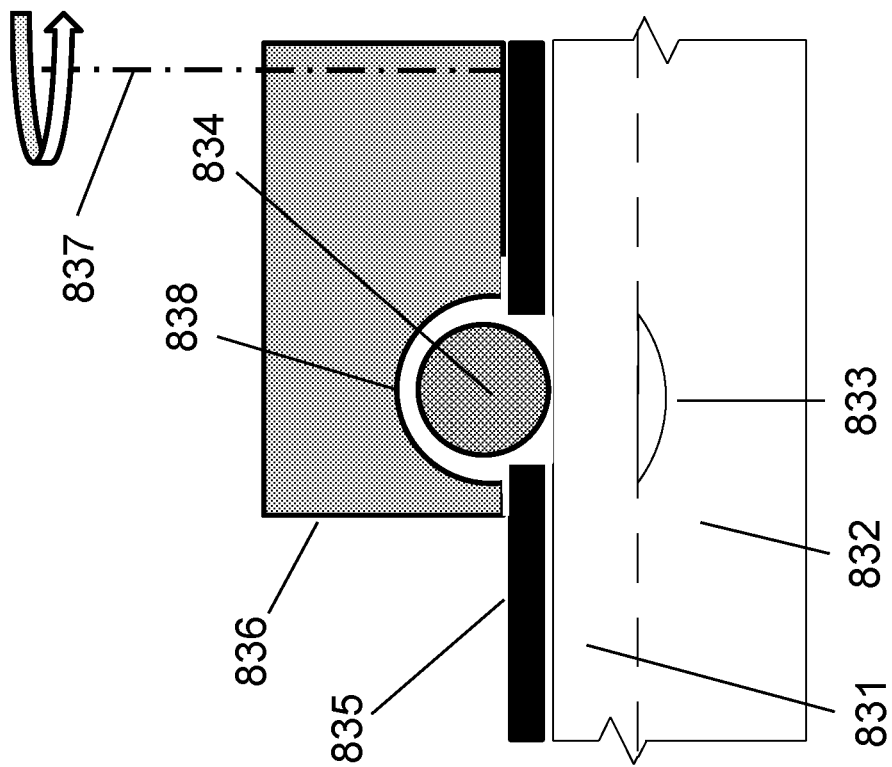
FIG. 8C
FIG. 8D

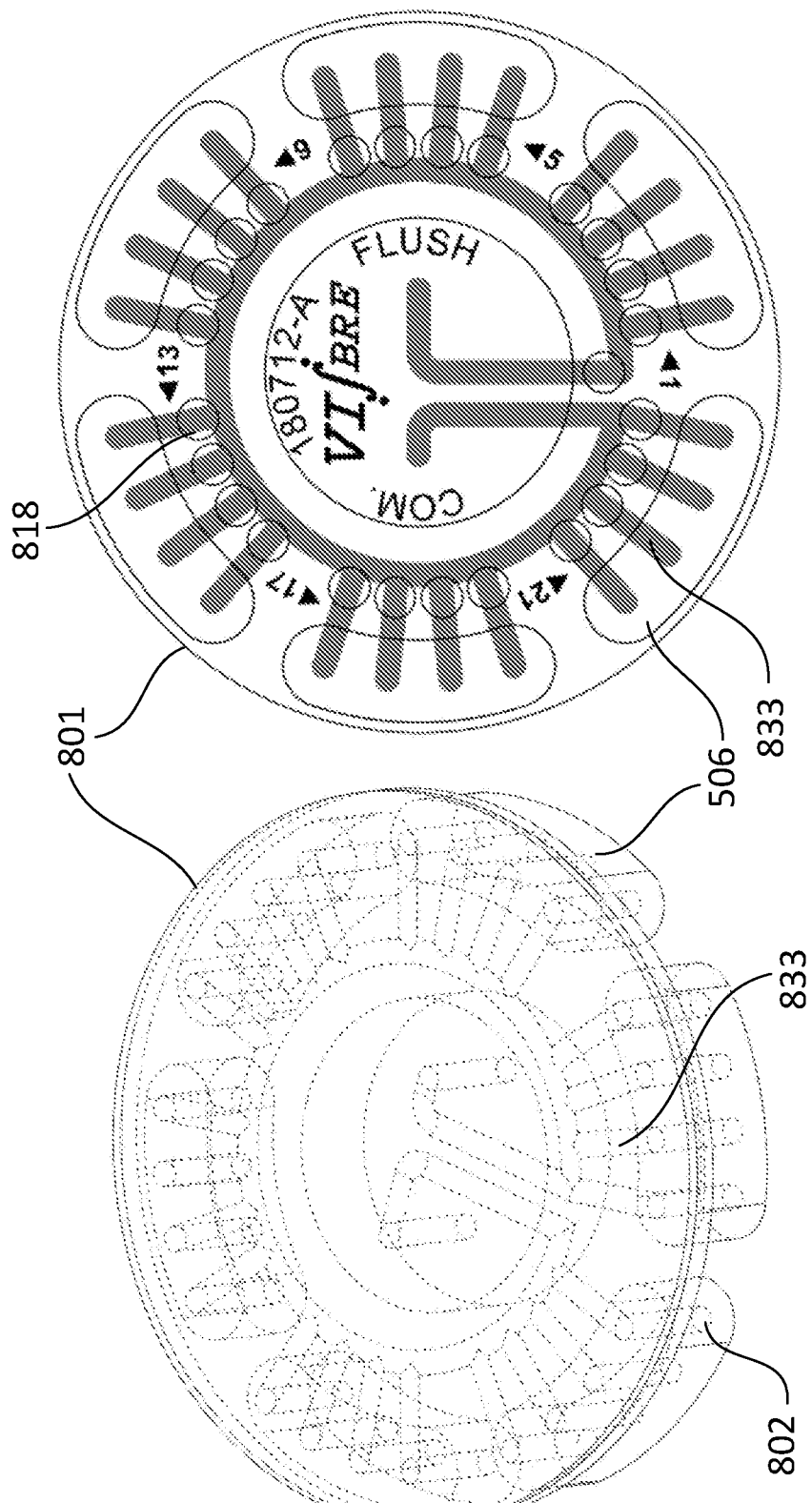

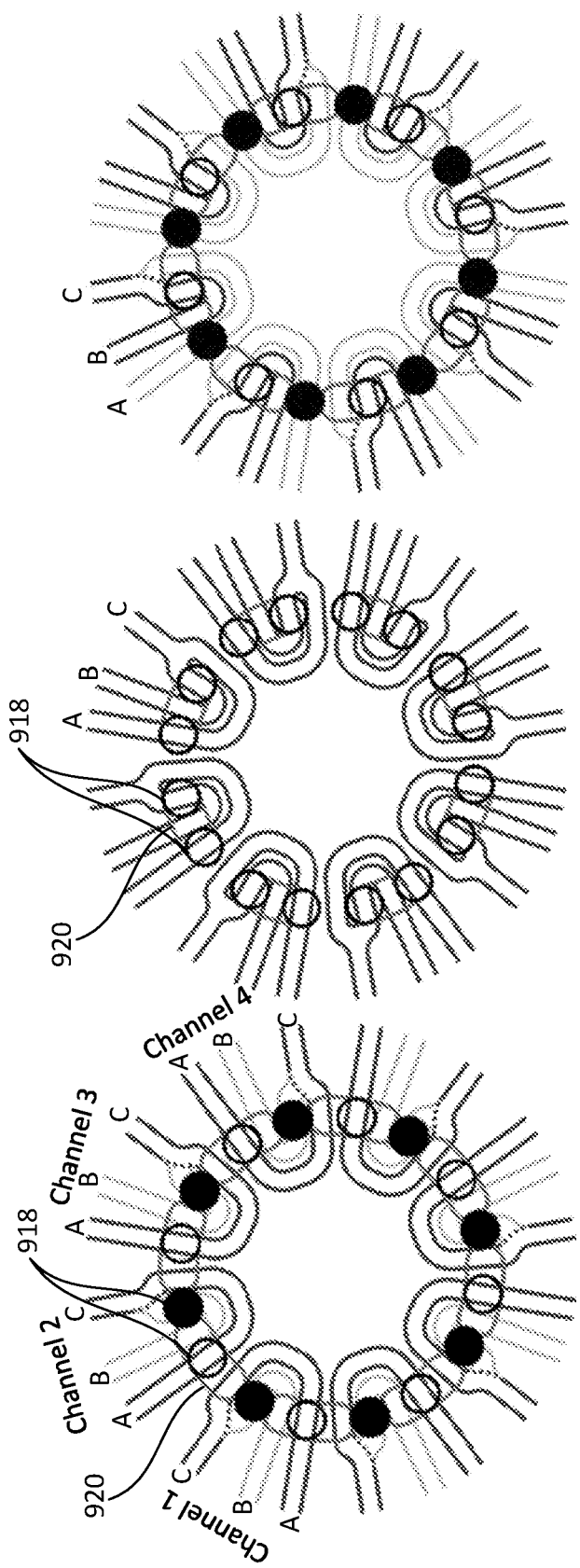

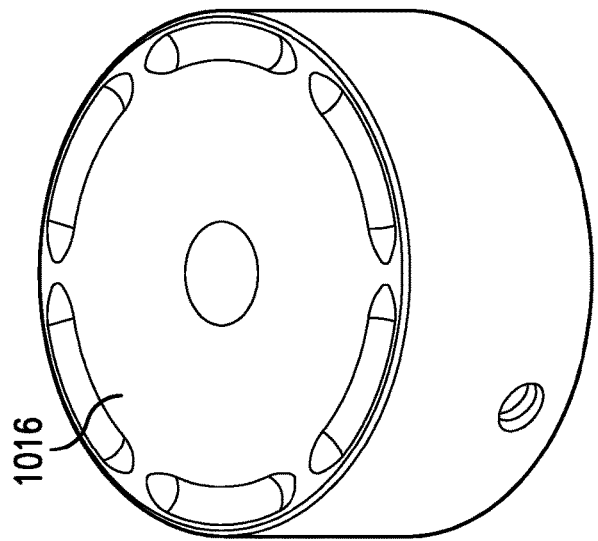
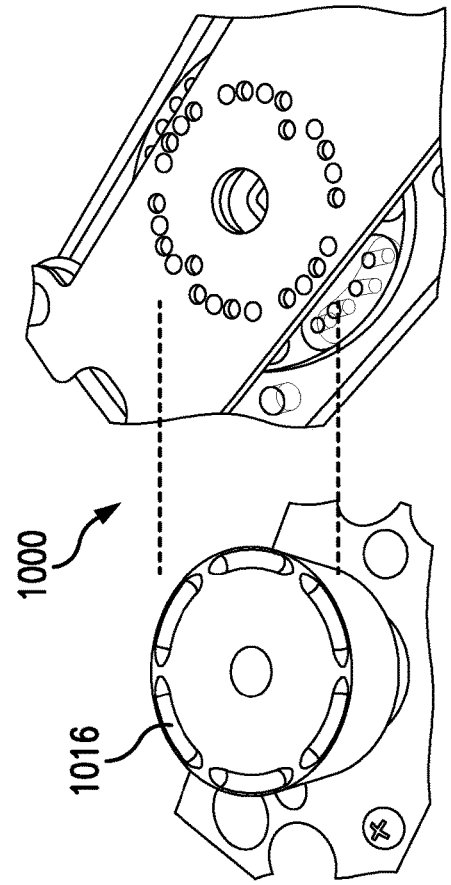
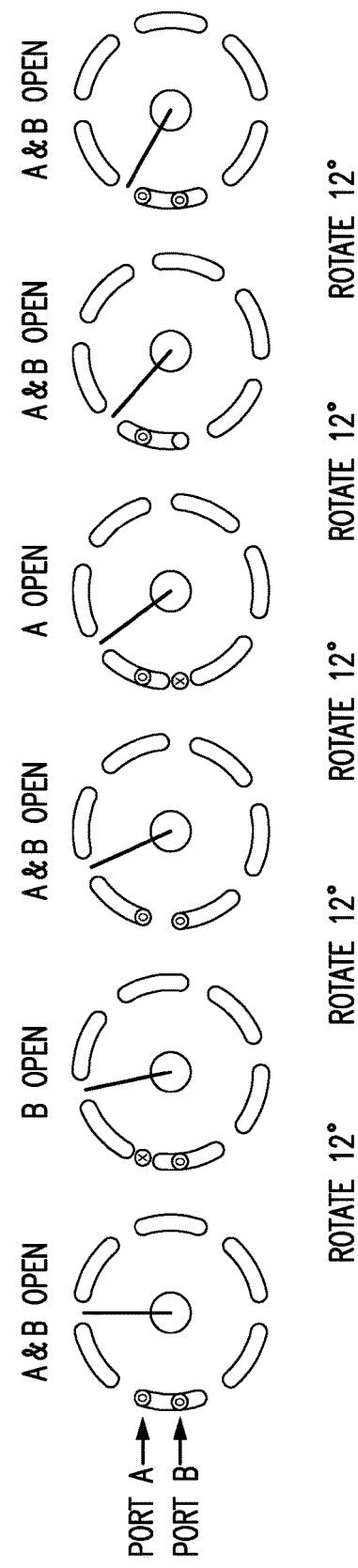
FIG. 10A
FIG. 10B
FIG. 10C

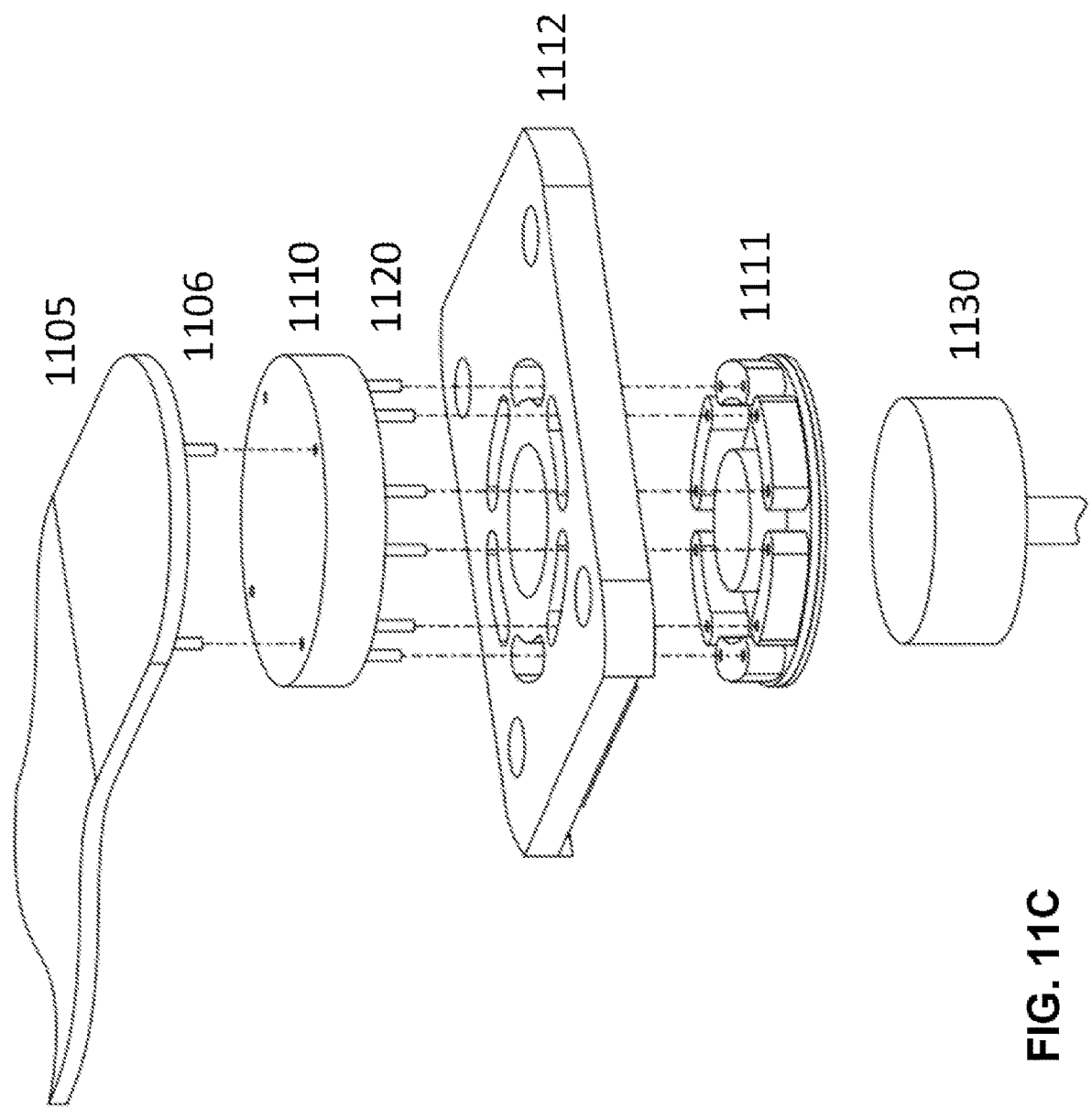

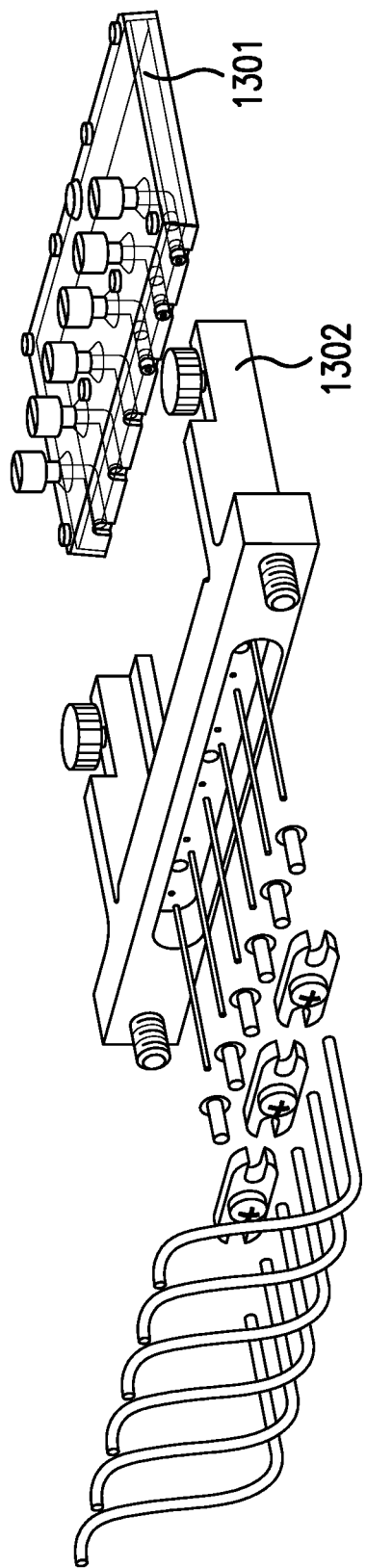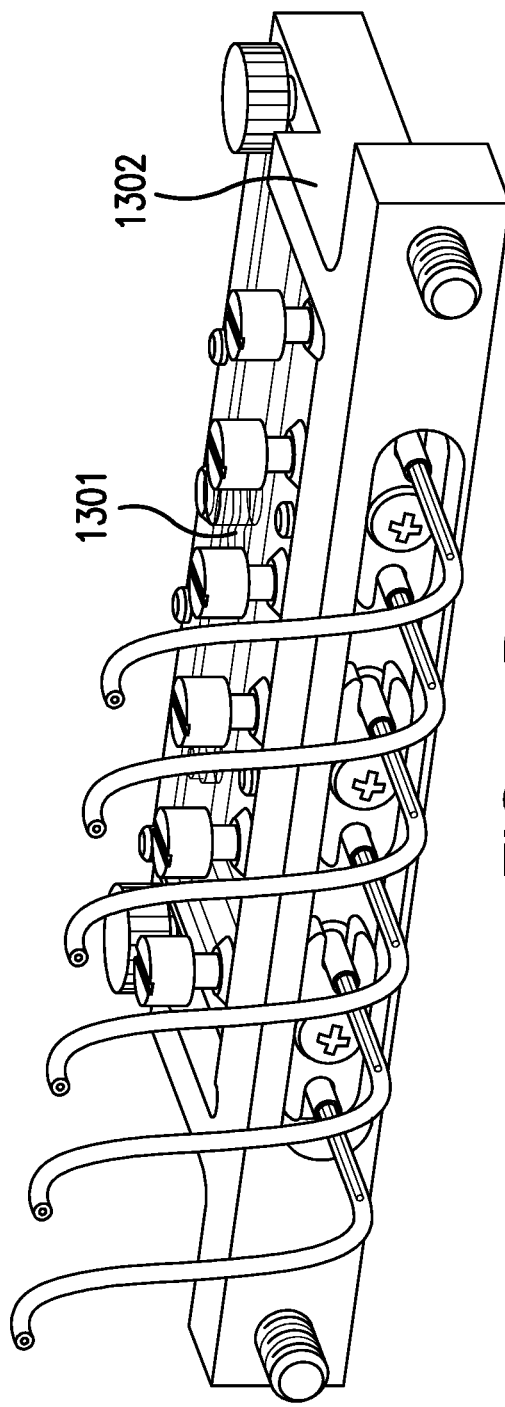
FIG. 13C
FIG. 13D

CARTRIDGE SYSTEMS, CAPACITIVE PUMPS AND MULTI-THROW VALVES AND PUMP-VALVE SYSTEMS AND APPLICATIONS OF SAME

CROSS-REFERENCE TO RELATED PATENT APPLICATIONS

This application claims priority to and the benefit of U.S. Provisional Patent Application Ser. Nos. 62/719,868, and 62/868,303, filed Aug. 20, 2018 and Jun. 28, 2019, respectively.

This application is also a continuation-in-part application of U.S. patent application Ser. No. 15/820,506, filed Nov. 22, 2017, now allowed, which is a divisional application of U.S. patent application Ser. No. 13/877,925, filed Jul. 16, 2013, now abandoned, which is a national stage entry of PCT Application Serial No. PCT/US2011/055432, filed Oct. 7, 2011, which claims priority to and the benefit of, U.S. Provisional Patent Application Ser. No. 61/390,982, filed Oct. 7, 2010.

This application is also a continuation-in-part application of U.S. patent application Ser. No. 16/049,025, filed Jul. 30, 2018, which is a continuation application of U.S. patent application Ser. No. 14/363,074, filed Jun. 5, 2014, now U.S. Pat. No. 10,078,075, is a national stage entry of PCT Application Serial No. PCT/US2012/068771, filed Dec. 10, 2012, which claims priority to and the benefit of U.S. Provisional Patent Application Ser. Nos. 61/569,145, 61/697,204 and 61/717,441, filed Dec. 9, 2011, Sep. 5, 2012 and Oct. 23, 2012, respectively.

This application is also a continuation-in-part application of U.S. patent application Ser. No. 16/012,900, filed Jun. 20, 2018, which is a divisional application of U.S. patent application Ser. No. 15/191,092 (the '092 application), filed Jun. 23, 2016, now U.S. Pat. No. 10,023,832, which claims priority to and the benefit of U.S. Provisional Patent Application Ser. Nos. 62/183,571, 62/193,029, 62/276,047 and 62/295,306, filed Jun. 23, 2015, Jul. 15, 2015, Jan. 7, 2016 and Feb. 15, 2016, respectively. The '092 application is also a continuation-in-part application of U.S. patent application Ser. Nos. 13/877,925, 14/363,074, 14/646,300 (the '300 application) and Ser. No. 14/651,174 (the '174 application), filed Jul. 16, 2013, Jun. 5, 2014, May 20, 2015 and Jun. 10, 2015, respectively. The '300 application, now U.S. Pat. No. 9,874,285, is a national stage entry of PCT Application Serial No. PCT/US2013/071026, filed Nov. 20, 2013, which claims priority to and the benefit of U.S. Provisional Patent Application Ser. Nos. 61/729,149, 61/808,455, and 61/822,081, filed Nov. 21, 2012, Apr. 4, 2013 and May 10, 2013, respectively. The '174 application, now U.S. Pat. No. 9,618,129, is a national stage entry of PCT Application Serial No. PCT/US2013/071324, filed Nov. 21, 2013, which claims priority to and the benefit of U.S. Provisional Patent Application Ser. Nos. 61/808,455 and 61/822,081, filed Apr. 4, 2013 and May 10, 2013, respectively.

This application is also a continuation-in-part application of U.S. patent application Ser. No. 16/511,379, filed Jul. 15, 2019, which is a divisional application of U.S. patent application Ser. No. 15/776,524, filed May 16, 2018, now allowed, which is a national stage entry of PCT Application Serial No. PCT/US2016/063586 (the '586 application), filed Nov. 23, 2016, which claims priority to and the benefit of, U.S. Provisional Patent Application Ser. No. 62/259,327, filed Nov. 24, 2015. The '586 application is also a continuation-in-part application of U.S. patent application Ser. Nos. 13/877,925, 14/363,074, 14/646,300, 14/651,174 and 15/191,092, filed Jul. 16, 2013, Jun. 5, 2014, May 20, 2015, Jun. 10, 2015 and Jun. 23, 2016, respectively.

This application is also a continuation-in-part application of PCT Patent Application Serial No. PCT/US2019/034285 (the '285 application), filed May 29, 2019, which claims priority to and the benefit of U.S. Provisional Patent Application Ser. No. 62/677,468, filed May 29, 2018. The '285 application is also a continuation-in-part application of U.S. patent application Ser. Nos. 15/776,524 and 16/012,900, filed May 16, 2018 and Jun. 20, 2018, respectively.

Each of the above-identified applications is incorporated herein by reference in its entirety.

Some references, which may include patents, patent applications, and various publications, are cited and discussed in the description of the invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

STATEMENT AS TO RIGHTS UNDER FEDERALLY-SPONSORED RESEARCH

This invention was made with government support under Grant Nos. 5UG3TR002097-02, U01CA202229 and HHSN271201700044C awarded by the National Institutes of Health, Grant No. 83573601 awarded by the U. S. Environmental Protection Agency, Grant No. 2017-17081500003 awarded by the Intelligence Advanced Research Projects Activity, and Grant No. CBMXCEL-XL1-2-001 awarded by the Defense Threat Reduction Agency through Subcontract 468746 by Los Alamos National Laboratory (LANL). The government has certain rights in the invention.

FIELD OF THE INVENTION

The invention relates generally to microfluidic systems, and more particularly to cartridge systems, capacitive pumps, multi-throw valves, and pump-valve systems and applications of the same.

BACKGROUND INFORMATION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Microfluidic systems with pumps and control fluidic flows in organ-on-chip bioreactors and instruments such as perfusion controllers, microclinical analyzers, and microformulators have drawn great attention of researchers over the past years. Demonstration of these devices has been accomplished using standard soft-lithographic techniques. It is noted that there are still a multitude of issues, such as problems with alignment of pump and valve fluidics and their actuators, and connections thereof, stability, portability and adaptability of fluidic systems, manufacturability and sterilizability, and so on, remained unresolved.

Therefore, a heretofore unaddressed need exists in the art to address the aforementioned deficiencies and inadequacies.

SUMMARY OF THE INVENTION

In one aspect of the invention, the fluidic device comprises a fluidic chip including a body having a first surface and an opposite, second surface, one or more channels formed in the body in fluidic communications with input ports and output ports for transferring one or more fluids between the input ports and the output ports, and a fluidic chip registration means formed on the first surface for aligning the fluidic chip with a support structure. The fluidic device also comprises an actuator configured to engage with the one or more channels at the second surface of the body for selectively and individually controlling the transfer of the one or more fluids through the one or more channels from at least one of the input ports to at least one of the output ports at desired flowrates.

In one embodiment, the fluidic device further comprises a motor to operably drive the actuator to be activated or deactivated.

In one embodiment, the body of the fluidic chip comprises a first layer and a second layer, each layer having a first surface and an opposite, second surface, wherein the one or more channels are grooved on a first surface of the second layer, a second surface of the first layer is planar and bonded to the first surface of the second layer to seal an open side of the one or more channels in the first surface of the second layer, and the second layer is elastomeric, such that compression of the actuator on a second surface of the second layer causes at least one of the one or more channels in the second layer to be occluded, wherein the first and second surfaces of the body are coincident with the first surface of the first layer and the second surface of the second layer, respectively.

In one embodiment, the fluidic chip registration means is configured such that the fluid chip is allowed for multiple fluid chip orientations while maintaining automatic and precise mechanical alignment to the support structure.

In one embodiment, the fluidic chip registration means comprises at least one protrusion protruded from the first surface of the body.

In one embodiment, the least one protrusion is configured to fluidically communicate the one or more channels with interface ports that allow connection of external tubing to the fluidic chip through a base plate.

In one embodiment, the fluid chip is configured such that one or more plug-in accessories are addable in or removable from the fluid chip. In one embodiment, the one or more plug-in accessories comprise capacitors, adjustable fluidic resistors, electrical or electrochemical sensors, photosensors for detecting or tracking bubbles for either bubble detection or for determining flow rates, flowmeters, manifolds, overpressure relief (blowoff) valves, check valves, bubble traps, injection ports, bioreactors, or a combination of them.

In one embodiment, the fluidic chip is a circular throughplate device in a radial channel configuration capable of accepting fluidic functionality expansion flow-through chips containing adjustable fluidic resistance modules for one or more pumping channels, individual channel pulsation dampening means including fluidic capacitors, pressure equalizing fluidic network for two or more main pumping channels including fluidic shunt capacitors, and/or simultaneous multichannel flow measuring/calibrating module.

In one embodiment, the fluidic device is a rotary planar peristaltic micropump (RPPM).

In one embodiment, the actuator comprises a plurality of rolling members and a driving member configured such that when the driving member rotates, the plurality of rolling members rolls along the one or more channels so as to selectively and individually transfer the one or more fluids through the one or more channels at the desired flowrates.

In one embodiment, the fluidic device is a capacitive pump, wherein the one or more channels comprise one channel having a middle, circumferential portion with two end portions, each end portion being coupled to a port through a chamber or a bubble trap, wherein the chamber or bubble trap operably function as capacitor to reduce flow and pressure transients associated with rolling members of the actuator rolling on or off said channel.

In one embodiment, the chamber has a volume that plays a role in reduction of the flow and pressure transients. In one embodiment, the two chambers are identical to or different from one another, and are in any one of geometric shapes.

In one embodiment, the capacitor is a shunt capacitor, or a bubble trap capacitor.

In one embodiment, the fluidic chip further comprises a ridge formed on the second surface of the body in relation to said channel for allowing the actuator to gradually engage and disengage with said channel and a working fluid to prevent backflow and reducing pulsatility.

In one embodiment, the ridge has ramps with angles for a start and an end of the ramp formed at each end of the ridge for eliminating backflow and stopping flow as the rolling members enter and leave the ridge.

In one embodiment, the fluidic device is a rotary planar valve (RPV) comprising a multi-channel valve, a manifold valve, or a multi-throw valve.

In one embodiment, each of the one or more channels comprises one or more sub-channels connected to one or more input ports and one or more outputs, wherein all the sub-channels of the one or more channels are spaced-apart in the radial channel configuration.

In one embodiment, the actuator comprises a cage defining a plurality of spaced-apart openings; a plurality of pop-up members, each pop-up member retained in a respective opening of the cage and being vertically movable therein; and a drivehead having a surface and at least one recess formed on the surface, wherein the cage is placed on the second surface of the fluidic chip to constrain each pop-up member in a position immediately on a respective sub-channel, such that when a pop-up member is pressed into the second surface of the fluidic chip, a sub-channel that is immediately beneath the pop-up member is compressed, otherwise, said sub-channel is uncompressed; and wherein the drivehead is rotatably engaged with the cage such that as the drivehead rotates at a position, any selected pop-up members positioned in the at least one recess arise to create open sub-channels corresponding to the selected pop-up members, thereby selectively unoccluding or occluding fluid flows through desired sub-channels.

In one embodiment, the RPV is a normally closed RPV.

In one embodiment, the at least one recess comprises a plurality of tangential ovoid recesses.

In one embodiment, the plurality of tangential ovoid recesses is configured to ensure that there is no "off" position for the plurality of pop-up members while switching from one input port to another input port where both input sub-channels connected to said two input ports are closed at the same time.

In one embodiment, the RPV is a make-before-break valve.

In one embodiment, the fluidic chip and the actuator are configured such that there are actuated balls that open and close channels upon which they reside, unactuated balls underneath which channels are always closed, and absent balls underneath which channels are always open, thereby partitioning the valve into a plurality of independent fluid-containing regions separated by the unactuated balls, each region having its own inlet/outlet ports, a group of channels, and actuated balls such that by a selection of the actuated balls, flows to or from the ports within said region are dynamically controllable, which allowing a plurality of isolated fluidic circuits to exist on a single chip.

In another aspect of the invention, a cartridge of a fluidic device includes the fluidic device as disclosed above; a support structure having segmental openings; a motor plate; standoff plates; and an enclosure hood. As assembled, an assembly of the actuator slides over a shaft of the motor and is fixed in place with a fastening means, the motor is fastened to the motor plate, the standoff plates are fastened to the enclosure hood through the motor plate, the second surface of the fluidic chip faces the actuator, the fluidic chip registration means on the first surface of the fluidic chip is received in the segmental openings of the support structure, and the support structure is in turn attached securely to the standoff plates In one embodiment, registration of the fluidic chip registration means to the segmental openings in fluidic chip support plate prevents rotational and translational movement of the fluidic chip relative to the cartridge.

In one embodiment, the cartridge further comprises windows for visual or physical accessing to the actuator and the fluidic chip, wherein the windows are removably attached to the fluidic support structure and the standoff plates such that debris ingress is prevented.

In one embodiment, the cartridge further comprises gaskets for part-to-part sealing so as to prevent moisture and/or air from entering into the cartridge.

In one embodiment, the enclosure hood has an electrical feedthrough for allowing electrical communication between the fluidic device and external electronics.

In one embodiment, the electrical feedthrough is in the form of a DIN connector or other connector, and is capped to prevent dust or moisture from entering into the cartridge.

In one embodiment, the fluidic device further comprises an encoder and control electronics disposed within the enclosure hood.

In one embodiment, the cartridge further comprises a retainer configured to clamp the fluidic chip to the support structure for maintaining the position and therefore the alignment of the fluidic chip relative to the support structure in case counterforce is applied during handling or intubation of the fluidic chip, wherein such securement also promotes stable compression characteristics between the actuator and the fluidic chip by ensuring contact between the fluidic chip and the support structure and planarity of the fluidic chip.

In one embodiment, the cartridge is fluidically connectable to another cartridge or fluidic device through a fluidic interface connector coupled to the fluidic chip registration means registered in the support structure.

In yet another aspect of the invention, a pump-valve (P-V) system includes a plurality of cartridges disposed on a platform, each cartridge is disclosed above, wherein the plurality of cartridges comprises pump cartridges, valve cartridges, or a combination of them; and vials disposed on a platform, for inputting and/outputting one or more fluids.

In one embodiment, the P-V system further has one or more fluidic interface connectors coupled to the fluidic chip registration means registered in the support structures of cartridges for fluidically connecting one cartridge to another cartridge. In one embodiment, each of the one or more fluidic interface connectors comprises bioreactor connector tubes, valve connector tubes, pump tubes, and reservoir tubes, configured to be operably insertable into corresponding ports on each of bioreactors, valves, pumps, and reservoirs, respectively, for dynamically controlling flows of one or more fluids through the pumps and the valves into and/or out of the bioreactors.

In one embodiment, the P-V system further has comprising a neurovascular unit (NVU) bioreactor disposed on the platform and coupled to the plurality of cartridges and the vials, and/or a polycarbonate well plate disposed on the platform.

In one embodiment, the plurality of cartridges comprises two pump cartridges, and the P-V system is a perfusion controller.

In one embodiment, the plurality of cartridges comprises six cartridges, and the P-V system is a 24-channel microformulator system.

In one embodiment, the plurality of cartridges comprises four sets of cartridges, each set having two valve cartridges and one pump cartridge, and the P-V system is a twenty-four channel transwell microformulator system.

In one embodiment, the plurality of cartridges comprises six valve cartridges and four pump cartridges, and the P-V system is pharmacokinetic sampling module.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIG. 6A-6B show respectively plan and perspective views of the circular, through-plate implementation of a capacitive pump according to one embodiment of the invention.

FIG. 8C shows a cross-sectional view showing an actuator ball within a recess in the actuator, with the corresponding channel open in the relaxed position, according to one embodiment of the invention.

FIG. 8D shows a cross-sectional view showing the actuator and ball compressing the channel and pinching it closed, according to one embodiment of the invention.

FIG. 8E is a perspective view of a circular through-plate 25-channel valve, showing the actuated surface, working channels, registration/alignment protrusions, and interface ports, according to one embodiment of the invention.

FIG. 8F shows a plan view of a 25-port valve with identifying markings and actuator ball locations, according to one embodiment of the invention.

FIG. 9B shows the concept of a two-by-eight open-before-close RPV with the A channels open and connected to the output C while the B channels are closed according to one embodiment of the invention.

FIG. 9C shows the concept of a two-by-eight open-before-close RPV with both the A and B channels open and connected to the output C according to one embodiment of the invention.

FIG. 9D shows the concept of a two-by-eight open-before-close RPV with the B channels open and connected to the output C while the A channels are closed according to one embodiment of the invention.

FIGS. 10A-10D show make-before-break vales and their operation states according to embodiments of the invention.

FIG. 11C shows a variety of accessories that can be mounted on a circular through-plate fluidic chip in the closed motor cartridge, according to one embodiment of the invention.

FIG. 13C shows an exploded view of the chip receptacle according to one embodiment of the invention FIG. 13D shows the assembled chip receptacle according to one embodiment of the invention.

FIG. 14E-4F show pharmacokinetic sampling modules—50-port valve, according to one embodiment of the invention.

DETAILED DESCRIPTION OF THE INVENTION

Figure 1:
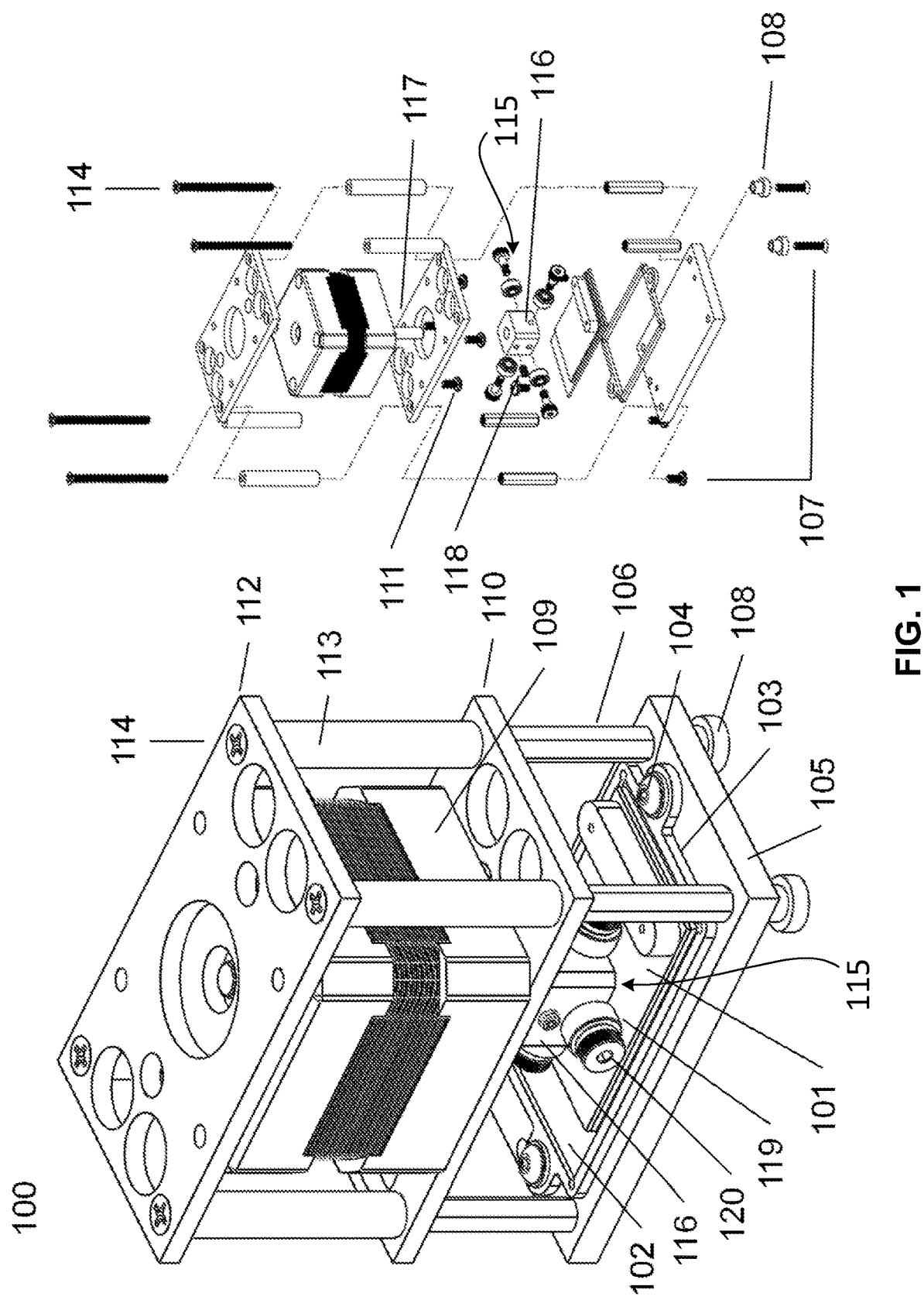
FIG. 1 shows perspective and exploded views of an existing, open-frame rotary planar peristaltic micropump (RPPM) cartridge, which contains the motor, the pump actuator, and the fluidics.

The invention will now be described more fully hereinafter with reference to the accompanying drawings, in which exemplary embodiments of the invention are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the invention.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

One of the objectives of this invention is to refine, extend, and/or integrate the devices and systems disclosed in our U.S. application Ser. No. 14/651,174, entitled "Normally Closed Microvalve and Applications of the Same", now U.S. Pat. No. 9,618,129; U.S. application Ser. No. 14/362,841, entitled "Integrated Human Organ-on-Chip Microphysiological Systems", now U.S. Pat. No. 9,725,687; U.S. application Ser. No. 14/646,300, entitled "Organ on Chip Integration and Applications of the Same", now U.S. Pat. No. 9,874,285; U.S. application Ser. No. 15/191,092, entitled "Interconnections of Multiple Perfused Engineered Tissue Constructs and Microbioreactors, Multi-Microformulators and Applications of the Same", now U.S. Pat. No. 10,023,832; U.S. application Ser. No. 13/183,287, entitled "Metering Rotary Nanopump, Method of Fabricating Same, and Applications of Same", now abandoned; U.S. application Ser. No. 15/820,506, entitled "Peristaltic Micropump and Related Systems and Methods", now pending; and PCT Application Serial No. PCT/US2019/034285, entitled "Multicompartment Microfluidic Bioreactors, Cylindrical Rotary Valves and Applications of Same", now pending. Each of these applications is incorporated herein by reference in its entirety.

In one aspect, this invention includes a rotary planar peristaltic micropump with variable height ridges to avoid the stop-flow and reverse flow associated with existing peristaltic micropumps, pumps with integrated fluidic capacitors to reduce the oscillations associated with peristaltic pumps, and rotary planar microfluidic valves. The problems with alignment of pump and valve fluidics and their rotary actuators are eliminated with circular fluidic chips with protrusions that automatically align the chip with the fluidic chip support plate of the motor cartridge and enable use of through-plate connections of external tubing to the network of microfluidic channels that comprise the pumps and valves within the microfluidic chip.

This invention can be incorporated into an integrated housing that simplifies assembly, enables wipe sterilization of all exposed surfaces, and provides electromagnetic and electrostatic shielding of the motor, encoder, and motor control electronics. The pumps can also be equipped with an integrated, adjustable pressure release valve that limits the pressure delivered by the pump should the output of the pump become blocked, for example by debris or a closed valve, or a malfunctioning fluidic connector. When such a pump is used in conjunction with a multiport rotary planar valve, it is then possible for a single pump and valve to pressurize multiple reservoirs that then can perfuse multiple organ chips, wells in well plates, or other bio-objects (experimental chambers). The circular fluidics chip design allows connection to pumps and valves using removable, ribbon-fluidic connectors and/or additional functional modules such as flow capacitors or resistors. The concept of fluidic ribbon connectors can be extended to create peristaltic pumps that can simultaneously pump multiple lines of fluid in the forward or reverse directions.

Finally, the precise fluidic control afforded by these pumps and valves and the computerized microcontroller that operates them can be used in a closed-loop manner with an imaging or other optical time-of-flight detector to track the speed by which a bubble that is intentionally introduced into the fluidic moves along a selected length of tubing or channel so as to calibrate flowrate of the pump and valve combination. One embodiment of this method utilizes a pair of optical bubble detectors to detect a gas bubble that is purposely introduced through one of the valve positions. In this method, a single bubble is introduced and pumped to the location of the first of a pair of an optically coupled light-emitting diode (LED) and a photodetector, termed the bubble detector that can determine the arrival time at the first detector. The difference in the index of refraction of the bubble and the water within the tube affects the focusing of the light from the LED so that the photodetector can readily identify the arrival or departure of the leading or trailing edge of the bubble. Once detected by the first bubble detector, the bubble is then allowed to progress to the second bubble detector, so as to allow determination of the time interval between the appearance of the leading or trailing edge of the bubble, or both, at each of the two bubble detectors. Given that the distance between the detectors is known and fixed, the time difference enables immediate, real-time calibration of the flow velocity. The bubble can be pumped back and forth at multiple pump rates and with various valve combinations in order to characterize the systems pumping performance and provide calibration data. The bubble-tracking flow meter with its two detectors can simply clip onto the outside of a length of tubing connected to the pump, or can be incorporated into an accessory that plugs directly into the pump. In contrast, a typical thermal-dilution time of flight flow meter costs much more than two photodiodes and two LEDs, and the tubing must be interrupted and attached to the thermal-dilution flow meter. In addition, the nature of the fluid being pumped affects the calibration of the sensor. The automated pump and valve control offered by this invention allows automated insertion of the bubble through an appropriate valve port, measurement of the velocity of each bubble as a function of pump speed for each of the desired pump speeds and valve settings, and then automated ejection of the bubble by reverse flow through the valve by which the bubble was introduced. In another embodiment, a sensor array (or camera) incorporated into the accessory flow meter is used to determine time of flight of the bubble.

All of these modular devices can be combined into multi-functional microfluidic systems such as perfusion controllers, microclinical analyzers, microformulators and other fluidic control and analysis systems.

In our previous patents and patent applications, we described a modular approach to control and sensing of organs-on-chips using rotary planar peristaltic micropumps (RPPMs) and rotary planar valves (RPVs). These pumps and valves are implemented in a fluidic cartridge that contains the mechanical, electrical, and microfluidic components necessary for operation of the pumps or valve. The advantage of this approach is that more complex systems can be quickly configured from different modules created by one or more cartridge. Furthermore, changes to a particular cartridge component can be implemented quickly and easily propagated to multiple different systems. We now describe the design and fabrication of cartridges that we have used prior to the present invention.

FIG. 1 shows a pump cartridge 100 as described in our previous patents and patent applications. Pump fluidic chip 101 is made of a silicone elastomer or other elastomeric material and bonded to or placed on a glass slide 102 that is contained within alignment frame 103 which is attached with screws 104 to fluidic chip support plate 105 made of polycarbonate or other material. Fluidic chip support plate 105 is attached to standoffs 106 with machine screws 107. Nubbins 108 that mate with keyhole recesses (not shown) may be secured to fluidic chip support plate 105 to allow assembly 100 to be affixed to a substructure (not shown) that supports the cartridge.

Motor 109 is fastened to lower motor plate 110 with machine screws 111. Upper motor plate 112 is supported by upper-tier standoffs 113 and attached to lower-tier standoffs 106 with machine screws 114, thereby securing lower motor plate 110.

At the center of pump actuator 115 is brass hub 116, which slides over motor shaft 117 and is fixed in place with set screw 118. Roller bearings 119 are affixed to hub 116 with shoulder screws 120, and roll on the surface of pump chip 101 when actuator 115 is rotated by double-shafted motor 209.

There are a number of limitations to this design, most notably that the motor, with its complex external surfaces, is difficult to sterilize for operation inside of a sterile cell- or tissue-culture incubator. The plates require a large number of holes for access and attachment, and this in turn increases the cost of the cartridge. There are a large number of exposed components, such as screws, plates, standoffs, and frames whose manufacturing tolerances are critical to the proper operation of the cartridge. The many surfaces and interfaces in the cartridge, particularly in the laminations of the motor, can readily trap bacteria and fungal spores in a manner that is difficult or impossible to decontaminate or sterilize.

Figure 2:
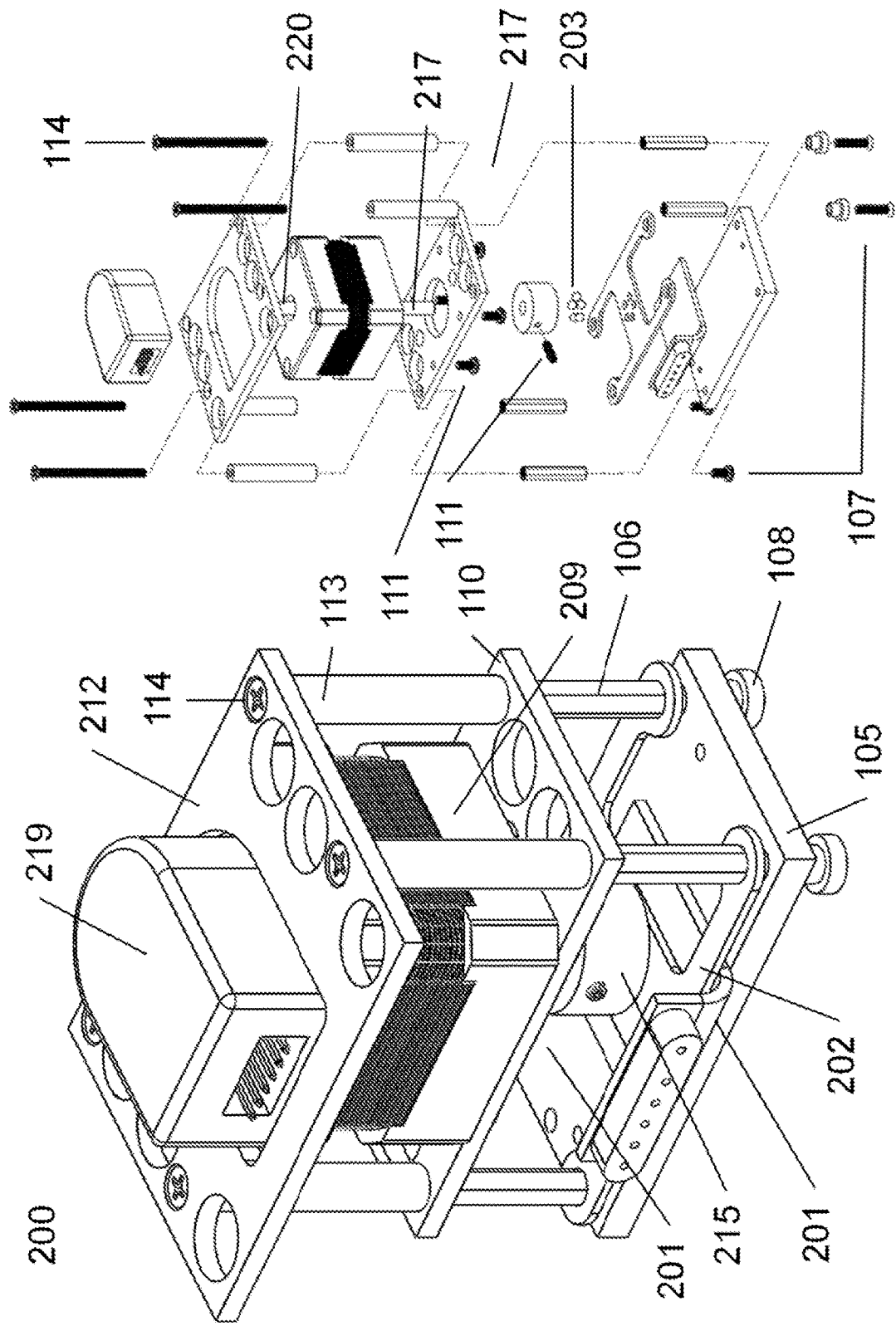
FIG. 2 shows perspective and exploded views of an existing open-frame rotary planar valve (RPV) cartridge, which contains the motor, the pump actuator, and the fluidics.

Similar issues arise with the valve cartridges. FIG. 2 illustrates that consistent with the pump in FIG. 1, the same design approach can be used to create the rotary planar valve (RPV) cartridge 200.

Valve fluidic chip 201 is made of a silicone elastomer or other elastomeric material and is positioned between fluidic chip support plate 105 and ball cage 202, which constrains movement of balls 203 to the vertical axis via holes 204 within which the balls reside. Ball cage 202 slides over lower-tier standoffs 106, thereby preventing rotational movement of ball cage 202 and balls 203. Fluidic chip support plate 105 is attached to standoffs 106 with machine screws 107. Nubbins 108 that mate with keyhole recesses (not shown) may be secured to fluidic chip support plate 105 to allow assembly 200 to be affixed to a substructure (not shown).

The double-shafted motor 209 is fastened to motor plate 110 with machine screws 111. Encoder plate 212 is supported by upper-tier standoffs 113 and attached to lower-tier standoffs 106 with machine screws 114, thereby securing lower motor plate 110.

Valve actuator 215 slides over lower motor shaft 217 and is fixed in place with set screw 218. Topography on the lower face of valve actuator 215 causes balls 203 to travel along the vertical axis as actuator 215 is rotated by motor 209. Balls that are forced down into the surface of fluidic chip 201 compress channels positioned under them, thereby pinching off and closing those channels to fluid movement.

Encoder 219 is mounted to upper motor shaft 220 of the double-shafted motor 209 for motor position feedback to the controller (not shown).

There are manufacturing and sterilization issues with this design as well. The encoder is vulnerable to microbial contamination that could readily migrate into the interior of the device. The encoder electronics are not protected from either static discharge or electromagnetic interference. The alignment of the fluidic chip on the fluidic chip support plate is difficult to adjust with respect to the ball cage and actuator, since the valve fluidic is auto-adhered to the fluidic support plate and cannot be moved laterally without removing the fluidics support plate from the cartridge.

Figure 3:
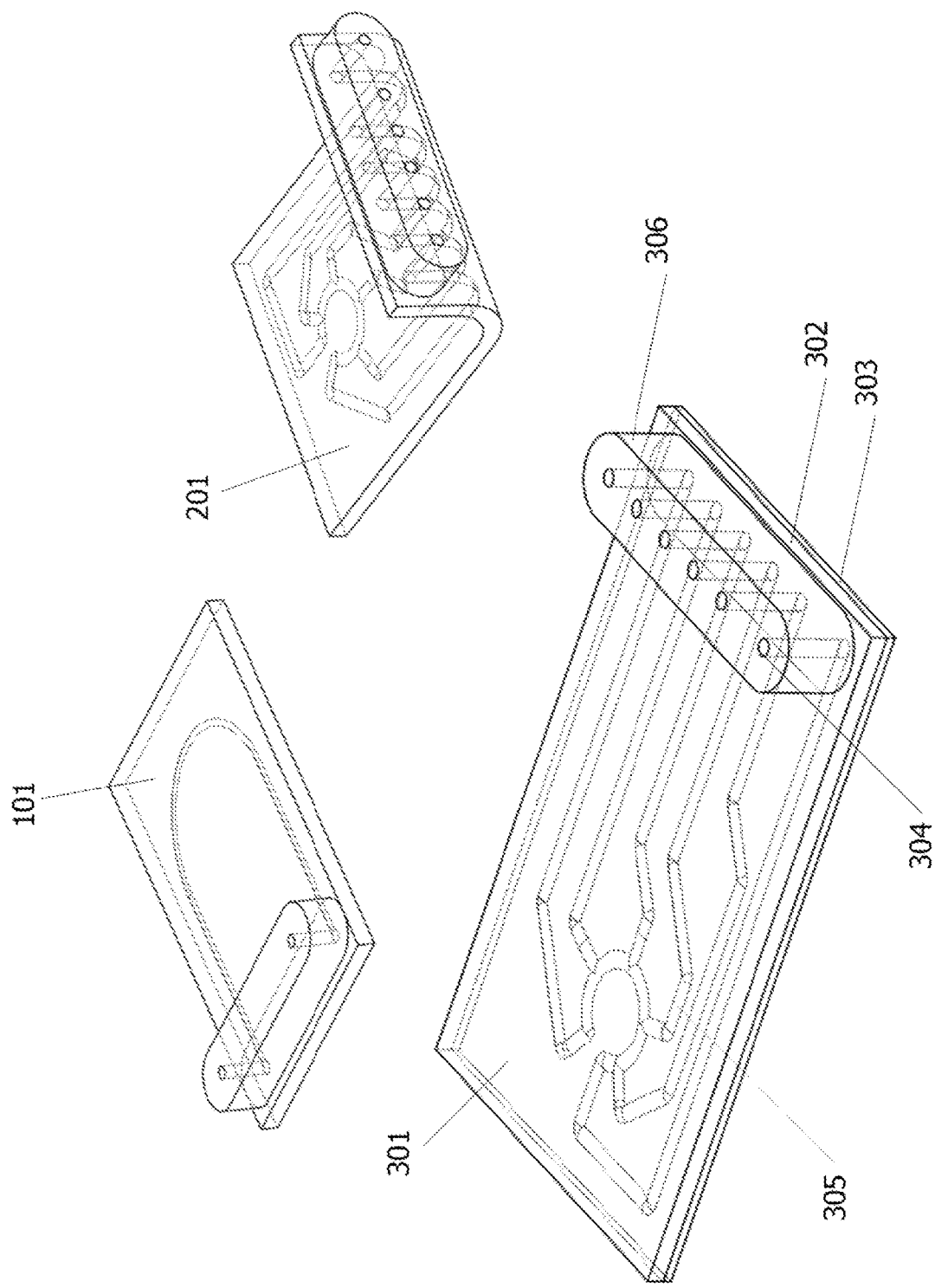
FIG. 3 shows three fluidics chips for the RPPM and RPV.

The limitations of the pump and valve cartridges are magnified by the limitations in the design, manufacture, and operation of the fluidic chips, as shown in FIG. 3. Fluidic chips 101, 201, 301 are made of a silicone rubber material or other elastomeric material. Chips 101, 201, 301 are comprised of two layers of elastomeric material, for example, fluidic layer 302, and membrane layer 303, bonded together with plasma or corona activation or another procedure. Voids creating channels or other features may be located in the upper layer, lower layer, or both layers.

Access ports 304 are punched or cast into the material and interface with channels 305 or other features within the chips. Tubing (not shown) of larger diameter than that of ports 304 is pressed into the ports, creating a seal and allowing for connections between the fluidic chip and external implements (not shown). Port protrusions 306 may be included on either layer to enhance mechanical stability and sealing efficacy in the port regions and/or for alignment/registration purposes.

The need to locate tubing ports only on the periphery of the fluidic chip required that the fluidic chip extend far from the active area defined by the RPPM and RPV actuators, which increases the overall dimensions of the pump and valve fluidic chips and limits the number of devices that can be produced on a single soft-lithographic mold. For the pumps, the insertion of tubes into the microfluidic ports must be done by reaching into the device, between the motor and fluidic support plates, and the device can only be attached to a supporting substructure in limited ways. For the pump cartridge, the tubing ports for the pump fluidic chip are free-standing, making it difficult to attach tubing without flexing the fluidic or disturbing adjacent tubes.

The appeal of the modular, cartridge approach is that it simplifies perfusion control and in-line analysis of organs-on-chips and multiple wells in a well plate over what was previously possible, and it allows standardized modules to be configured, and reconfigured, as required to create complex fluidic control and sensing instruments.

Figure 4:
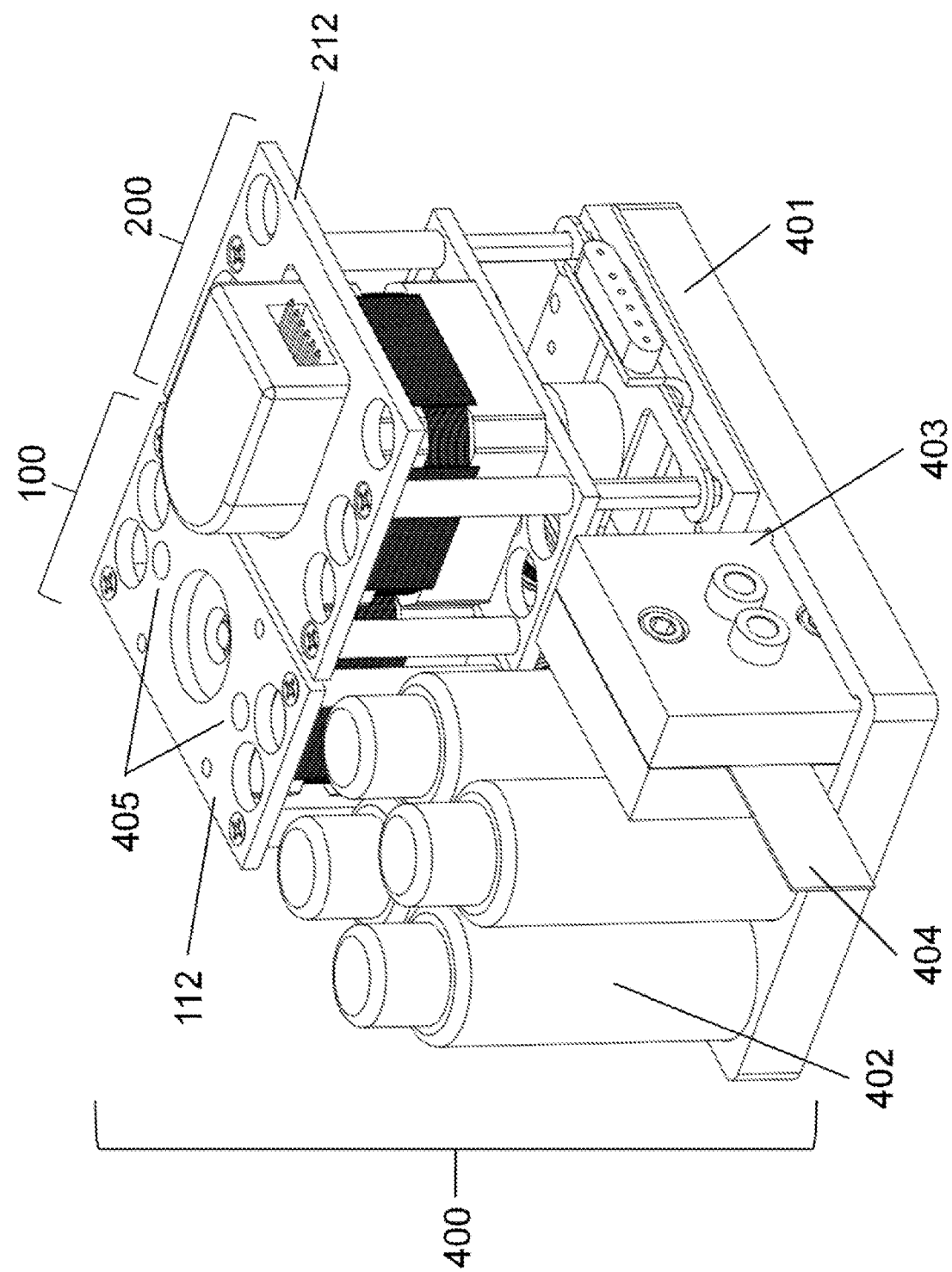
FIG. 4 shows how an RPPM and an RPV can be mounted on a caddy that supports fluidic vials and an electrochemical sensor to create a microclinical analyzer, an integrated, autocalibrating microfluidic instrument that measures the concentration of one or more analytes in media that is either drawn into the instrument from an external source or from one of the reservoirs. Without the sensor, this device also functions as a single channel microformulator that can deliver upon demand a custom-formulated mixture of analytes that are drawn sequentially from each of the multiple reservoirs.

FIG. 4 shows an exemplary application of pumps 100 and valves 200 as a MicroClinical Analyzer 400. Pump 100 and valve 200 are secured with nubbins 108 to keyhole slots (not pictured) in substructure 401. Liquid may be selected by the valve 200, withdrawn from reservoir vial 402 by pump 100, and sent through tubing (not pictured) and into an analytic chamber (not pictured) within housing 403 that contains electrode 404 or other device. In some applications, the pump/valve combination may be used to direct waste into a waste container. Magnets 405 pressed into holes in motor plate 112 and encoder plate 212 allow for mounting of auxiliary equipment such as disconnects, manifolds, additional reservoir vials, temperature-controlling apparatus, etc. (not shown).

It is noted that the microclinical analyzer can be used as a single-channel microformulator that can mix on demand five different reagents into a single fluid stream with automated temporal control of the concentration of each reagent. The two-cartridge unit shown can be combined with a twenty-five channel valve to custom-formulate media to each well in a well plate, with an extra channel for flushing the valve, and an identical unit can be used to withdraw fluid from each of those wells and direct it to a particular location for analysis. Eight of these three motor units can then be combined to create a multiwell microformulator that can address each well in a 96-well plate, as described by us in great detail in previous patent applications.

The resulting multi-cartridge instruments that are created using the existing open-frame cartridge design are subject to the limitations of the cartridges discussed above, particularly sterilization. Furthermore, these instruments have a large number of tubes that connect the individual components of each cartridge and there is no straightforward way to connect these cartridges by means of mass-produced multi-channel fluidic interconnects. We have previously introduced the concept of ribbon fluidic interconnects in the multiwell microformulator, but the means by which these ribbons are connected to individual RPPM and RPV cartridges remained unresolved.

As demonstrated in this disclosure, the approaches discussed above may not be as effective as those disclosed in this invention that discloses, among other things, a fluidic device: a rotary planar micropumps (RPPMs) or a rotary planar valves (RPVs), and cartridge systems in which the fluidic chips that form the RPPMs or the RPVs are constructed and mounted in their motor cartridges and connected to other fluidic objects such as other pumps, valves, reservoirs, bioreactors, or analytical instruments.

In one aspect of the invention, the fluidic device comprises a fluidic chip that includes a body having a first surface and an opposite, second surface, one or more channels formed in the body in fluidic communications with input ports and output ports for transferring one or more fluids between the input ports and the output ports, and a fluidic chip registration means formed on the first surface for aligning the fluidic chip with a support structure. The fluidic device further comprises an actuator configured to engage with the one or more channels at the second surface of the body for selectively and individually transferring the one or more fluids through the one or more channels from at least one of the input ports to at least one of the output ports at desired flowrates.

In one embodiment, the fluidic device further comprises a motor to operably drive the actuator to be activated or deactivated.

In one embodiment, the fluidic device further comprises a computer or microcontroller to control the operation of the pumps and valves and allow their synchronous operation as a microformulator, a microclinical analyzer, or with a variety of accessories, including bubble-tracking flow meters.

In one embodiment, the body of the fluidic chip comprises a first layer and a second layer, each layer having a first surface and an opposite, second surface, wherein the one or more channels are grooved on a first surface of the second layer, a second surface of the first layer is planar and bonded to the first surface of the second layer to seal an open side of the one or more channels in the first surface of the second layer, and the second layer is elastomeric, such that compression of the actuator on a second surface of the second layer causes at least one of the one or more channels in the second layer to be occluded, wherein the first and second surfaces of the body are coincident with the first surface of the first layer and the second surface of the second layer, respectively.

In one embodiment, the fluidic chip registration means is configured such that the fluid chip is allowed for multiple fluid chip orientations while maintaining automatic and precise mechanical alignment to the support structure.

In one embodiment, the fluidic chip registration means comprises at least one protrusion protruded the first surface of the body.

In one embodiment, the least one protrusion is configured to fluidically communicate the one or more channels with interface ports that allow connection of external tubing to the fluidic chip through a base plate.

In one embodiment, the fluid chip is configured such that one or more plug-in accessories are addable in or removable from the fluid chip. In one embodiment, the one or more plug-in accessories comprise capacitors, adjustable fluidic resistors, electrical or electrochemical sensors, photosensors for detecting or tracking bubbles for either bubble detection or for determining flow rates, flowmeters, manifolds, over-pressure relief (blow-off) valves, check valves, bubble traps, injection ports, bioreactors, or a combination of them.

In one embodiment, the fluidic chip is a circular through-plate in a radial channel configuration capable of accepting fluidic functionality expansion flow-through chips containing adjustable fluidic resistance modules for one or more pumping channels, individual channel pulsation dampening means including fluidic capacitors, pressure equalizing fluidic network for two or more main pumping channels including fluidic shunt capacitors, and/or simultaneous multichannel flow measuring/calibrating module.

In one embodiment, the fluidic device is an RPPM.

In one embodiment, the actuator comprises a plurality of rolling members and a driving member configured such that when the driving member rotates, the plurality of rolling members rolls along the one or more channels so as to selectively and individually transferring the one or more fluids through the one or more channels at the desired flowrates.

In one embodiment, the fluidic device is a capacitive pump, wherein the one or more channels comprise one channel having a middle, circumferential portion with two end portions, each end portion being coupled to a port through a chamber or a bubble trap, wherein the chamber or bubble trap operably function as capacitor to reduce flow and pressure transients associated with rolling members of the actuator rolling on or off said channel.

In one embodiment, the chamber has a volume that plays a role in reduction of the flow and pressure transients. In one embodiment, the two chambers are identical to or different from one another, and are in any one of geometric shapes.

In one embodiment, the capacitor is a shunt capacitor, or a bubble trap capacitor.

In one embodiment, the capacitors are series capacitors, in line with the input or output channel of the pump, or both.

In one embodiment, the capacitors are both series and shunt capacitors to provide a particular frequency-damping characteristic.

In one embodiment, the fluidic chip further comprises a ridge formed on the second surface of the body in relation to said channel for allowing the actuator to gradually engage and disengage with said channel and a working fluid to prevent backflow and reducing pulsatility.

In one embodiment, the ridge has ramps with angles for a start and an end of the ramp formed at each end of the ridge for eliminating backflow and stopping flow as the rolling members enter and leave the ridge.

In one embodiment, the fluidic device is an RPV comprising a multi-channel valve, a manifold valve, or a multi-throw valve.

In one embodiment, each of the one or more channels comprises one or more sub-channels connected to one or more input ports and one or more outputs, wherein all the sub-channels of the one or more channels are spaced-apart in the radial channel configuration.

In one embodiment, the actuator comprises a cage defining a plurality of spaced-apart openings; a plurality of pop-up members, each pop-up member retained in a respective opening of the cage and being vertically movable therein; and a drivehead having a surface and at least one recess formed on the surface, wherein the cage is placed on the second surface of the fluidic chip to constrain each pop-up member in a position immediately on a respective sub-channel, such that when a pop-up member is pressed into the second surface of the fluidic chip, a sub-channel that is immediately beneath the pop-up member is compressed, otherwise, said sub-channel is uncompressed; and wherein the drivehead is rotatably engaged with the cage such that as the drivehead rotates at a position, any selected pop-up members positioned in the at least one recess arise to create open sub-channels corresponding to the selected pop-up members, thereby selectively unoccluding or occluding fluid flows through desired sub-channels.

In one embodiment, the RPV is a normally closed RPV.

In one embodiment, the at least one recess comprises a plurality of tangential ovoid recesses.

In one embodiment, the plurality of tangential ovoid recesses is configured to ensure that there is no "off" position for the plurality of pop-up members while switching from one input port to another input port where both input sub-channels connected to said two input ports are closed at the same time.

In one embodiment, the RPV is a make-before-break valve.

In one embodiment, the fluidic chip and the actuator are configured such that there are actuated balls that open and close channels upon which they reside, unactuated balls underneath which channels are always closed, and absent balls underneath which channels are always open, thereby partitioning the valve into a plurality of independent fluid-containing regions separated by the unactuated balls, each region having its own inlet/outlet ports, a group of channels, and actuated balls such that by a selection of the actuated balls, flows to or from the ports within said region are dynamically controllable, which allowing a plurality of isolated fluidic circuits to exist on a single chip.

In another aspect of the invention, a cartridge of a fluidic device incudes the fluidic device as disclosed above; a support structure having segmental openings; a motor plate; standoff plates; and an enclosure hood. As assembled, an assembly of the actuator slides over a shaft of the motor and is fixed in place with a fastening means, the motor is fastened to the motor plate, the standoff plates are fastened to the enclosure hood through the motor plate, the second surface of the fluidic chip faces the actuator, the fluidic chip registration means on the first surface of the fluidic chip is received in the segmental openings of the support structure, and the support structure is in turn attached securely to the standoff plates In one embodiment, registration of the fluidic chip registration means to the segmental openings in fluidic chip support plate prevents rotational and translational movement of the fluidic chip relative to the cartridge.

In one embodiment, the cartridge further comprises windows for visual or physical accessing to the actuator and the fluidic chip, wherein the windows are removably attached to the fluidic support structure and the standoff plates such that debris ingress is prevented.

In one embodiment, the cartridge further comprises gaskets for part-to-part sealing so as to prevent moisture and/or air from entering into the cartridge.

In one embodiment, the enclosure hood has an electrical feedthrough for allowing electrical communication between the fluidic device and external electronics.

In one embodiment, the electrical feedthrough is in the form of a DIN connector or other connector, and is capped to prevent dust or moisture from entering into the cartridge.

In one embodiment, the fluidic device further comprises an encoder and control electronics disposed within the enclosure hood.

In one embodiment, the cartridge further comprises a retainer configured to clamp the fluidic chip to the support structure for maintaining the position and therefore the alignment of the fluidic chip relative to the support structure in case counterforce is applied during handling or intubation of the fluidic chip, wherein such securement also promotes stable compression characteristics between the actuator and the fluidic chip by ensuring contact between the fluidic chip and the support structure and planarity of the fluidic chip.

In one embodiment, the cartridge is fluidically connectable to another cartridge or fluidic device through a fluidic interface connector coupled to the fluidic chip registration means registered in the support structure.

In yet another aspect of the invention, a pump-valve (P-V) system includes a plurality of cartridges disposed on a platform, each cartridge is disclosed above, wherein the plurality of cartridges comprises pump cartridges, valve cartridges, or a combination of them; and vials disposed on a platform, for inputting and/outputting one or more fluids.

In one embodiment, the P-V system further has one or more fluidic interface connectors coupled to the fluidic chip registration means registered in the support structures of cartridges for fluidically connecting one cartridge to another cartridge. In one embodiment, each of the one or more fluidic interface connectors comprises bioreactor connector tubes, valve connector tubes, pump tubes, and reservoir tubes, configured to be operably insertable into corresponding ports on each of bioreactors, valves, pumps, and reservoirs, respectively, for dynamically controlling flows of one or more fluids through the pumps and the valves into and/or out of the bioreactors.

In one embodiment, the P-V system further has comprising a neurovascular unit (NVU) bioreactor disposed on the platform and coupled to the plurality of cartridges and the vials, and/or a polycarbonate well plate disposed on the platform.

In one embodiment, the plurality of cartridges comprises two pump cartridges, and the P-V system is a perfusion controller.

In one embodiment, the plurality of cartridges comprises six cartridges, and the P-V system is a 24 channel microformulator system.

In one embodiment, the plurality of cartridges comprises four sets of cartridges, each set having two valve cartridges and one pump cartridge, and the P-V system is a twenty-four channel transwell microformulator 24 transwell system.

In one embodiment, the plurality of cartridges comprises six valve cartridges and four pump cartridges, and the P-V system is pharmacokinetic sampling module.

According to the invention, the fluidic chip registration format allows for multiple chip orientations while maintaining automatic and precise mechanical alignment. The valve fluidic chip with integrated protrusions allow for automatic and precise alignment to the supporting structure, and therefore the pump actuator. The fluidic chip format with a radial channel configuration capability allows actuation of multiple channels, individually or in groups, while preventing undesired actuator interference with other channels.

Furthermore, according to the invention, the valve having multiple ports, any of which may be used or not used, provides enhanced versatility and adaptability. A multi-port valve fluidic chip having circular footprint allows configurations that equalize path length and magnitude of fluid resistance across any incorporated channels. A standard format for fluidic chips that allows interchangeability between pumping capability and switching capability in the same or similar instrument. the valve chip that can serve as a manifold (single or multiple inputs, single to multiple outlets) by omitting actuator balls and attached downstream from individual pumps.

Moreover, according to the invention, the fluidic chip format allows plug-in accessories to be added or removed. Accessories may include capacitors, adjustable fluidic resistors, electrical or electrochemical sensors, photosensors for detecting or tracking bubbles for either bubble detection or for determining flow rates, flowmeters, manifolds, overpressure relief (blow-off) valves, check valves, bubble traps, injection ports, bioreactors, etc. Accessories may be daisy-chained/stacked.

These and other aspects of the present invention are further described below. Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Fluidic Device Cartridges

Many biological experiments that may use the devices described herein require environments that are not as friendly to mechatronic devices as they are to biology. These environmental hazards include high humidity, the possibility of fungal, bacterial, or other microbial contamination, splashes and sprays of cleaners, sterilants, and conductive, salt-rich medias, plus the potential for unwanted grounding/electrical noise/static discharge. These concerns are able to be overcome by increasing the separation between the environment and the device. The device described herein (including the installed pump, valve, or other fluidic chip as shown) protects the sensitive electronics and actuation hardware from the various liquids etc. that are used in these experiments while also allowing for other chemicals to be used to easily spray or wipe the outside of the device in order to decontaminate it prior to use in an experiment. This enclosure also allows for internal parts to be replaced and upgraded without major modification to the outside of the device, preventing the later addition of locations that may harbor pockets of contamination. To further this goal, all external surfaces, including seams between mating parts, are as smooth as is practical.

The devices described herein are designed with adaptability in mind. This allows the experimenter using the apparatus to dictate what configuration the device should be in to run the experiments. This is realized through the simple processes of replacing the fluidic, being of standard external design, to that of another type such as a pump or valve, the relocation of mounting nubbins to facilitate diversity of mounting orientations, and/or swapping existing end windows/standoff plates to versions designed to assist in making fluidic connections, typically achieved by adding holes. This configuration supports directly tubing from the experiment to the elastomeric fluidic, indirectly to traditional Upchurch/IDEX bulkhead connectors attached to the windows or standoff plates and plumbed to the fluidic, or some other connector-based interface that can be attached via the windows. The enclosure hood is also sized such that additional sensor and electrical control options can easily be fit within it, further decreasing complexity of use and setup by the experimenter. Finally, there are three accessory mount locations: using either of the window mount screw locations (regardless if windows are installed), or the pair of holes on the bottom over which the nubbins may be mounted. All three locations utilize the same hole size, spacing, and thread, as to allow accessories to be added interchangeably between locations.

Figure 5A:
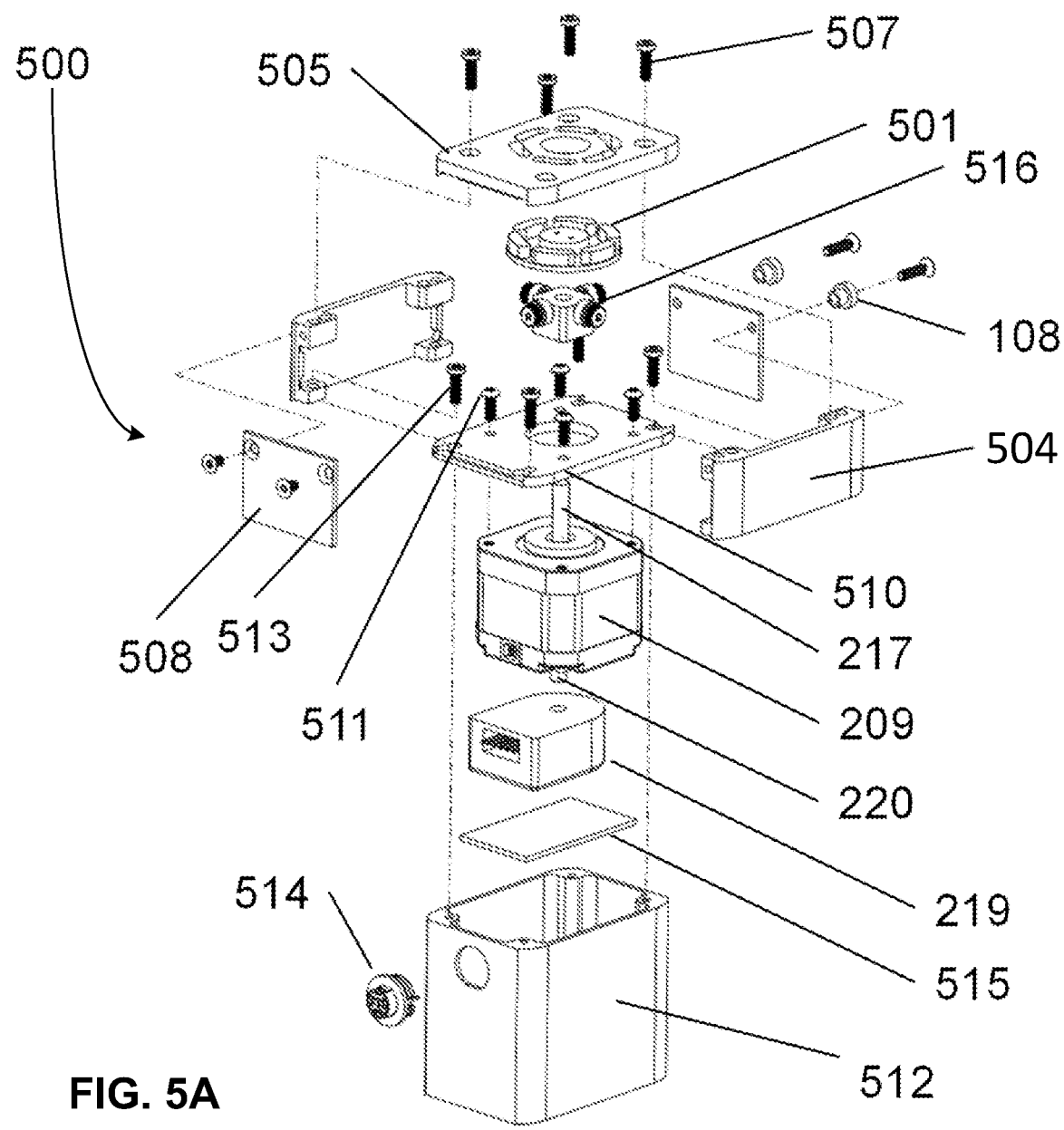
FIG. 5A shows an exploded view of an enclosed pump cartridge including a fluidic chip, actuator, drive motor, encoder, controlling electronics, and housing parts, according to one embodiment of the invention.

In one exemplary embodiment, FIG. 5A shows an assembly of an enclosed pump cartridge with an enclosure that supports the features of this invention, which allows for full enclosure of fluidic chip 501 within the assembly 500 and access to external plumbing (not shown). Outer surfaces of the assembly may be sterilized without affecting sensitive inner-workings of the instrument.

Fluidic chip support plate 505 is attached to standoff plates 504 with machine screws 507. Optional, removable windows 508 allow for access to actuator 516 and fluidic chip 501. Windows 508 mate with adjacent fluidic support plate 505, standoff plates 504, and fluidic support plate 505 such that most debris ingress is prevented. This and other part-to-part seals can be made to be water-tight and/or air-tight with the addition of a gasket (not shown).

Motor 209 is fastened to motor plate 510 with machine screws 511. Standoff plates 504 are fastened to enclosure hood 512 through motor plate 510 with machine screws 513. Electrical feedthrough 514 allows electrical communication between the device and external electronics and may take the form of a DIN connector or other connector, and may be capped to prevent dust or moisture from entering assembly 500. Onboard motor 209, encoder 219, and control electronics 515 may be included within hood 512. Nubbins 108 that mates with keyhole recesses may be secured in a number of locations on assembly 500 to allow it to be mounted to a substructure (not shown). Threaded holes for attaching nubbins 108 or windows 508 may also be used to mount other accessories (not shown).

In a manner similar to the pump actuator assembly shown in FIG. 1, pump actuator assembly 516 slides over motor shaft 217 and is fixed in place with a set screw. The roller bearings are affixed to the hub with shoulder screws, and roll on the actuated surface of pump chip 501 when actuator assembly 516 is rotated by motor 209.

Figure 5B:
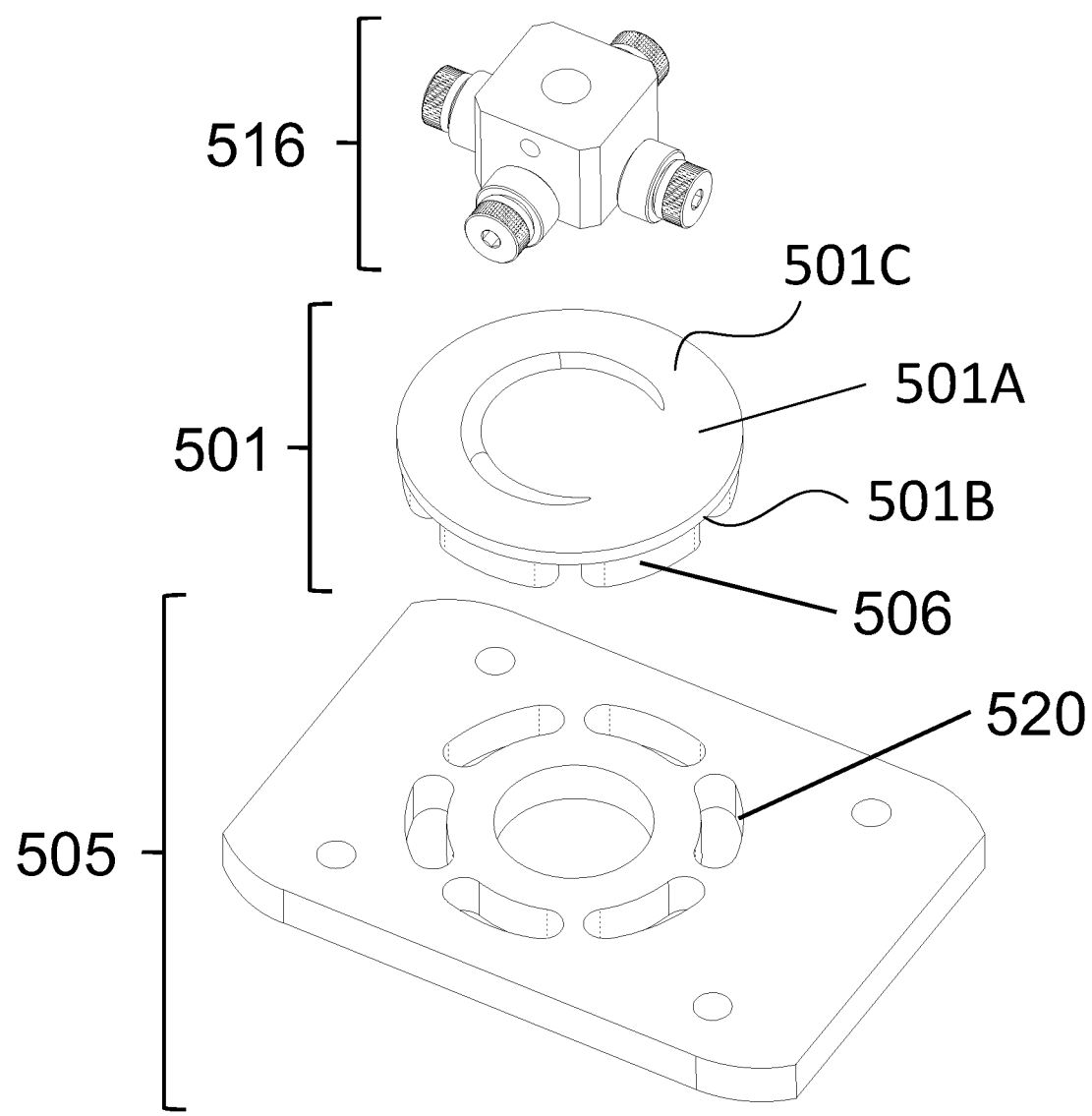
FIG. 5B shows an inverted ridge pump fluidic chip, pump actuator, and fluidic chip support plate, according to one embodiment of the invention.

FIG. 5B shows the geometric relation between pump actuator assembly 516, circular through-plate fluidic chip

501, and fluidics support plate 505. The fluidic chip 501 includes a body 501A having a first surface 501B and a second surface 501C, and a fluidic chip registration means 506 formed on the first surface 501B for aligning the fluidic chip 501 with the support structure 505. In this embodiment, the fluidic chip registration means 506 is in the form of protrusions 506. FIG. 5B also shows how the protrusions 506 mate with segmental openings 520 in the fluidic support plate 505.

Registration of the protrusions 506 to segmental openings 520 in the fluidic chip support plate 505 prevents rotational and translational movement of the fluidic chip 501 relative to the assembly 500.

The present embodiment shows the fluidic chip 501 with protrusions 506 as being circular. Other embodiments could utilize square, rectangular, or other shape fluidic chips as dictated by the application and the practicalities of chip production.

Figure 5C:
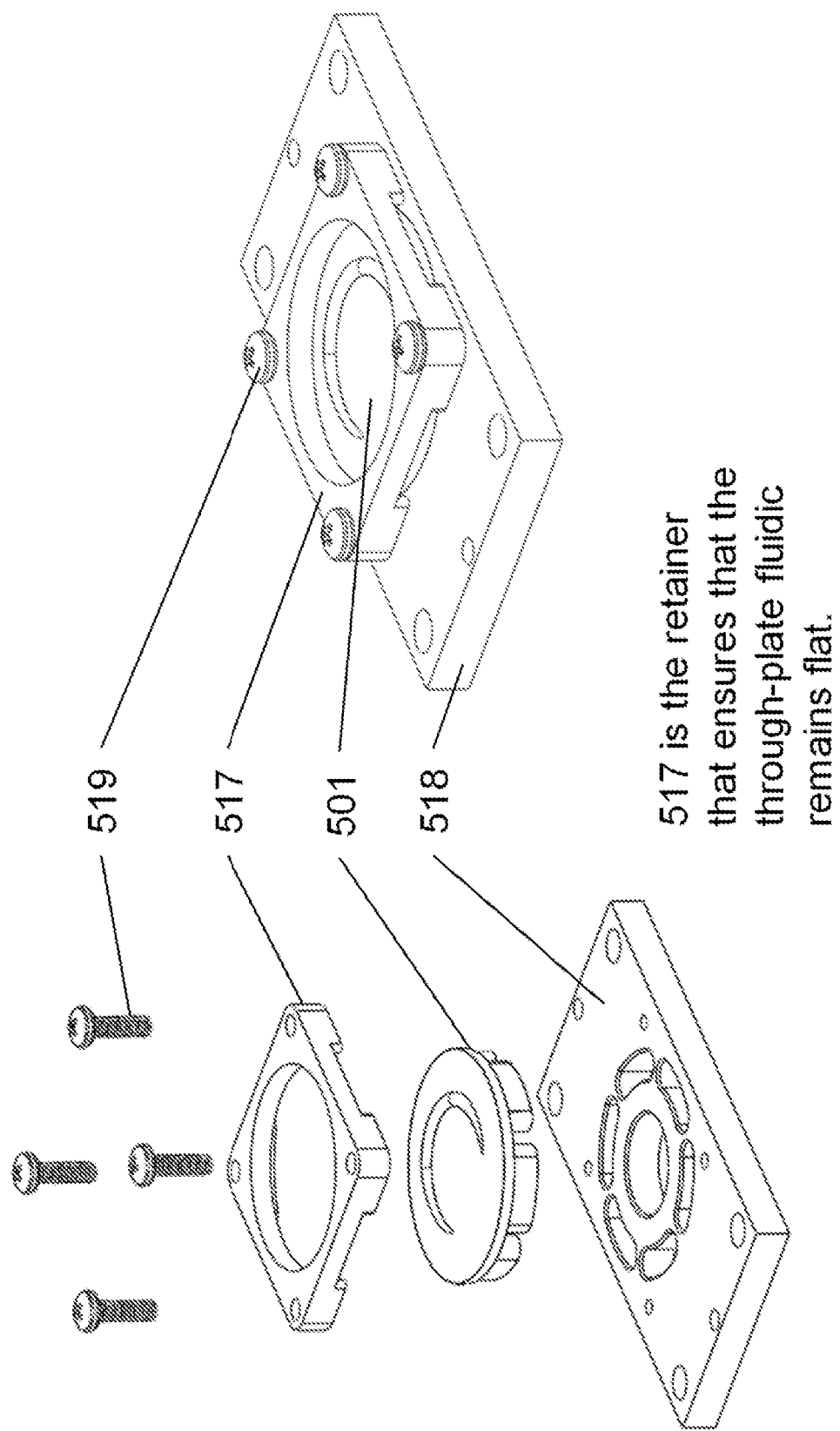
FIG. 5C shows a retainer assembled to a clamp fluidic chip according to one embodiment of the invention.

In another embodiment shown in FIG. 5C, retainer 517 is used to clamp fluidic chip 501 to fluidic chip support plate 518. Retainer 517 is attached to baseplate 518 with machine screws 519. Retainer 517 maintains position and therefore alignment of fluidic chip 501 relative to fluidic chip support plate 518 in case counterforce is applied during handling or intubation of fluidic chip 501. Such securement also promotes stable compression characteristics between actuator 516 and fluidic chip 501 by ensuring contact between fluidic chip 501 and fluidic chip support plate 505. Furthermore, addition of retainer 517 allows chip 501 and fluidic support plate 518 to be removed/transferred without risking disruption of chip-baseplate alignment.

While the fluidics could be produced by automated, commercial injection molding, the novel and appealing of embodiments of this design according to the invention is that fabrication techniques we developed to create the circular, through-plate fluidic chips are more repeatable, do not require solvents or a hood, and can be used to fabricate larger devices that is the case with conventional photolithographic methods to produce microfluidic masters.

According to the invention, the retainer counters any forces generated by the intubation of fluidic chip, thereby securing it in place relative to the housing assembly/actuator. The retainer will increase the planarity of the fluidic chip, and may add additional resistance against torque applied by the actuator to the fluidic chip. According to the invention, the retainer can promote stable compression characteristics and stable chip-baseplate alignment; allow chip and baseplate to be removed/transferred without risking disruption of chip-baseplate alignment; and minimize undesirable wear of fluidic chip.

Capacitive Pumps

It is noted that rotary planar peristaltic micropumps may produce high amplitude pulses which are caused by the roll-on and roll-off of the rollers over the channels, and the stepping of the stepper motor. In addition, when run in a multi-chambered device separated by a thin membrane, these pulses can cause differential flow across the membrane. Differential flow across a membrane in an organ chip can be potentially cell lethal.

In one aspect of the invention, a capacitive pump is provided to solve these problem. The capacitive pump can reduce flow and pressure transients associated with the rollers rolling on or off the channel. In certain embodiments, resistor/capacitor pairs are added to the pumps. Increased length of on-chip supply/waste channels adds to overall resistance of the pump circuit, and cavities capped with diaphragms add capacitance to absorb/smooth pulsatility peaks.

FIG. 6A-6B show respectively plan and perspective views of the circular, through-plate implementation of a capacitive pump according to one embodiment of the invention. In this example, the through-plate fluidic pump chip 601 includes a fluidic channel 630 having a middle, circumferential portion with two end portions 632 and 634, which are respectively extended to chambers (or bladders or cavities) 635 and 636, or bubble traps, which in turns, are extended to a first port 631 and a second port 633, respectively. The chambers 635 and 636 can be same or different, and can be any one of geometric shapes. Operably, the chambers 635 and 636 function as capacitors to reduce flow and pressure transients associated with the rollers rolling on or off the channel 630. In one embodiment, the through-plate fluidic pump chip 601 also includes a fluidic chip registration means including surrounding standoff plates/tabs/flanges/protrusions 606, which allows for automatic and precise mechanical alignment to the supporting structure, also for multiple chip orientations while maintaining automatic and precise mechanical alignment. In one embodiment, the through-plate fluidic pump chip 601 may have a ridge 638 formed in relation to the channel 630, with angles for the start and end of the ramp at each end of the ridge chosen so as to eliminate backflow and stopped flow as the pump rollers enter and leave the ridge, which allows the actuator to gradually engage and disengage with the channel 630 and working fluid, thereby preventing backflow and reducing pulsatility.

Figure 6C:
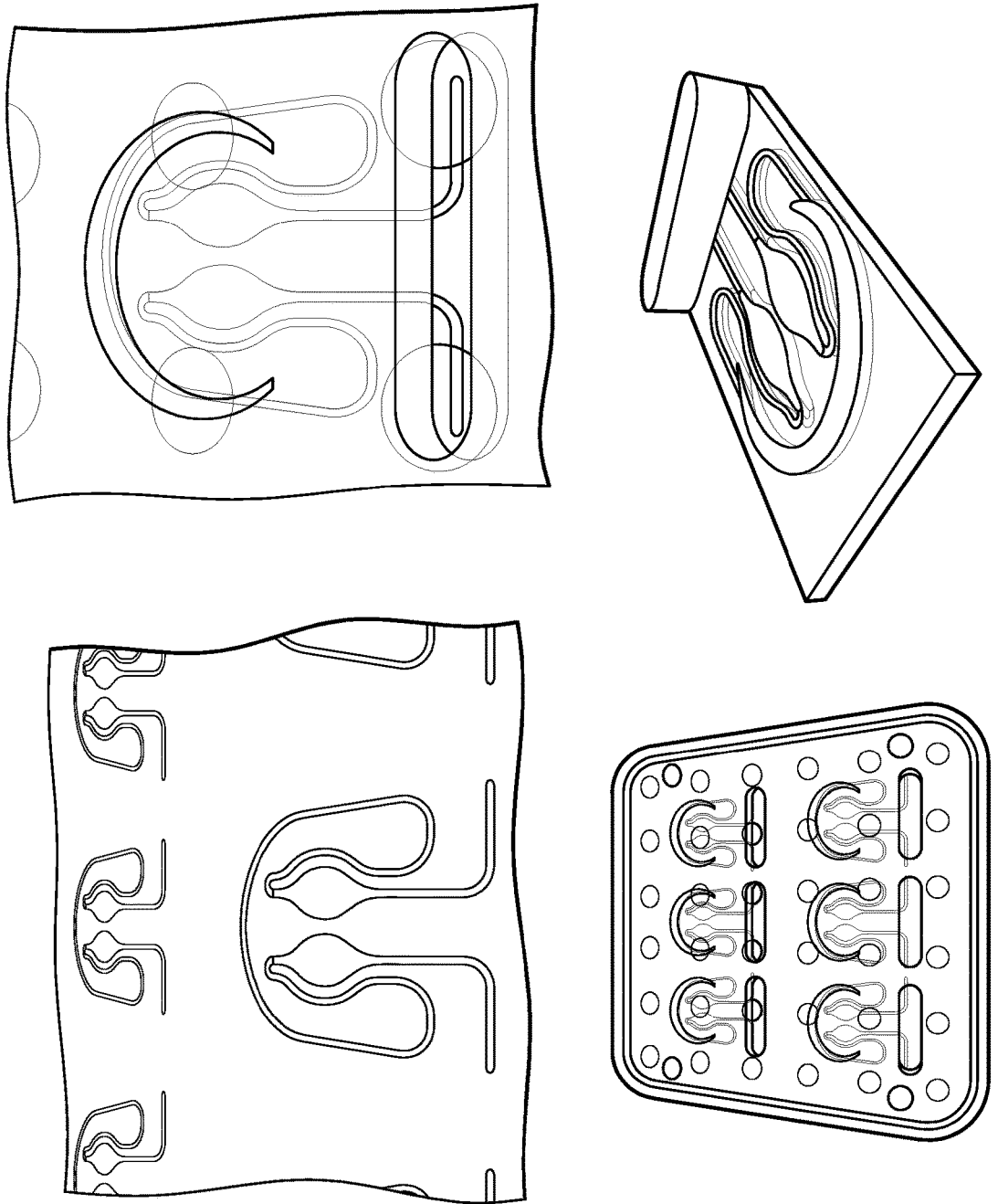
FIG. 6C shows various embodiments of the capacitive pump chip designs and mold components according to the invention.
Figure 6D:
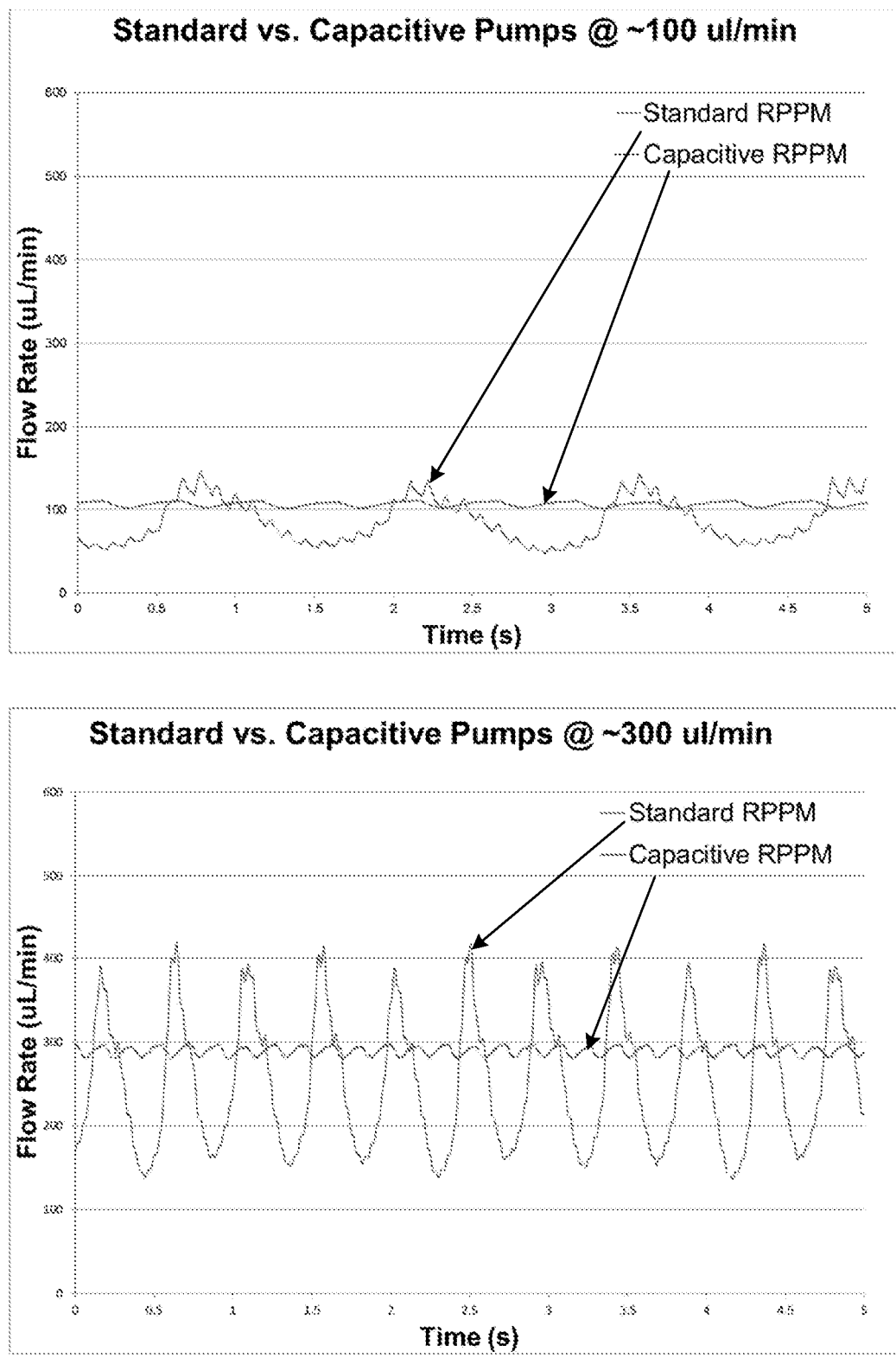
FIG. 6D demonstrates the effectiveness of a capacitive RPPM to reduce flow pulsatility according to embodiments of the invention.
Figure 6E:
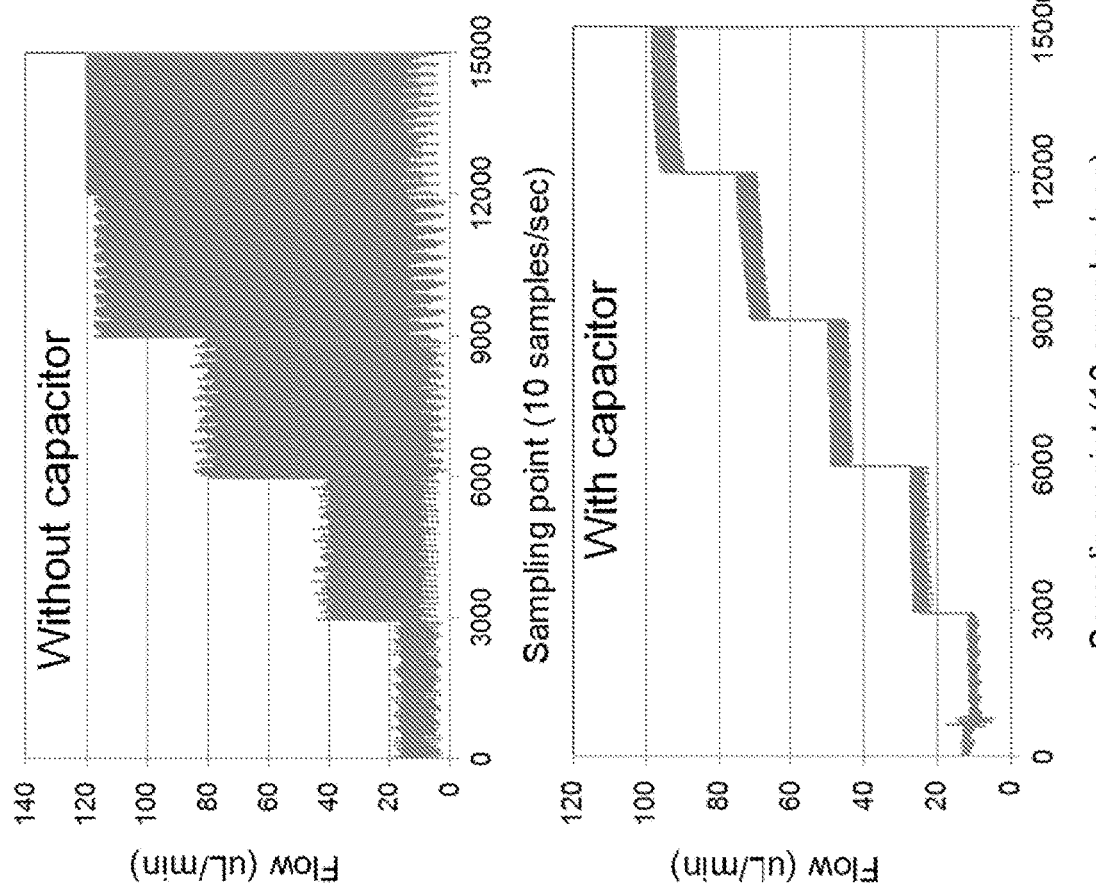
FIG. 6E demonstrates effects of a hydraulic capacitor on the instantaneous pump output of a capacitive RPPM according to embodiments of the invention.
Figure 6F:
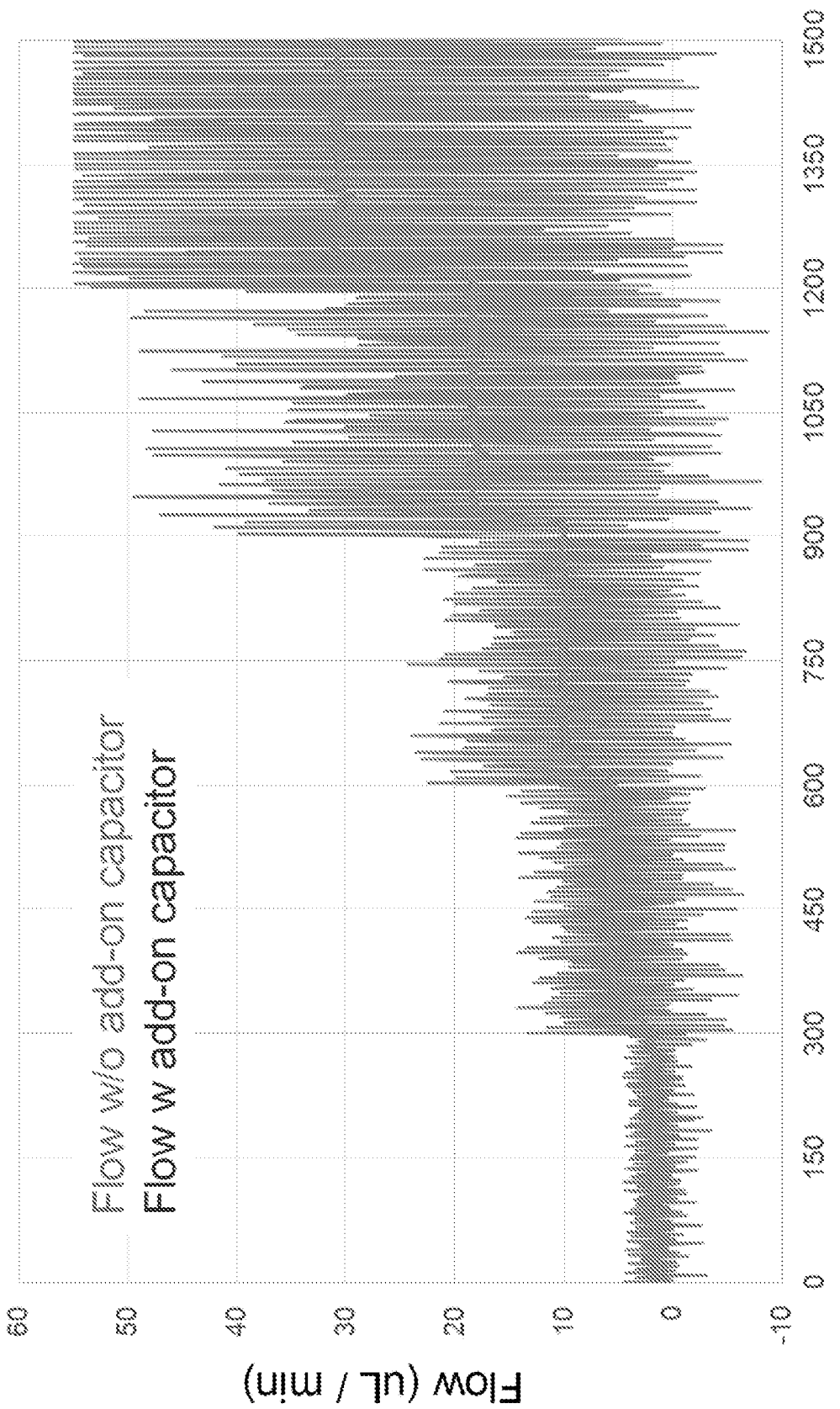
FIG. 6F demonstrates typical output of a single channel of the multichannel pump (channel 5) with or without a capacitor according to embodiments of the invention.
Figure 6G:
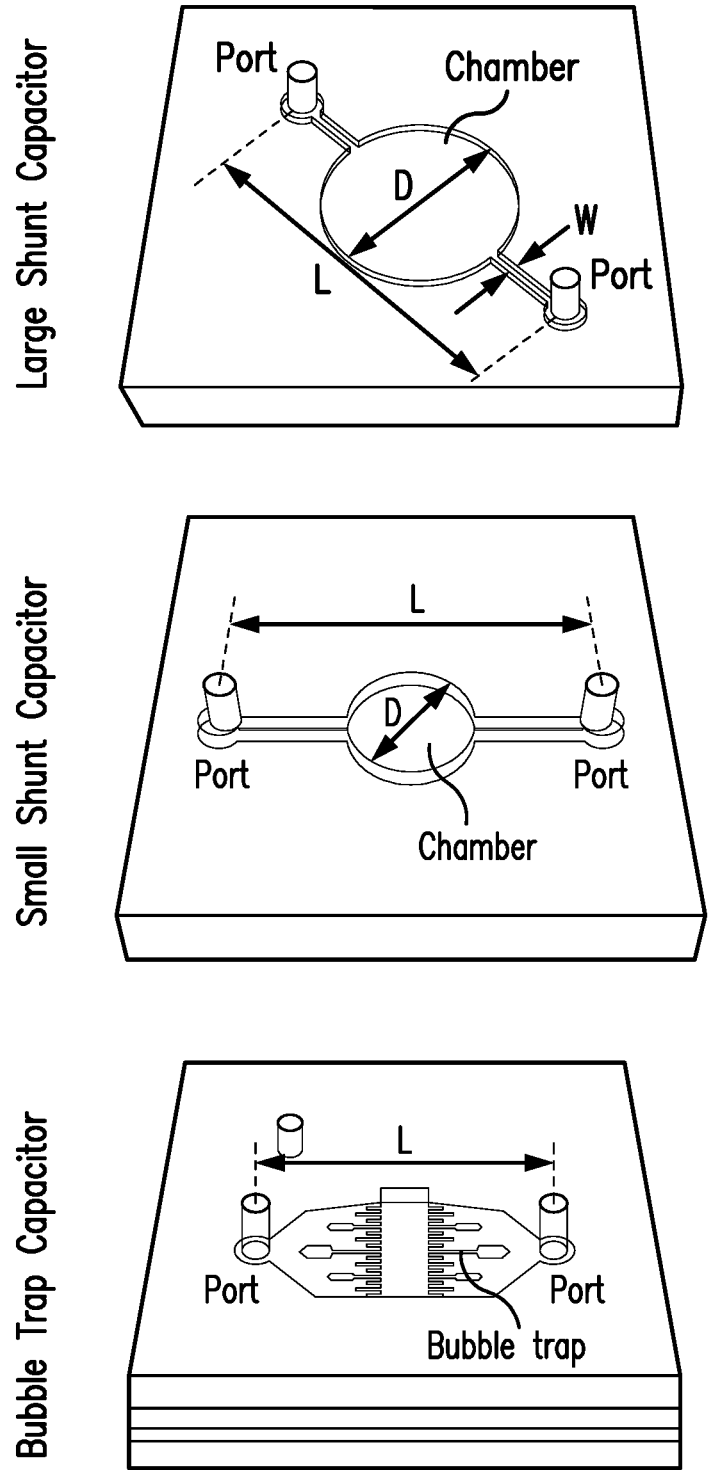
FIG. 6G shows respectively prototyped large shunt capacitor, small shunt capacitor, and bubble trap capacitor for a capacitive RPPM according to embodiments of the invention.
Figure 6H:
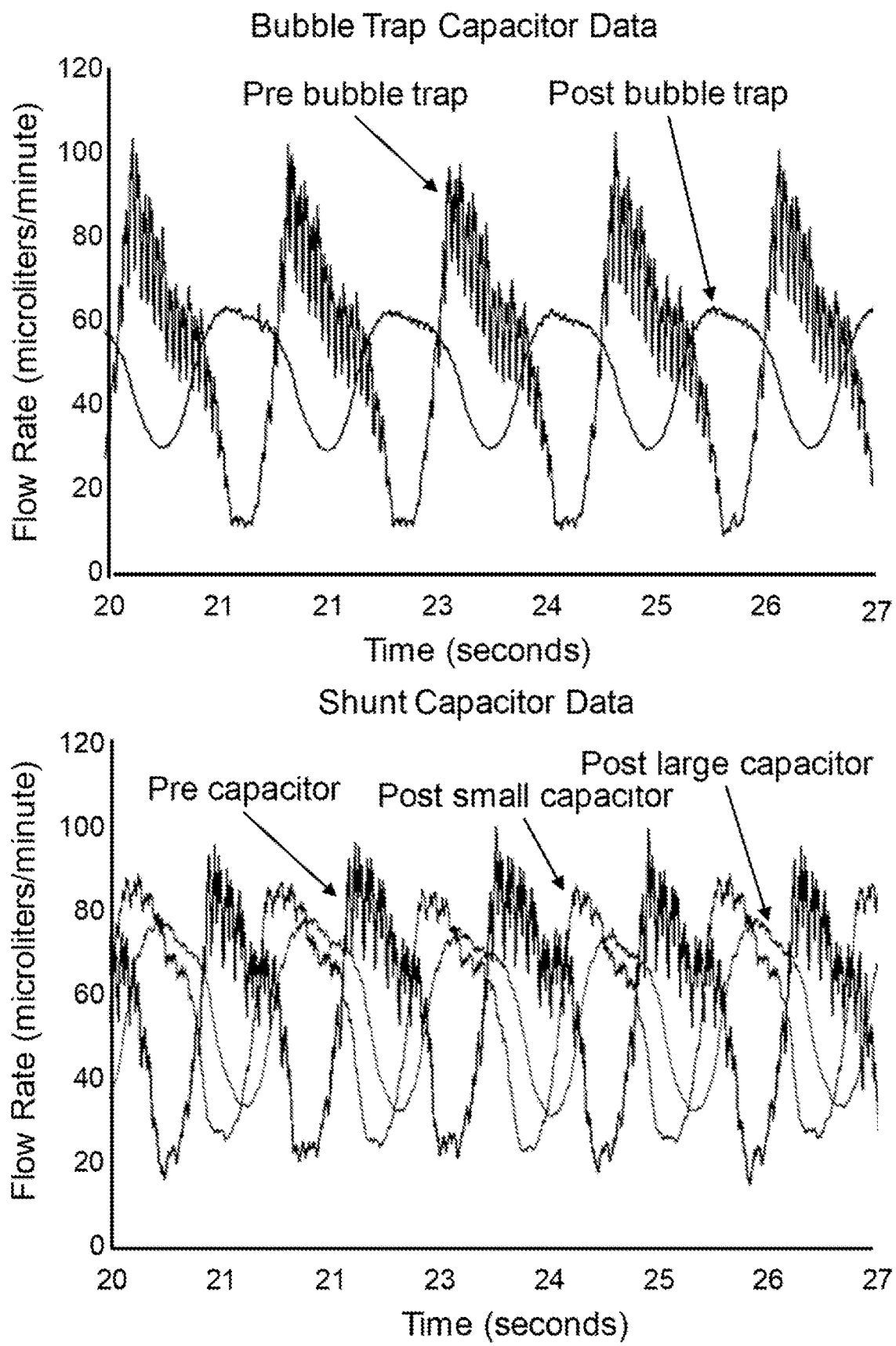
FIG. 6H shows testing results of flowrates of pumps with a bubble trap capacitor (top panel), a large and small shunt capacitors (bottom panel), which are compared with that of the pumps without these capacitors, according to embodiments of the invention.

As shown in FIGS. 6G-6H below, the size/volume of the chamber of the capacitor, or the bubble trap, is a very important means to reduce the amplitude of the flow pulses.

FIG. 6C shows various embodiments of the capacitive pump chip designs and details of their molds according to the invention.

FIG. 6D demonstrates the effectiveness of a capacitive RPPM to reduce flow pulsatility according to embodiments of the invention.

FIG. 6E demonstrates effects of a hydraulic capacitor on instantaneous pump output of a capacitive RPPM according to embodiments of the invention.

FIG. 6F demonstrates the typical output of a single channel of the multichannel pump (channel 5) with or without a capacitor according to embodiments of the invention.

In order to characterize the role of the size/volume of the chamber in smoothing out the flow spikes, two shunt capacitor types are designed and fabricated for a micropump according to embodiments of the invention. The two types fabricated are a small and large capacitor. As shown in FIG. 6G, in one embodiment, large capacitor (top) has channel width, W=0.5 mm, chamber diameter, D=10 mm, port-to-port length, L=19 mm; and in another embodiment, the small capacitor (middle) has channel width, W=0.5 mm, chamber diameter, D=6 mm, and port-to-port length, L=19 mm.

In addition, FIG. 6G also shows a bubble trap functioning as a capacitor for a micropump according to yet another embodiment of the invention. The bubble trap is disclosed in our U.S. patent application Ser. No. 16/049,025, which is incorporated herein by reference in its entirety, which is originally designed to prevent bubbles from entering an organ chip. A large forest of posts with a thin 100 μm membrane separating the bubble capture area from the bubble release chamber to allow diffusion of air through the membrane either passively or actively with vacuum. The port-to-port length, L=17 mm.

FIG. 6H shows testing results of flowrates of pumps with a bubble trap capacitor (top panel), a large and small shunt capacitors (bottom panel), which are compared with that of the pumps without these capacitors.

For the shunt capacitors, the large and small shunt capacitors are impossible to load without capturing some air bubbles inside the capacitor bladder/chamber. Most of the captured air can be flushed out but not all of the air which can allow a trapped bubble to continue to grow and be released downstream into an organ chip mid experiment resulting in cell death and experiment failure.

For the bubble trap capacitors, the advantage of the bubble trap is that if air bubbles are trapped, they are released passively via diffusion through the 100 μm membrane, and if desired actively with a vacuum applied via the vacuum port. The data suggests that the bubble trap and the large format shunt capacitor both work, but it is difficult to load the large capacitor without capturing bubbles. The bubble trap requires the fabrication of more layers than the shunt capacitor as it is a five layered device whereas the shunt capacitor is a three layered device.

Hence when running the ridge pumps with organ chips users can opt to purchase bubble traps for preventing bubble introduction into their devices and/or for capacitors to smooth out the flow profile. This is especially beneficial in a device like the NVU Organ Chip where smooth flow on both sides of the membrane is crucial to prevent membrane cross-talk.

Multi-Port Valves

Figure 7:
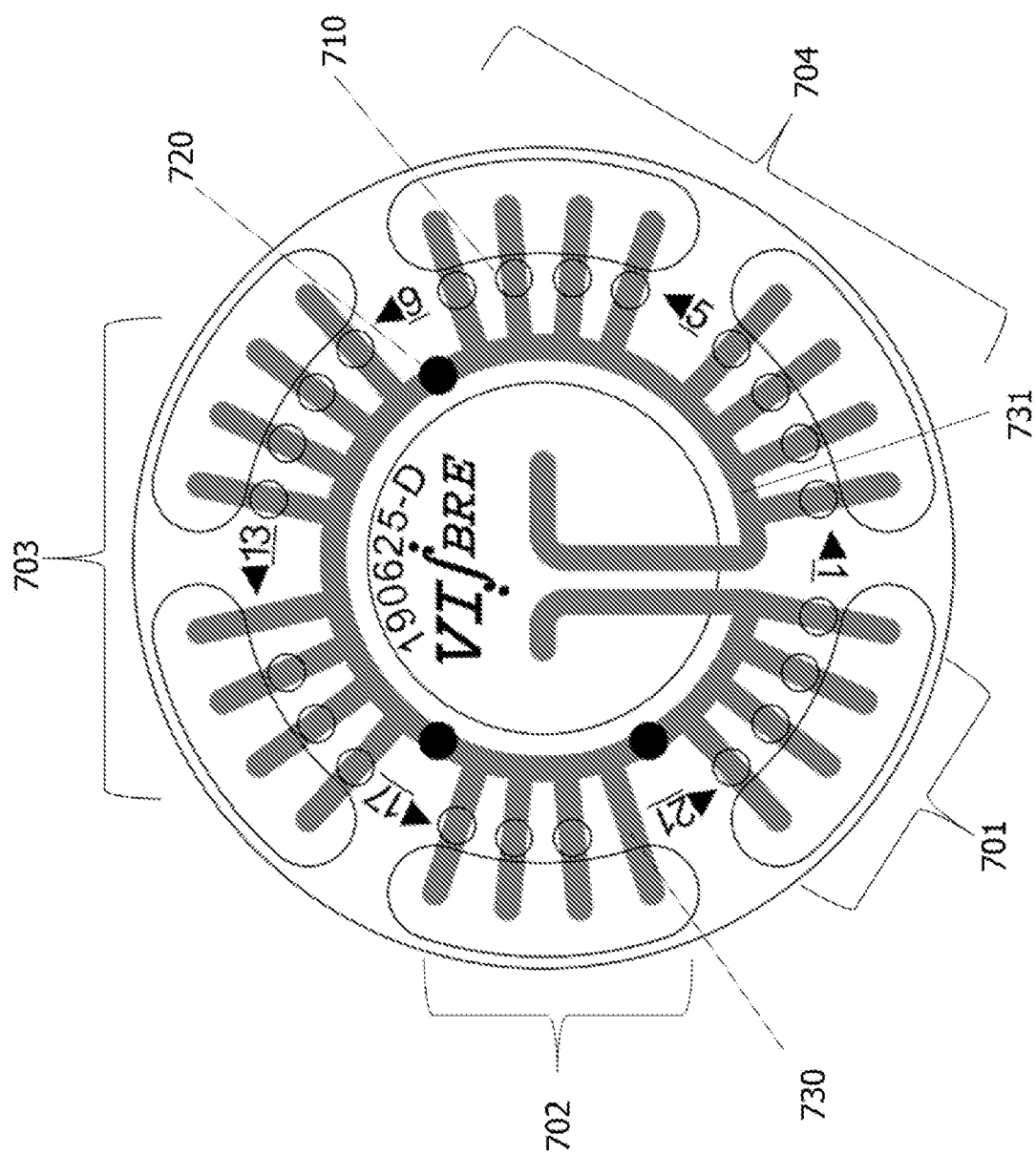
FIG. 7 shows an example of a configurable-manifold valve layout, wherein groupings of channels can be mutually isolated by non-actuated balls, allowing a plurality of isolated fluidic circuits to exist on a single chip.

FIG. 7 shows schematically another configuration of the 25-port valve fluidic described above. By utilizing a combination of actuated balls (that open and close the channel upon which they reside) such as 710, unactuated balls (the channel is always closed) such as 720, and absent balls (channel is always open) such as 730 and 731, a valve chip can be configured in many ways. FIG. 7 shows one such exemplary configuration wherein the device is split into four independent fluid-containing regions 701, 702, 703, and 704, each with its own inlet/outlet ports, common channel, and in this case a selection of actuated balls. The unactuated balls, denoted by filled circles, separate these regions while actuated balls shown by empty circles allow for dynamic flow control to or from the port in question. Any port or region can be designed such that a ball separates it from its neighbors. Each region acts as a manifold, allowing for the controlled splitting or combining of various fluids potentially including multiple inlets and multiple outlets spread over multiple port-containing protrusions. Depending on the actuator utilized with a given ball configuration, the appropriate balls may be actuated independently as in the typical 25-port embodiment, in pairs or groups as in a make-before-break design, and/or in sets such that each independent region is actuated the same, e.g., the first port of each region is open at the same time.

As with the enclosed pump cartridge, as shown in FIGS. 5A-5C, ease of cleaning, upgrading, and protecting the electronics are furthered by adding a matching enclosure around the valves. These valves allow for the direction of flow to or from a microfluidic channel/device and can be manufactured from elastomer in many different configurations and number of ports. These devices allow for the autonomous control software to flow specific chemicals and medias to various specific devices and, though use of multiplexing, approximate various concentration curves. This allows for the automation of various types of biological experiments, increasing repeatability and throughput. A selection of sample valve and pump fluidic designs are included in this document. These together allow for a novel level of experiment control and automation.

Figure 8A:
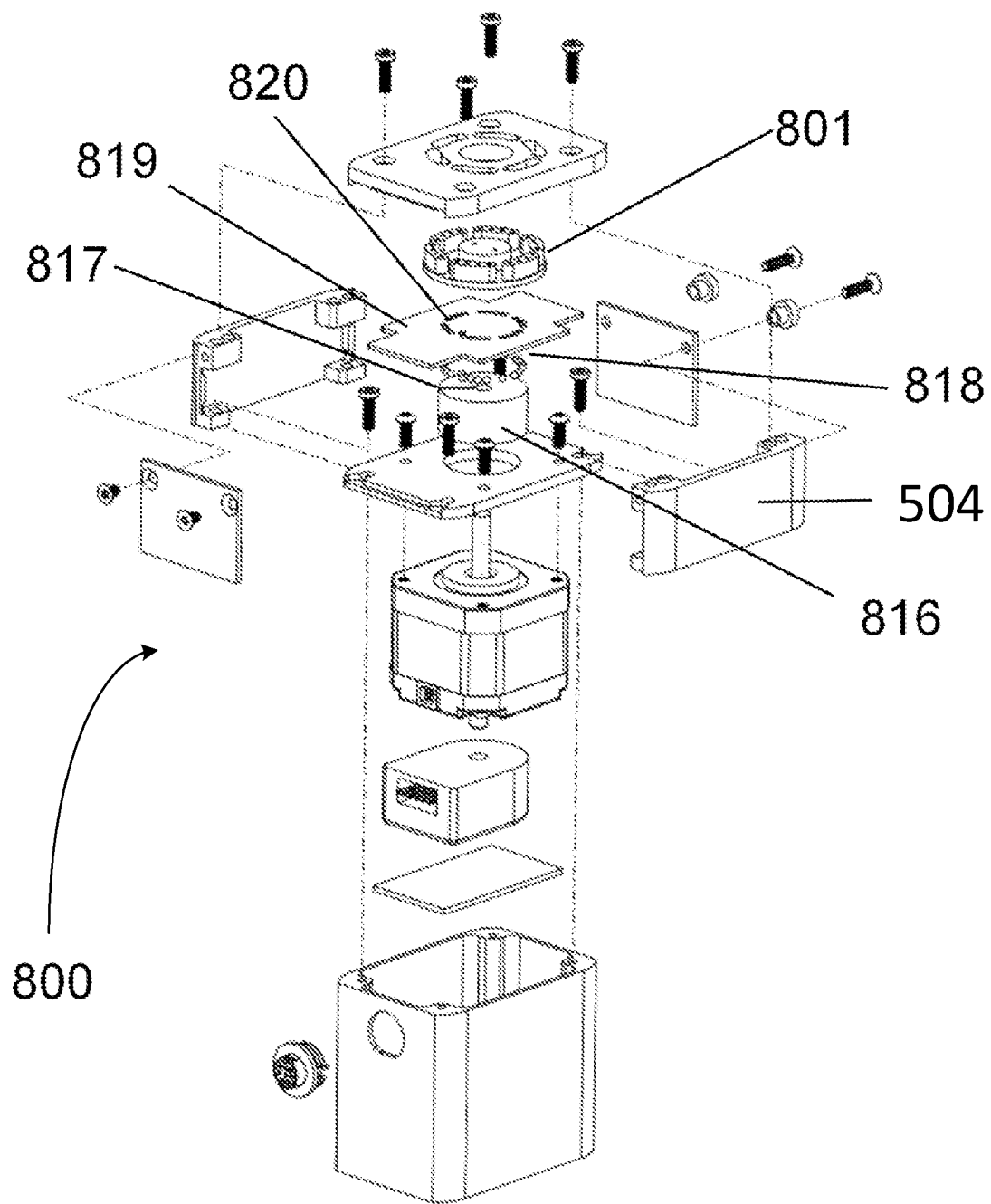
FIG. 8A shows an exploded view of the enclosed valve cartridge including a fluidic chip, actuator assembly, drive motor, encoder, controlling electronics, and housing parts, according to one embodiment of the invention.

Referring to FIG. 8A, an enclosed valve cartridge 800 is shown according to one embodiment of the invention. This configuration utilizes the position data provided by motor encoder 219 as noted in FIG. 5A to align valve actuator 816 in order to open specific channels in the valve fluidic 801.

Valve actuator 816 is a cylinder made from acetal resin or other material. Topography on the lower face of valve actuator 816, such as groove 817, pockets, or similar features, displaces balls 818 as actuator 816 is rotated. Ball cage 819 constrains movements of balls 818 to the vertical axis via holes 820 within which the balls reside. Ball cage 819 is constrained against interior edges of surrounding standoff plates/tabs/flanges 504, thereby preventing rotational movement of ball cage 819 and balls 818. The surrounding standoff plates/tabs/flanges 504 allows for multiple chip orientations while maintaining automatic and precise mechanical alignment.

Balls 818 that are forced down into the surface of fluidic chip 801 compress channels (not pictured here) positioned under them, thereby pinching off and closing those channels to fluid movement.

Figure 8B:
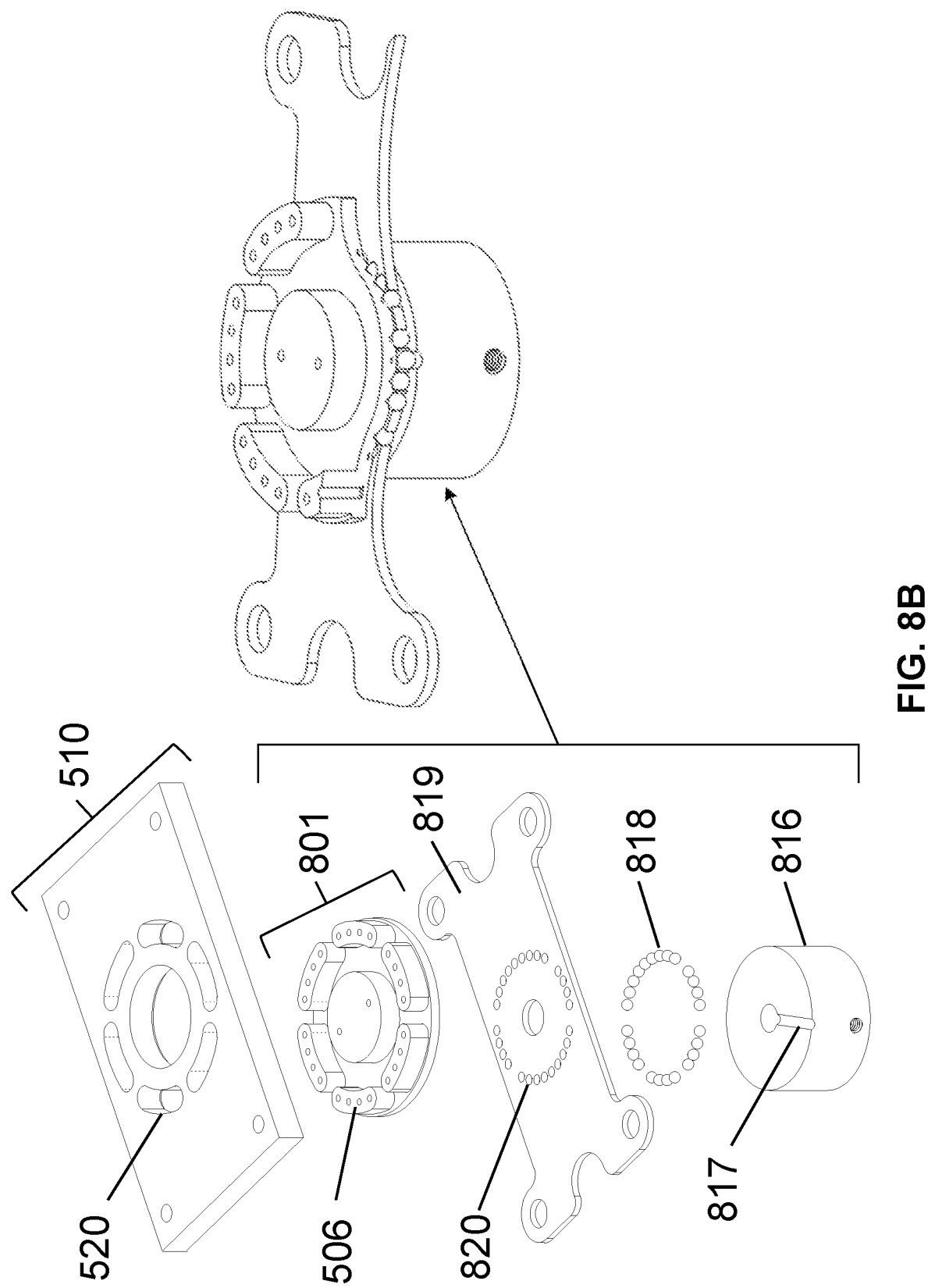
FIG. 8B shows a 25-port valve fluidic chip, valve actuator construct, and fluidic chip support plate, and their alignment and constrainment capability, and a valve assembly showing actuator balls in relaxed and compressed states, with the corresponding channels open and pinched closed, respectively, according to one embodiment of the invention.

FIG. 8B shows an exploded view of a 25-channel (port) valve and a valve assembly showing actuator balls in relaxed and compressed states, with the corresponding channels open and pinched closed, respectively, according to one embodiment of the invention.

FIGS. 8C-8D illustrate the function of the normally closed valve, which has upper layer 831 and the lower layer 832. Concave valve channel 833 was designed to match the contour of the actuator balls 834, which are held in place by the ball cage 835. Actuator 836 rotates around its axis 837 such that actuation pocket 838 is either above the ball 834, as shown in FIG. 8C, or not, as shown in FIG. 8D. When the pocket 838 is above the ball 834, the elastomeric upper layer 831 and the lower layer 832 are relaxed driven such that the channel 833 is open. When the actuator is rotated so that ball 834 is pressed into the two layers, the collapsed channel ceiling 839 closes the valve.

In other embodiments of both pumps and valves, the channel can be on the mating surface of the second layer of the device, such that the pressure from the roller compresses both the elastomer in the first layer and the material surrounding the channel in the second.

FIG. 8E is a perspective view of a circular through-plate 25-channel/port valve 801, showing actuated surface, working channels 833, registration/alignment protrusions 506, and interface ports 802, according to one embodiment of the invention.

Figure 8G:
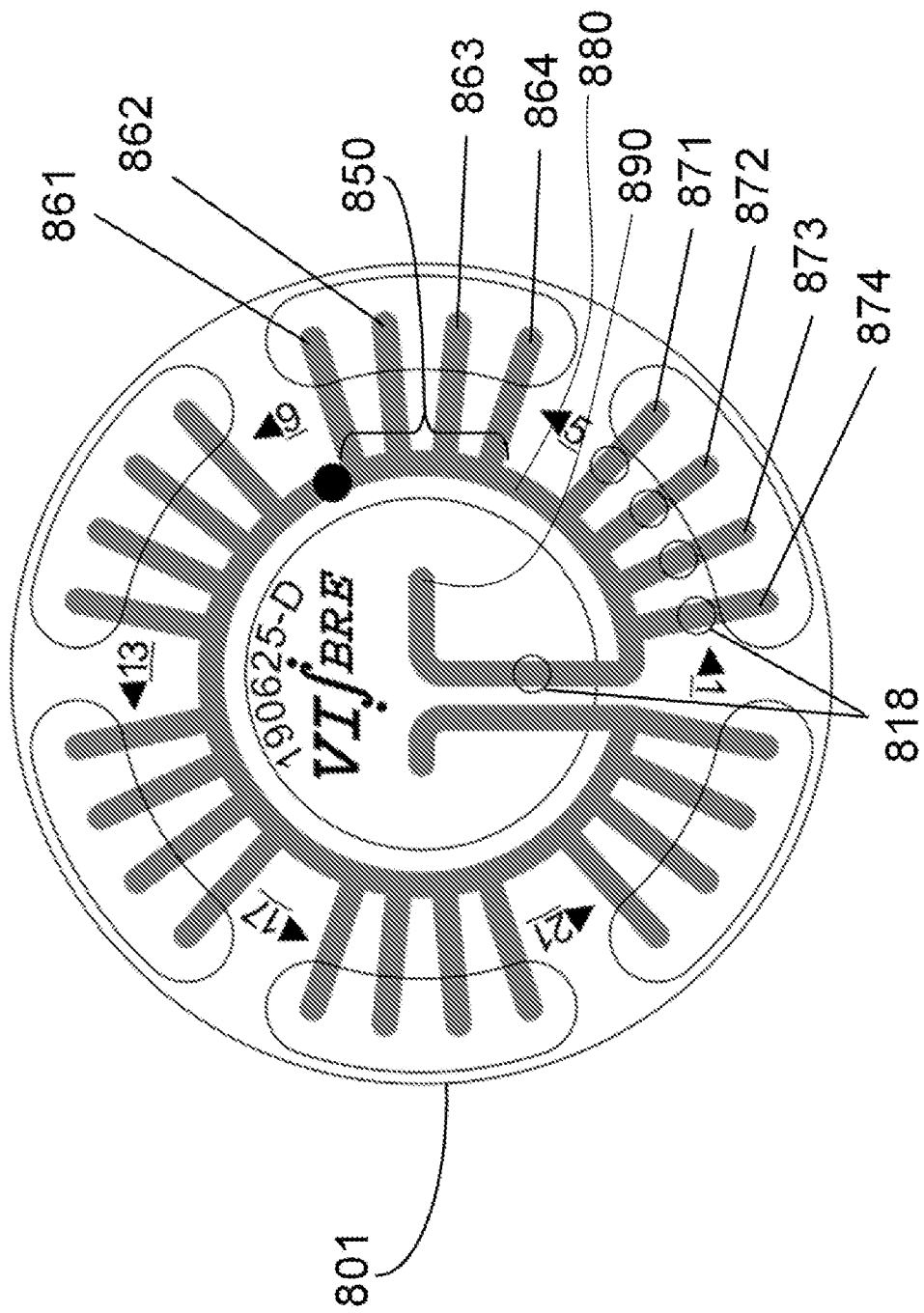
FIG. 8G shows a manifold valve according to one embodiment of the invention.

FIG. 8F shows a plan view of a 25-port valve 801 with identifying markings, e.g., "1", "5" . . . , and actuator ball locations 818, according to one embodiment of the invention. FIG. 8G shows 25-port valve chip 801 that is configured to operate as a multi-input multi-output manifold in which the insertion or elimination of actuating balls allows the use of valve ports to serve as multiport connection manifolds. In this embodiment, fluidic chip 801 is conceptually the same as that shown in FIG. 8E, with the exception that balls are missing from four locations 850. Aspiration pumps connected to output ports 861, 862, 863, 864 draw fluid containing, for example, drugs from supply ports 871, 872, 873, 874, through common channel 880. Input port 890 may be used to flush common channel 880 with drug-free media. Supply ports 871, 872, 873, 874, 890 are activated by balls 818, which are toggled by an actuator (not shown) as discussed elsewhere in this document. Ball 818 perpetually pinches off and creates the terminus of common channel 880, which is unused downstream of ball 818. One or more supply ports 871, 872, 873, 874, 890 may be switched on or off, as may aspiration pumps connected to output ports 861, 862, 863, 864, thereby facilitating a configurable, valved manifold system. Whereas peristaltic pumps may act as closed valves when they are not running, all output ports 861, 862, 863, 864 may be addressed independently, while supply ports 871, 872, 873, 874, 890 may be addressed independently or interdependently according to means of actuation. Valved channel 890 is used to deliver drug-free flush media. All other ports in the valve 801 are kept closed by having balls in them that are not accessed by the actuator.

Make-Before Break Valves

In some implementations of a multichannel perfusion system, it is useful to be able to select between two different reservoirs for the supply of the perfusion medium and drugs to the cells in the wells, as would occur in the course of long-term perfusion of printed tissue, for example with and without growth factors or drugs or toxins.

Suppose, for example, a situation in which eight single-channel pumps or one eight-channel pump are being used deliver drugs to each of eight wells in a 24 or 96 well plate. If the media or drugs delivered to each well are not identical, eight RPVs would normally be used to select which drug is delivered to each well. Synchronous operation of the RPPM and any normally-closed RPV would require that the pump did not apply pressure to a closed channel in the RPV, requiring that the pump be turned off before a downstream valve is switched. The solution to this is to create an open-before-close valve as illustrated by the two-by-eight valve illustrated conceptually in FIGS. 9A-9D. This valve can also be described as a make-before-break (MBB) valve. The key feature of this valve is that the recesses 920 in the surface 910 of the actuator 916 are ovoid (FIG. 9L) rather than circles of radial lines. This enables make-before-break connections, so that the pump can remain running while the valve is being switched from Input A to Input B without exposing the valve to the large pressure spike that would occur when a running pump encountered a transiently closed channel.

Figure 9A:
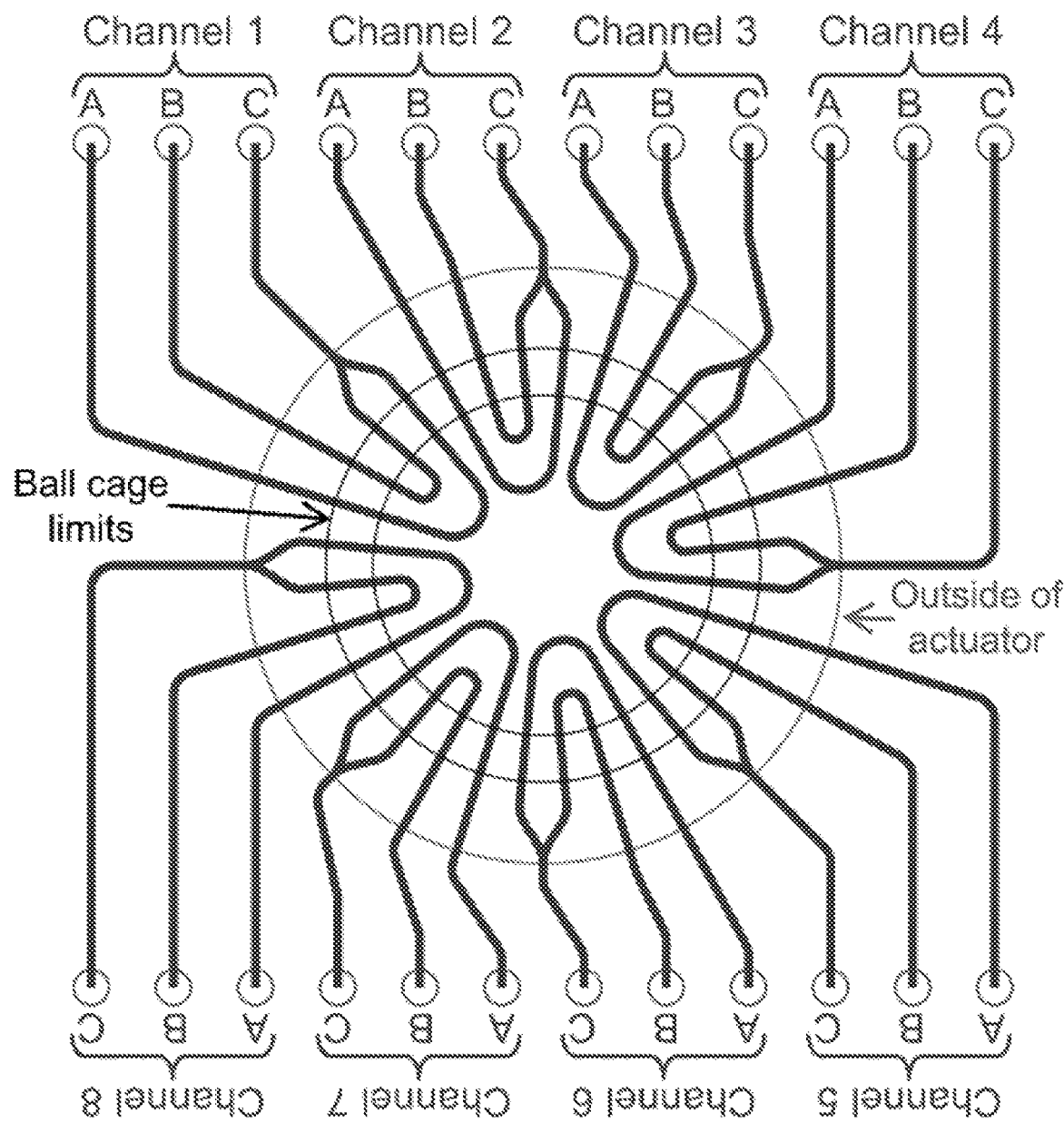
FIG. 9A illustrates one layout of the two-by-eight open-before-close RPV according to one embodiment of the invention.
Figure 9E:
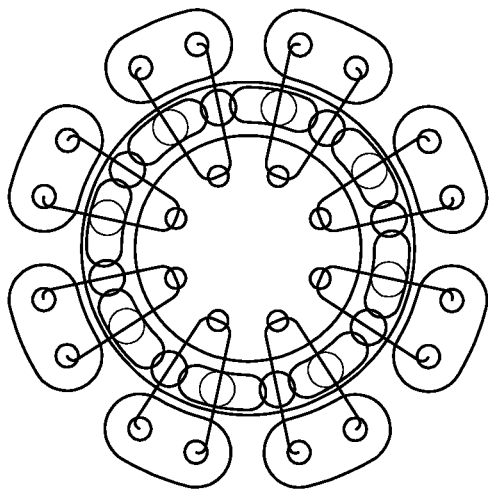
FIG. 9E-9G shows line drawings and FIG. 9H-9J shows photographs that illustrate the three positions of a two-by-eight open-before-close RPV implemented using a through-plate circular fluidic chip according to one embodiment of the invention.
Figure 9F:
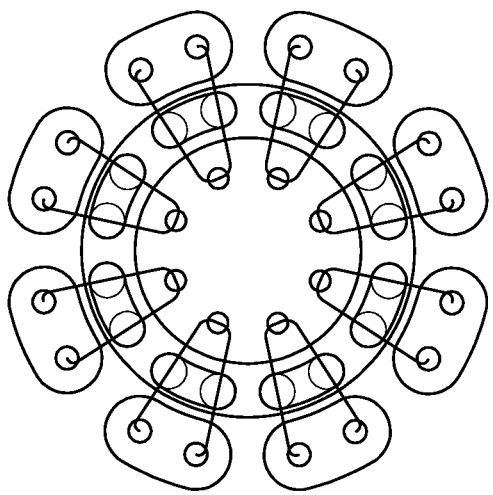
Figure 9G:
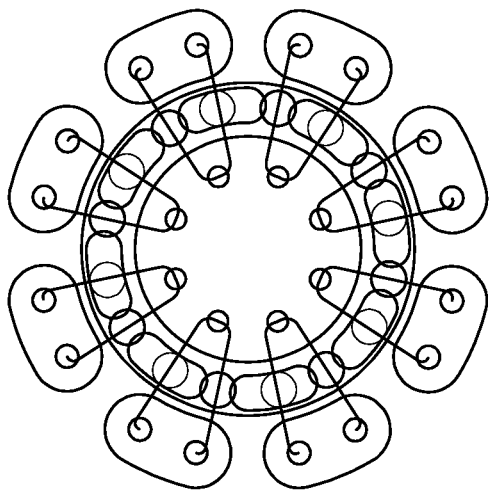
Figure 9H:
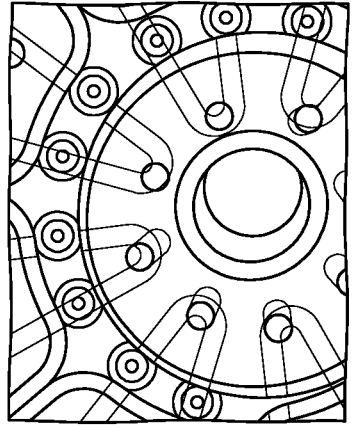
Figure 9I:
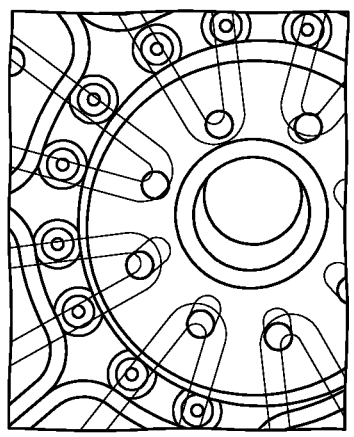
Figure 9J:
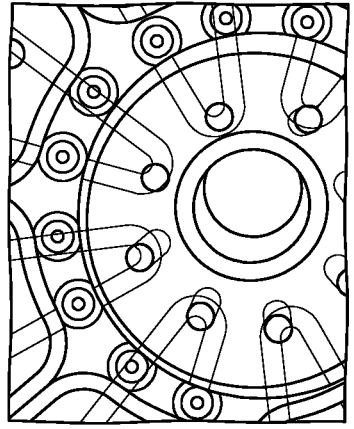

FIG. 9A shows schematically a valve having eight channels, Channels 1-8, where each channel has two inputs A and B and an output C, according to one embodiment of the invention.

FIGS. 9B-9D show how the switching of the actuator is accomplished by controlling the angle of the actuator, which has tangential ovoid actuation recesses 920 into which the balls 918 rise to create an open channel in the normally closed RPV. The ovoid shape ensures that there is no "off" position while switching from A to B where both input channels could both be closed at the same time. The eight-pole, triple-throw (A, AB, B) valve shown is designed for 16 inputs and 8 outputs. Each output can include a mixture of its two inputs at the same time, or exclusively one input or the other input, depending upon the speed with which the valve is switched from one position to another, or held in either A or B or midway between the two. An actuator can be oscillated or rotated to achieve multiplexing of input solutions. With this design, there is no need to shut off the pump during valve-switching operations.

FIG. 9B shows a first valve state of which the actuator is positioned such that only one ball (denoted by a white circle) 918 is located over the channel of input A in the ovoid actuation recesses 920, which no force is imposed on the channel of input A by the inner ball so as to allow a fluid flow through the channel input A, and one ball (denoted by a black circle) 918 is located over the channel of input B outside the ovoid actuation recesses 920, which a force is imposed on the channel of input B by the outer ball so as to occlude a fluid flow through the channel input B. Accordingly, input A is fluidically connected to output C and input B is fluidically disconnected to output C in each of the eight channels.

FIG. 9C shows a second valve state of which the actuator is positioned such that two balls (denoted by a white circle) 918 are located over the channels of inputs A and B in the ovoid actuation recesses 920, which no force is imposed on the channel of inputs A and B by the inner balls so as to allow fluid flows through the channel inputs A and B. Accordingly, both inputs A and B are fluidically connected to output C in each of the eight channels.

FIG. 9D shows a third valve state of which the actuator is positioned such that only one ball (denoted by a white circle) 918 is located over the channel of input B in the ovoid actuation recesses 920, which no force is imposed on the channel of input B by the inner ball so as to allow a fluid flow through the channel input B, and one ball (denoted by a black circle) 918 is located over the channel of input A outside the ovoid actuation recesses 920, which a force is imposed on the channel of input A by the outer ball so as to occlude a fluid flow through the channel input A. Accordingly, input A is fluidically disconnected to output C, while input B is fluidically connected to output C in each of the eight channels.

Other embodiments of this approach are possible. The direction of the flow through the valve can be reversed so that a single input can be directed either of two outputs.

FIGS. 9E-9G and FIGS. 9H-9J (photographs of the valve) illustrate equivalent positions for an eight-pole, two-throw valve using a circular, through-plate fluidic chip according to embodiments of the invention.

Figure 9K:
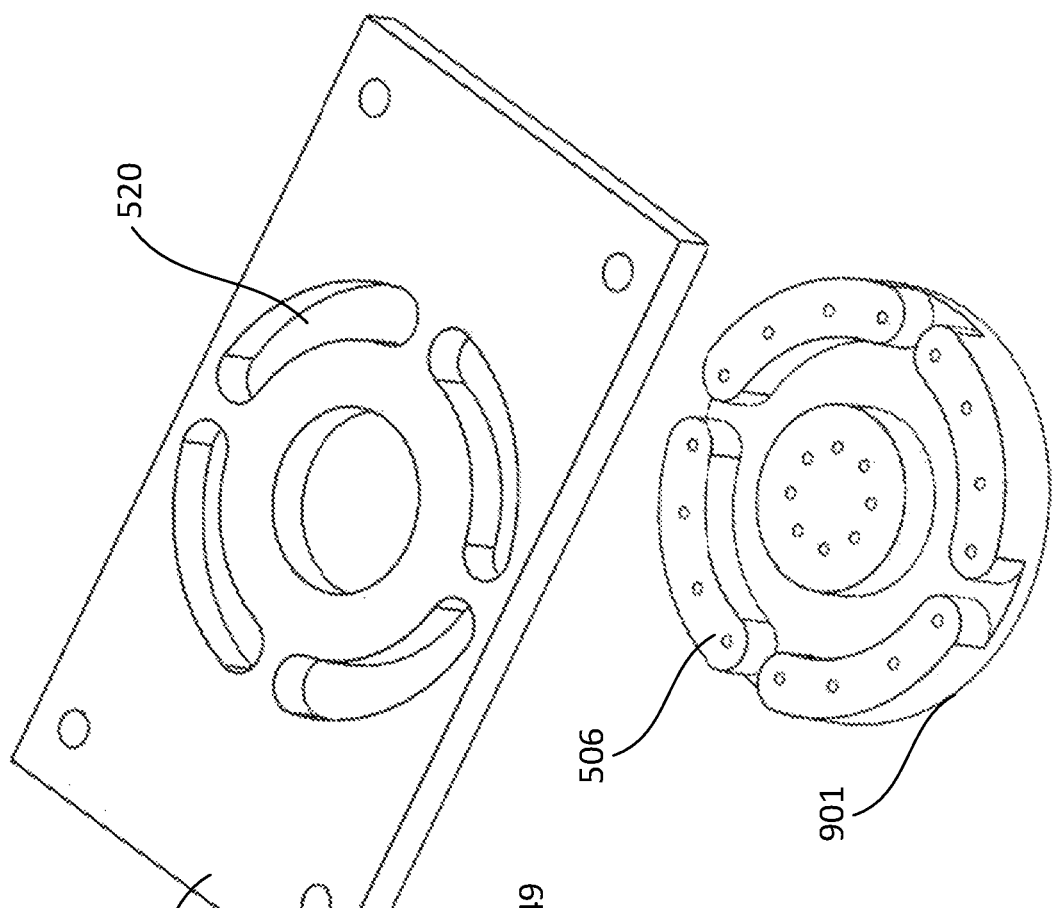
FIG. 9K shows the fluidic chips support plate with segmental openings and the circular, through-plate fluidic chip for the two-by-eight normally closed RPV according to one embodiment of the invention.
Figure 9L:
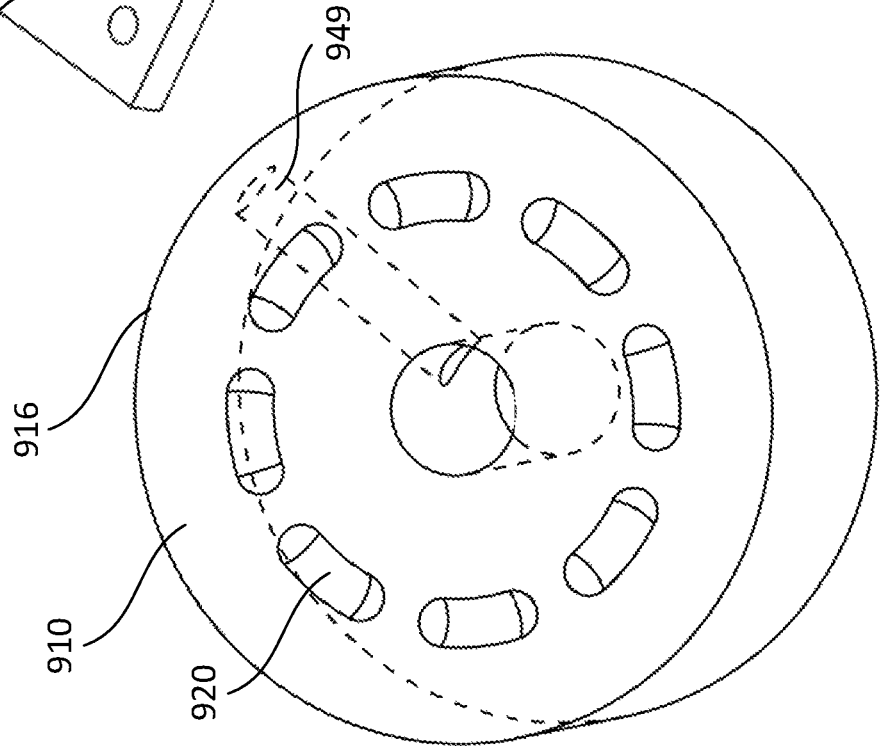
FIG. 9L shows the valve actuator with eight actuator grooves as required for operation of a normally closed RPV according to one embodiment of the invention.

FIG. 9K shows a fluidic chip support plate/structure 505 with segmental openings 520 and the circular, through-plate fluidic chip 901. FIG. 9L shows the valve actuator drivehead 916 with a threaded set-screw hole 949 with eight grooves 920 formed in the surface 910 of the actuator drivehead 916, as required for operation of a normally-closed RPV. Each of these grooves 920 is a segment of a circle as required for the open-before-closed operation.

Figure 10D:
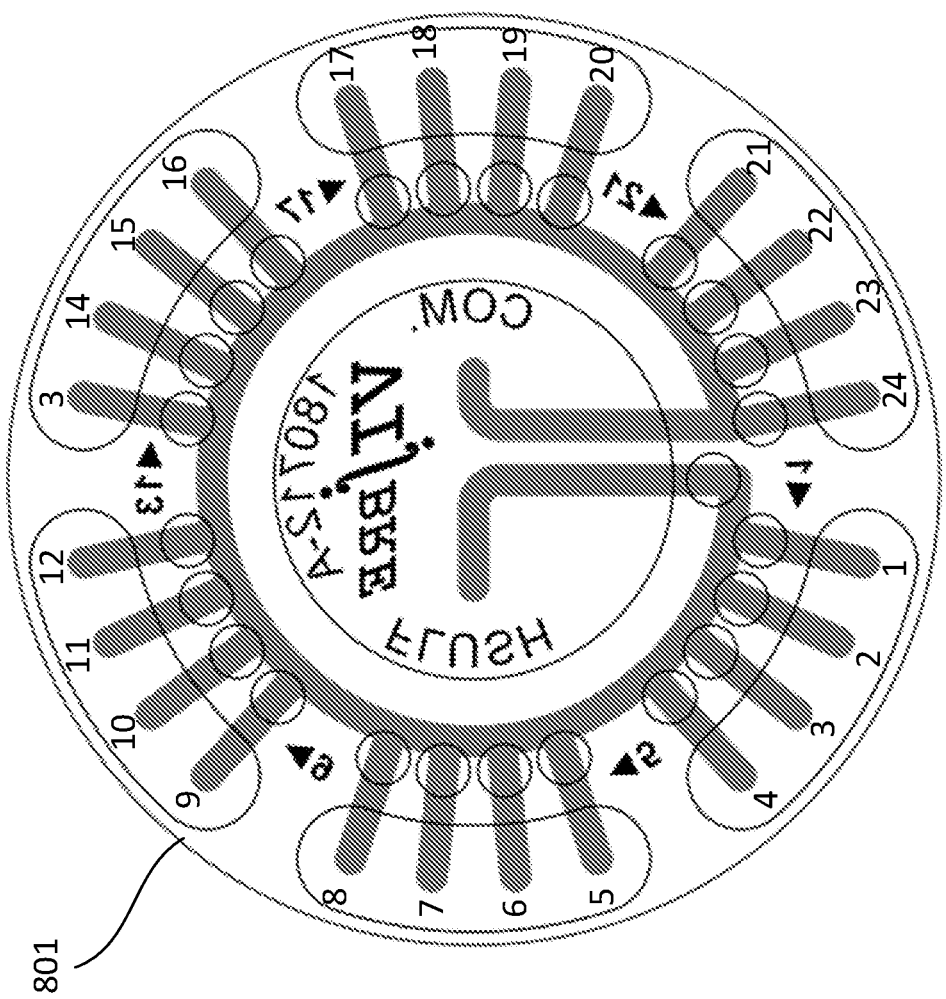

FIG. 10A shows a make-before break (MBB) valve 1000 by utilizing an standard 25-port valve chip 801 (FIG. 10D) according to embodiments of the invention. MBB means there is no actuator position in which all ports are closed. FIG. 10B shows an actuator 1016 for the MBB valve 1000.

FIG. 10C shows operations of the MBB valve 1000 using one pair of ports only by rotating the actuator 1016 at predetermined positions. Additional groups of ports may be added/valved similarly on the same chip. Always-depressed balls may be incorporated to isolate these groups. Valved ports do not need to be in pairs (of two)—concept may be applied to 3 or 4 ports per group, or more depending on chip layout.

Arc shapes pictured represent pockets/depressions in actuator. Balls that fall into pockets result in open channels. Balls that do not fall into pockets (actuated balls) result in closed (pinched-off) channels. Ball positions/locations, pocket shapes may be adapted for various functionalities. Pockets feature gradual roll-on/-off ramps to reduce torque effects of spring-loaded balls In this mock-up, the MBB concept is applied to an existing 25-port valve chip as shown in FIG. 10D. There are six individual fluidic circuits as shown in FIG. 10C, each is accessed through that circuit's respective port group (not shown, always-depressed balls isolating the six circuits). Ports 2, 6, 10, 14, 18 and 22 serve as group-specific commons. Ports 1, 5, 9, 13, 17, and 21 open in unison, as do ports 3, 7, 11, 15, 19, 23. Ports 4, 8, 12, 16, 20, and 24 are not used in this embodiment, but they may be used for flushing purposes in some configurations.

In other embodiments, the actuator can have different numbers of grooves with different arc lengths.

In other embodiments, the valve chip can have more than 25 ports.

In other embodiments, the valve chip can have fewer than 25 ports.

In other embodiments, the angular spacing between the actuation points can be adjusted for different applications.

Ribbon Connectors

Figure 11A:
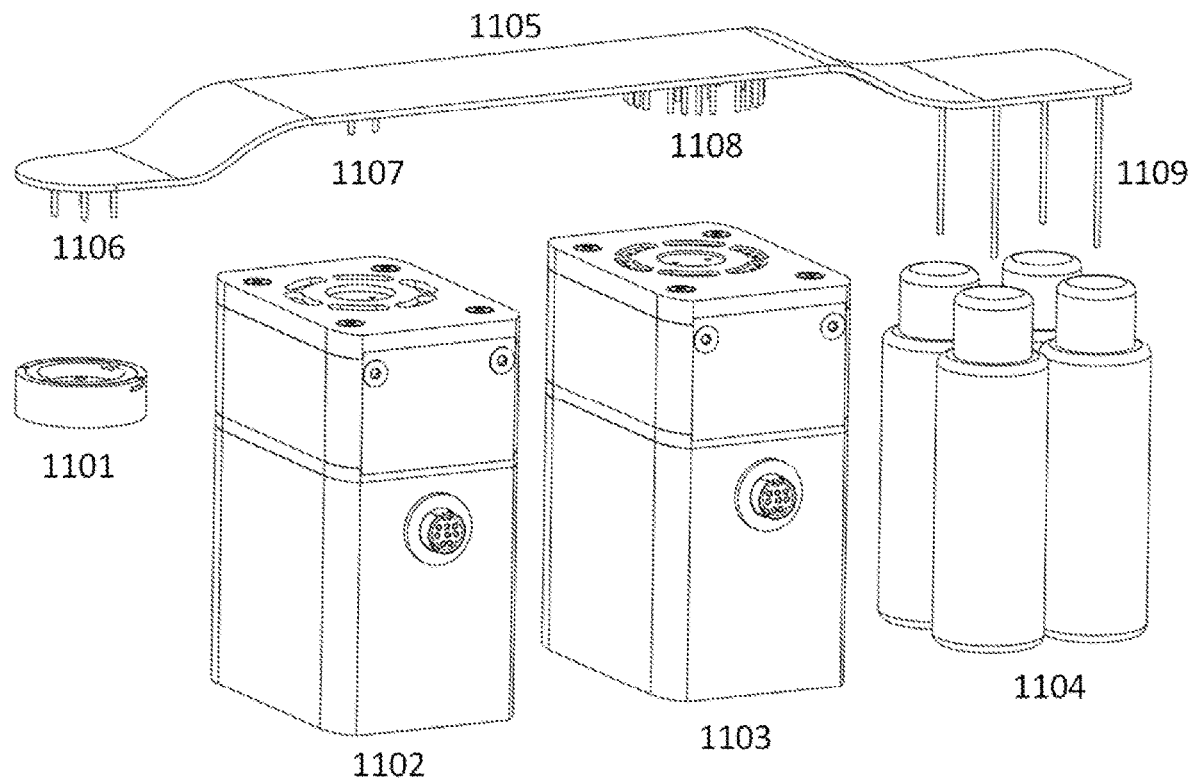
FIG. 11A shows a ribbon fluidic connector that positioned to join a Puck bioreactor, two motor cartridges and four vials containing drugs, media, or waste, according to one embodiment of the invention.

The large number of fluid-carrying tubes in many applications complicates the assembly, use, and maintenance of pump-valve systems. The cartridge and through-plate fluidics approach can simplify this by the fabrication of fluidic ribbon connectors that mate to cast-in-place ports in both the bioreactors and the pump and valve fluidic chips. FIG. 11A shows one embodiment of this approach. Bioreactor 1101 needs to be connected to valve cartridge 1102, pump cartridge 1103, and multiple reservoir cartridges 1104. This can be accomplished with ribbon connector 1105 that has as an integral part bioreactor connector tubes 1106, valve connector tubes 1107, pump tubes 1108, and reservoir tubes 1109. The pattern of channels in ribbon connector 1105 determines the connectivity of all of the various components to provide the desired fluid from to and from the bioreactor 1101 and the four reservoirs 1104.

Figure 11B:
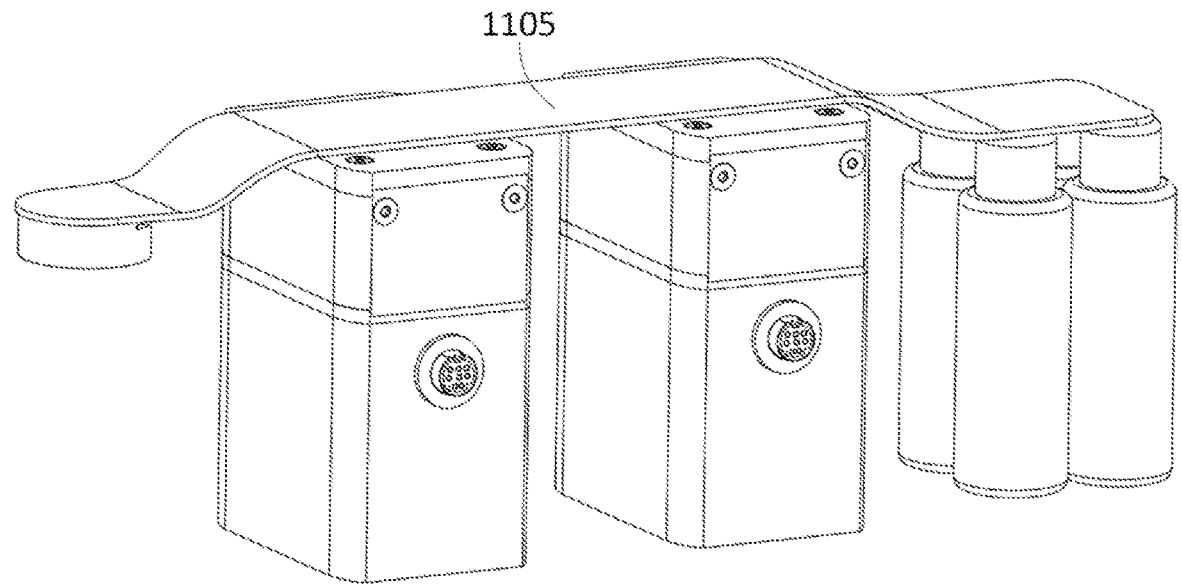
FIG. 11B shows the ribbon fluidic connector with its needle inserted into the appropriate ports to interconnect a Puck bioreactor, two motor cartridges, and four vials containing drugs, media, or waste, according to one embodiment of the invention.

FIG. 11B shows how the ribbon connector 1105 can be lowered onto the other components, with each of the pin inserted into the corresponding ports on each device.

FIG. 11C shows how an accessory as described above can be positioned between a pump or valve cartridge and a ribbon connector. Accessory 1110 has connector tubes 1120 that insert into the corresponding ports on circular fluidic chip 1111 that is held in place by fluid support plate 1112. The fluidic chip 1111 is operated by actuator 1130. The ribbon connector 1105 has connector tubes 1106 that insert into the accessory 1110 to complete the fluidic pathways.

Figure 11D:
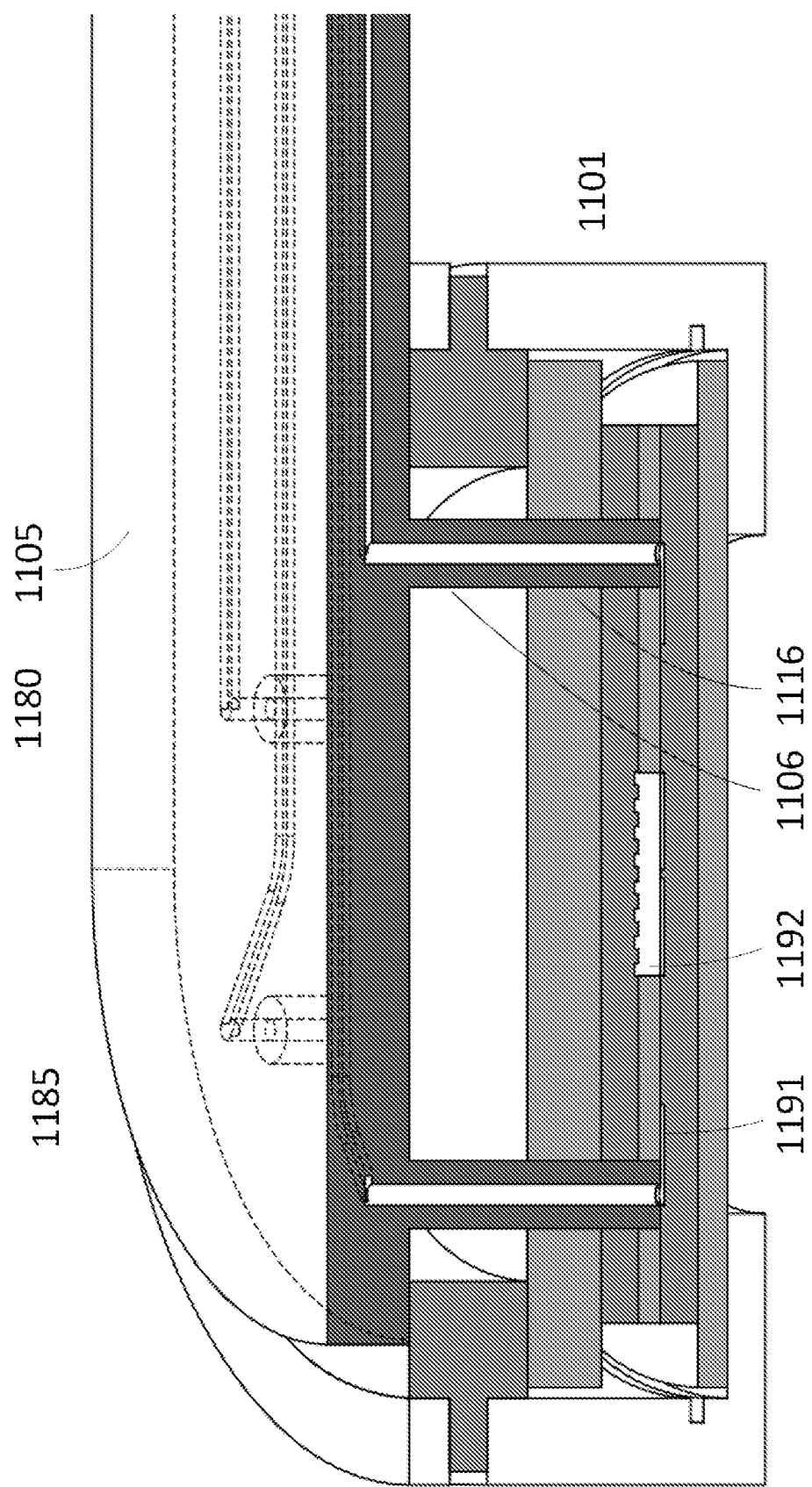
FIG. 11D shows a ribbon fluidic interface connector that could run between pump and valve cartridges and the fluidic chip connection needles in a µformulator, according to one embodiment of the invention.

FIG. 11D shows the details of the interface between a bioreactor 1101 and the ribbon connector 1105. Channels 1180 in the ribbon connector terminate in connector ports 1185, into which are inserted connector tubes 1106. This tubes mate with the corresponding tubing ports 1116 in the bioreactor 1101, so that fluid can flow through the tubes into bioreactor channels 1191 and into and then out of bioreactor chamber 1192.

Pump-Valve (P-V) Systems: Integrated Puck-Pump System

Figure 12A:
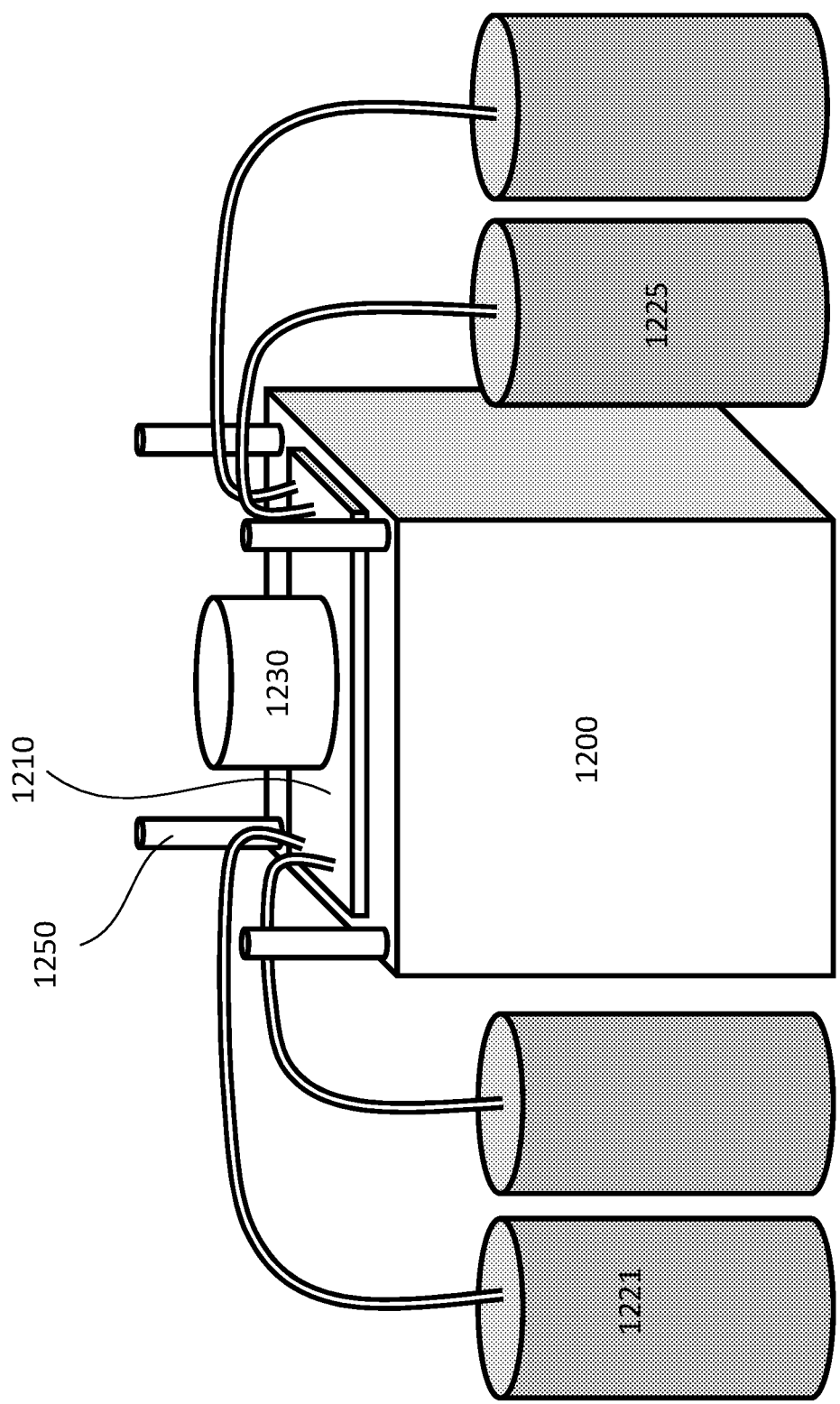
FIG. 12A shows how the Puck NVU bioreactor can be merged with the through-plate fluidic with an interface fluidic and enclosed motor cartridge to provide a compact means of pumping fluid from input reservoirs, through the NVU, and then to output reservoirs according to one embodiment of the invention.
Figure 12B:
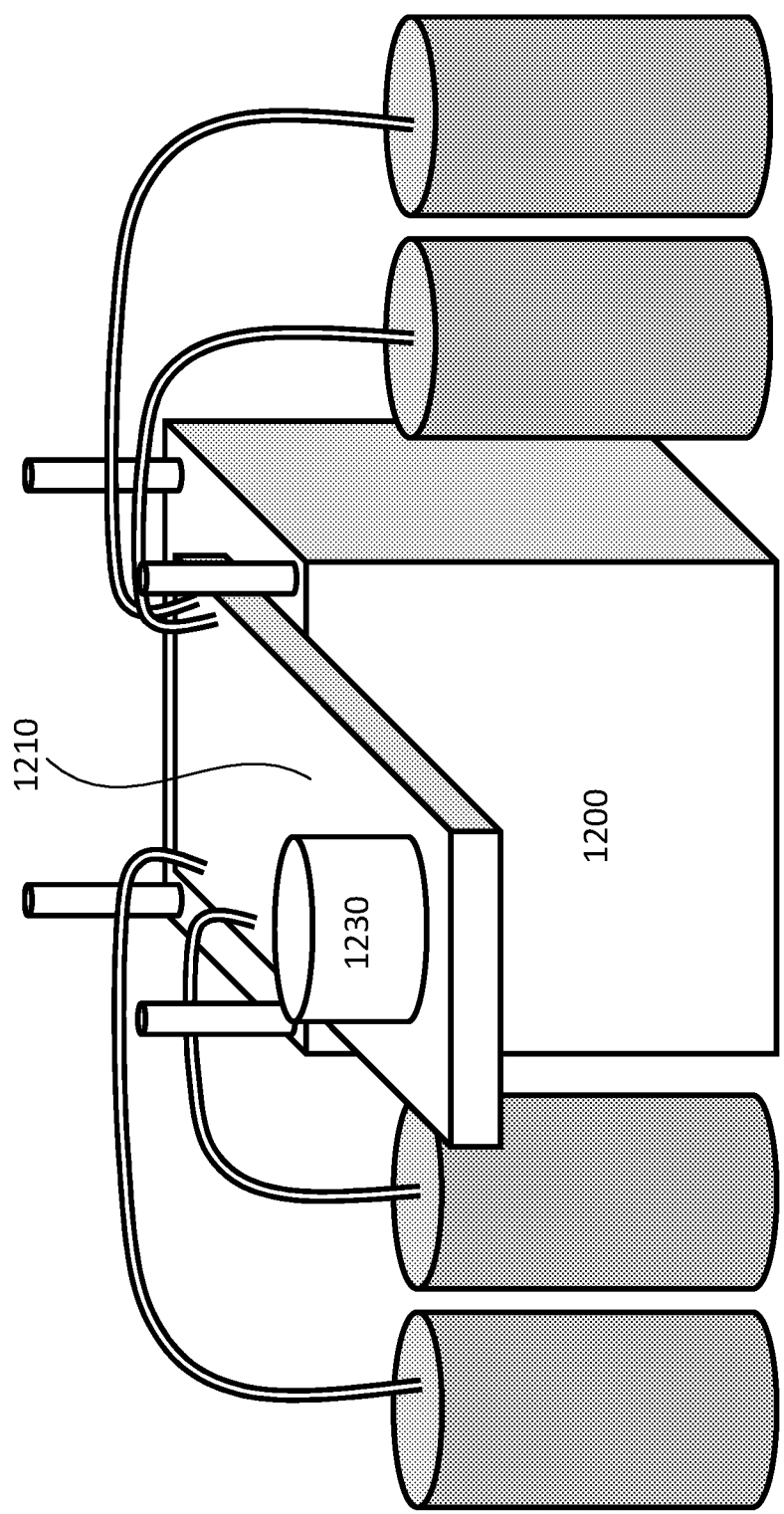
FIG. 12B shows slightly different embodiment of FIG. 12A where the interface fluidic allows the NVU to extend beyond the motor cartridge for microscopy according to one embodiment of the invention.
Figure 12C:
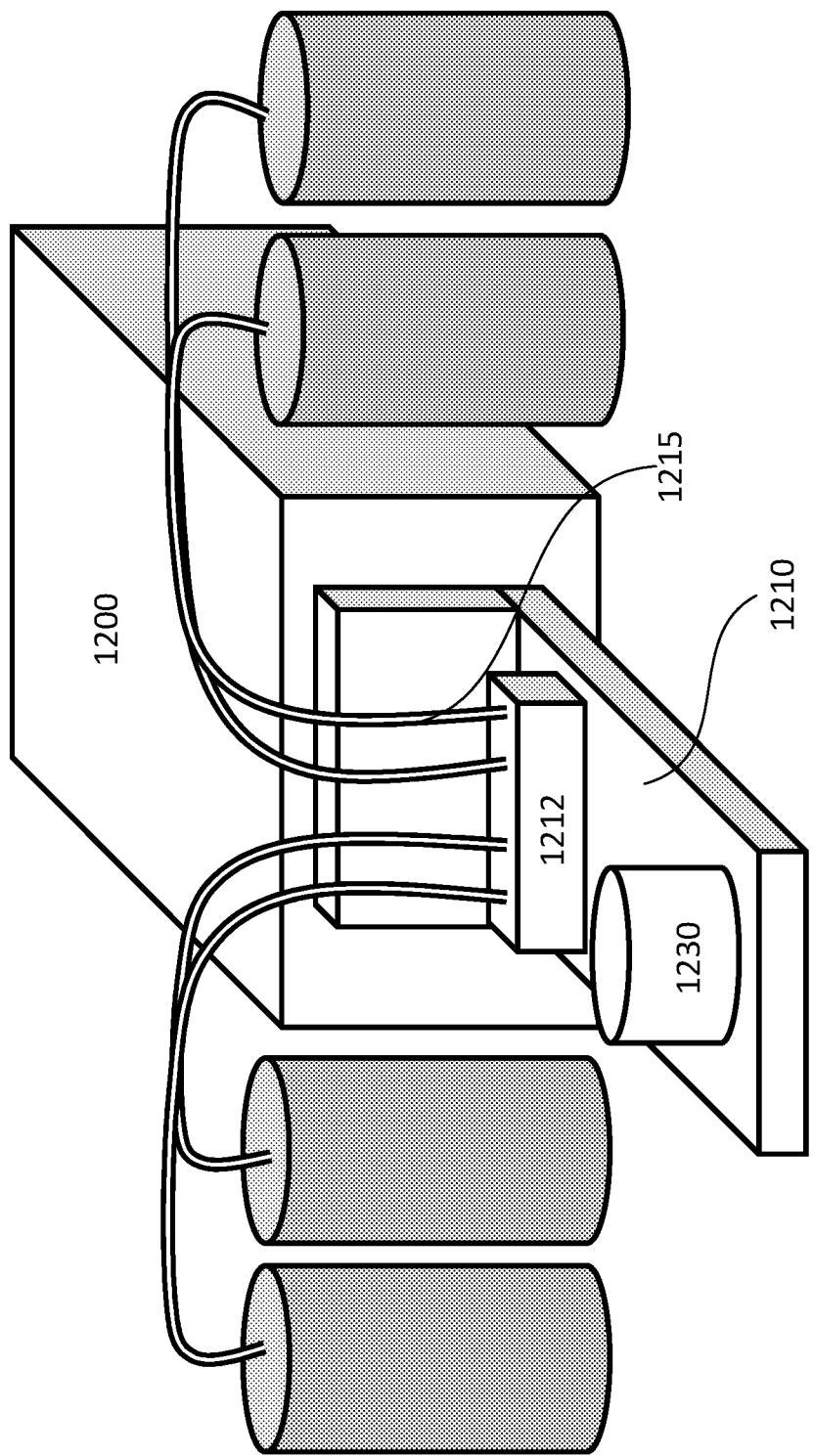
FIG. 12C shows a third embodiment where the interface fluidic is in the form of a ribbon fluidic with integral tubing ports such that the motor cartridge is horizontal according to one embodiment of the invention.

FIG. 12A shows how the Puck neurovascular unit (NVU) bioreactor 1200 can be merged with the through-plate fluidic with an interface fluidic 1210 and enclosed motor cartridge 1230 to provide a compact means of pumping fluid from input reservoirs 1221, through the NVU, and then to output reservoirs 1225. Standoffs 1250 allow the device to operate inverted as may be needed to seed certain cell types in particular NVU compartments. FIG. 12B shows slightly different embodiment where the interface fluidic 1210 allows the NVU 1200 to extend beyond the motor cartridge 1230 for microscopy. FIG. 12C shows a third embodiment where the interface fluidic 1210 is in the form of a ribbon fluidic 1212 with integral tubing ports 1215 such that the motor cartridge 1230 is horizontal.

Figure 13A:
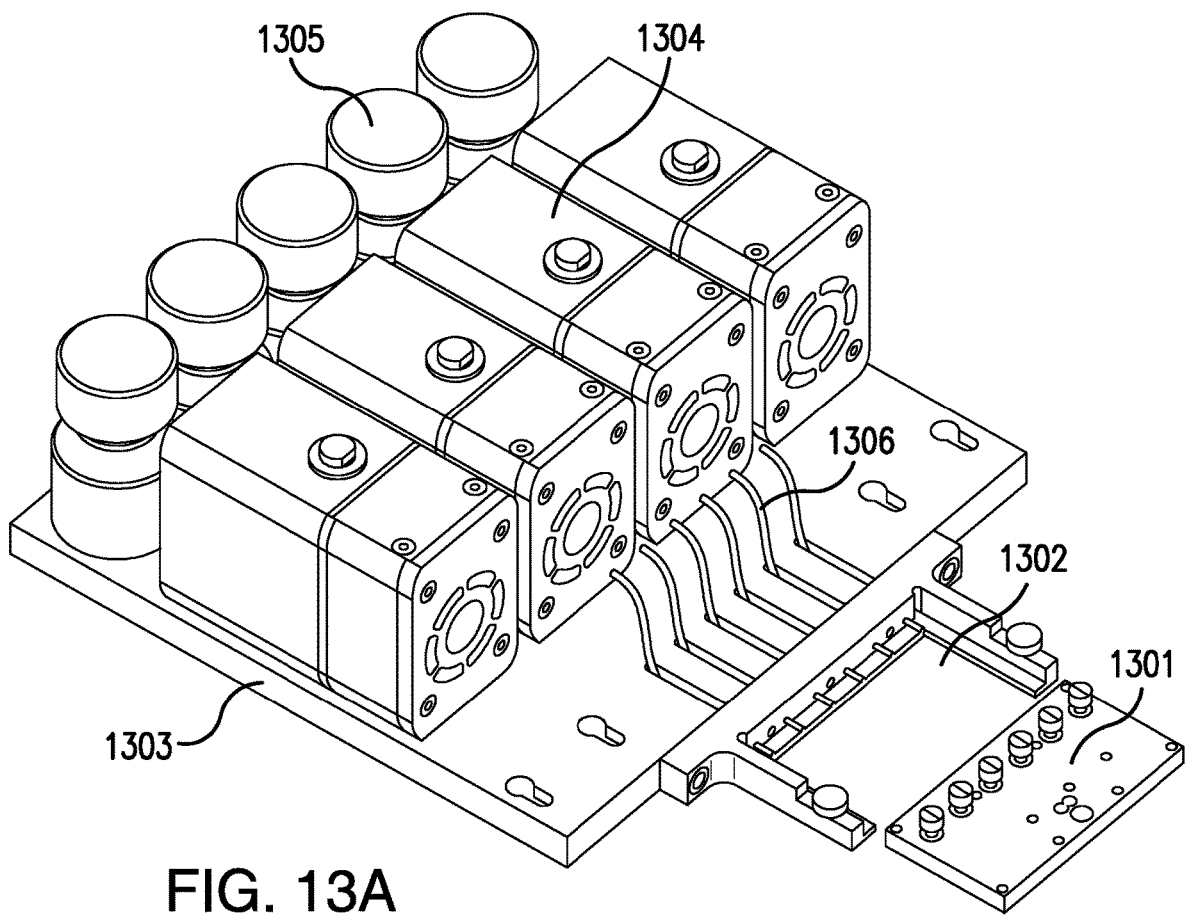
FIG. 13A shows how circular through-plate fluidic chip RPPMs and PRVs can be interfaced to the Nortis three-chamber bioreactor according to one embodiment of the invention.
Figure 13B:
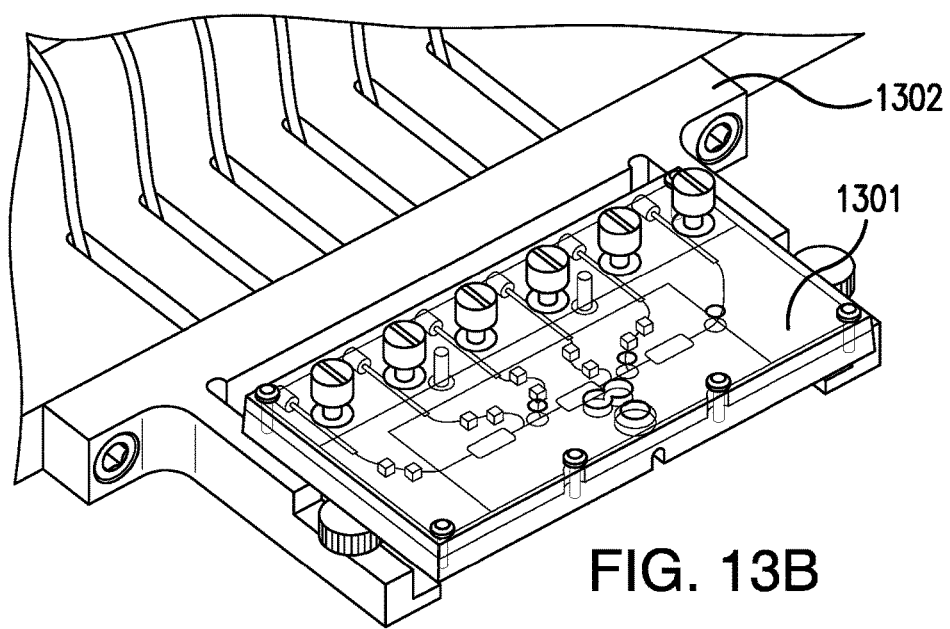
FIG. 13B shows the Nortis chip inserted into the chip receptacle according to one embodiment of the invention.
Figure 13E:
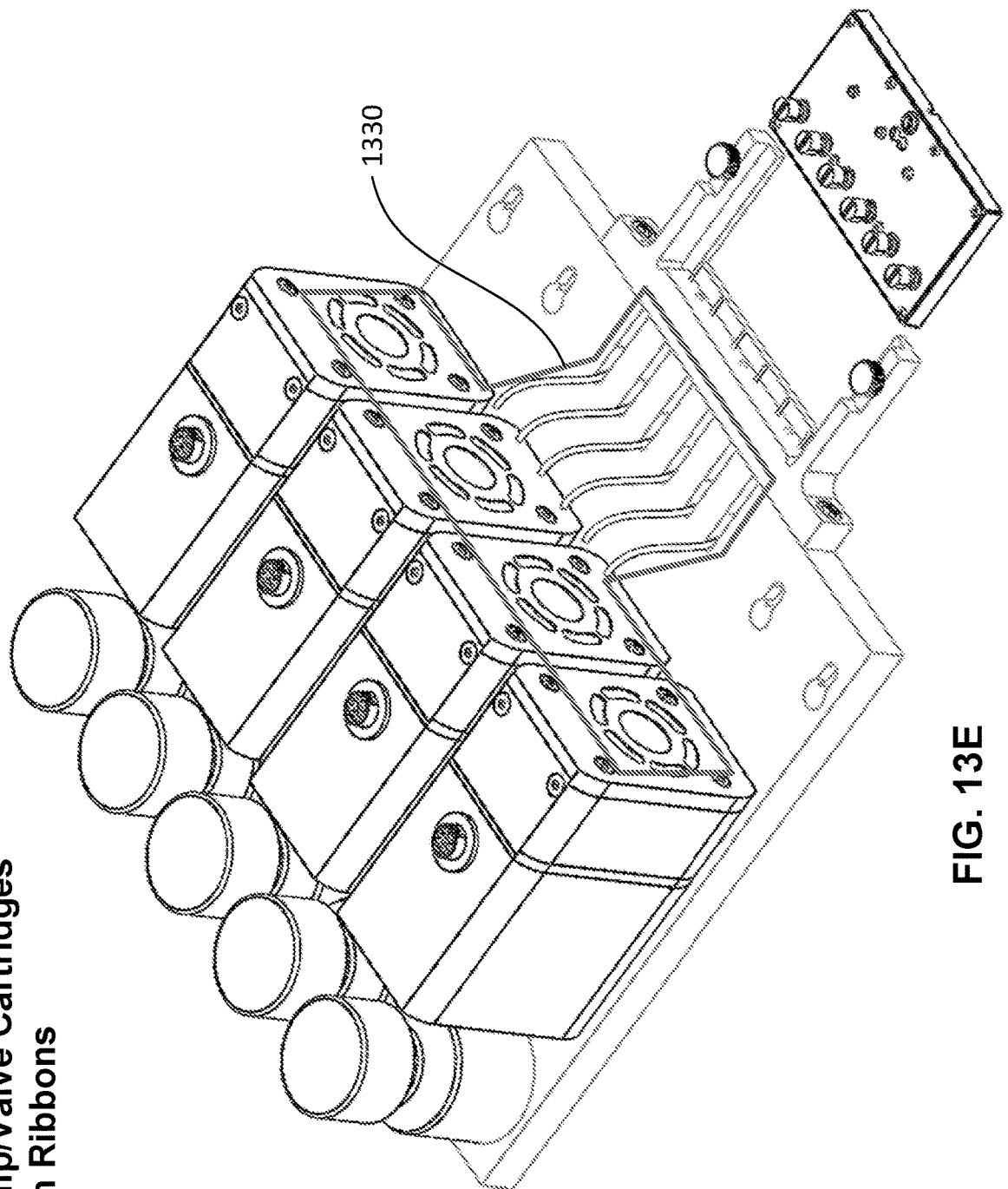
FIG. 13E shows how circular through-plate fluidic chip RPPMs and PRVs and ribbon fluidic connectors can simplify the interface to the Nortis three-chamber bioreactor according to one embodiment of the invention.

FIG. 13A shows the configuration of pump and valve cartridges to serve as s perfusion controller for the Nortis organ-on-chip device 1301, which is inserted into the Nortis chip holder 1302, which in turn is mounted to base 1303. Pump and valve motor cartridges 1304 are connected to the Nortis chip by tubing 1306, and to reservoir vials 1305 by tubing that is not shown. FIG. 13B is a rendering of the Nortis chip with its internal fluidic channels inserted into the holder. FIGS. 13C and 13D show exploded and assembled views of the Nortis chip and its holder, and the needles, tubing, ferules, and clamps used to hold the components in place. FIG. 13E shows how the assembly in FIG. 13B can have the tubing replaces by a fluidic connector 1330.

Figure 14A:
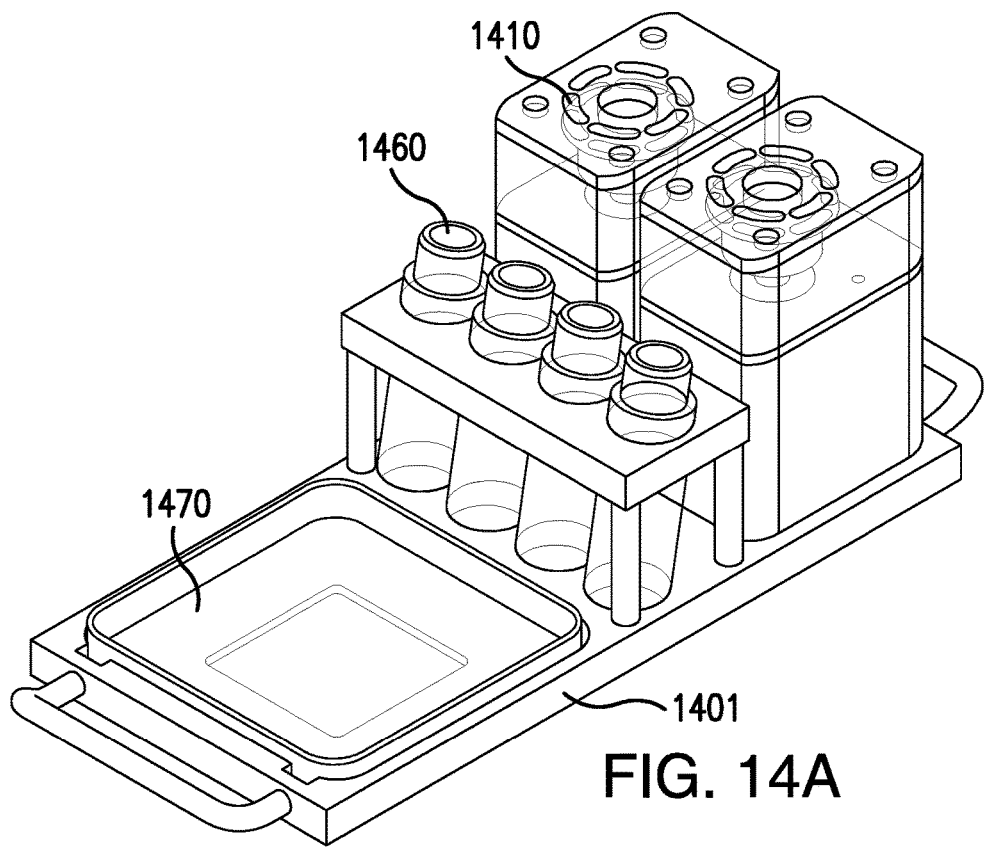
FIGS. 14A-14B show a perfusion controller/NVU caddy according to one embodiment of the invention
Figure 14B:
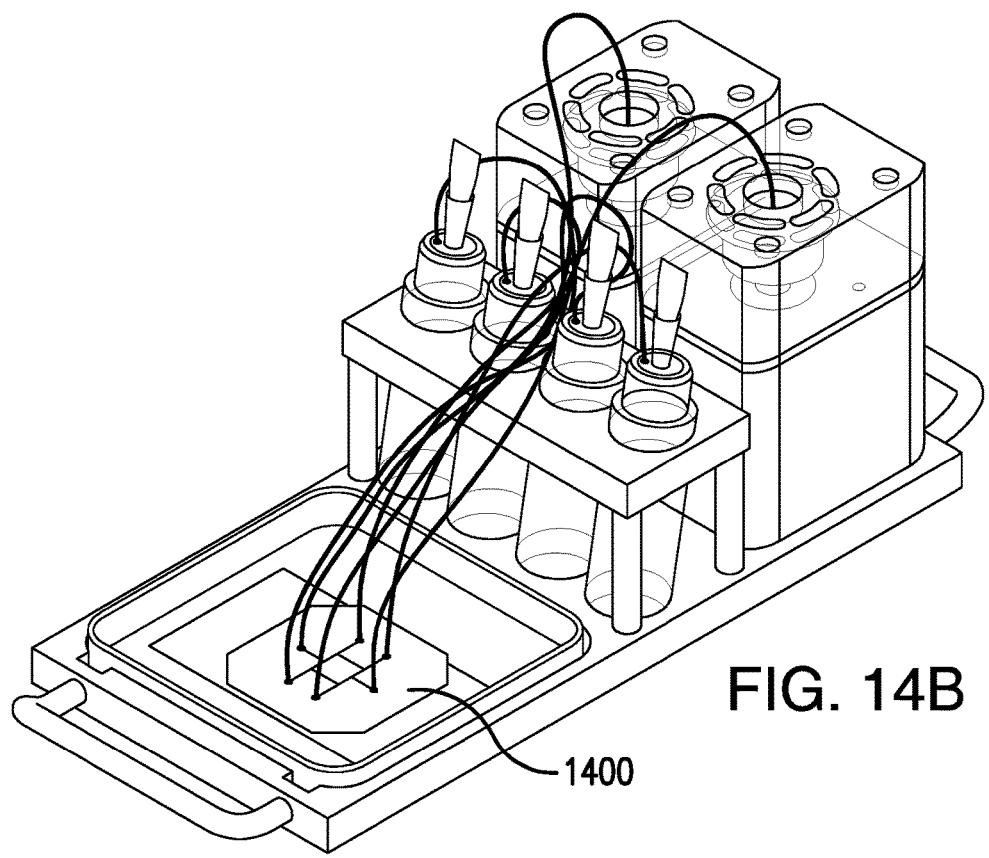

FIGS. 14A-14B show a perfusion controller/NVU caddy according to one embodiment of the invention. In this exemplary embodiment, the perfusion controller/NVU includes two pumps 1410, and four vials 1460 positioned at about 10° angle to assist in full uptake from the vials, which are disposed on a platform 1401. There is a single square Petri dish position 1470 on the platform 1401 for the NVU 1400. In certain embodiments, this is designed with an adapter for pucks and thermally conscious layout in mind, and is all stainless steel and HDPE construction. Also, handles are bendable to facilitate lifting off flat surface.

Figure 14C:
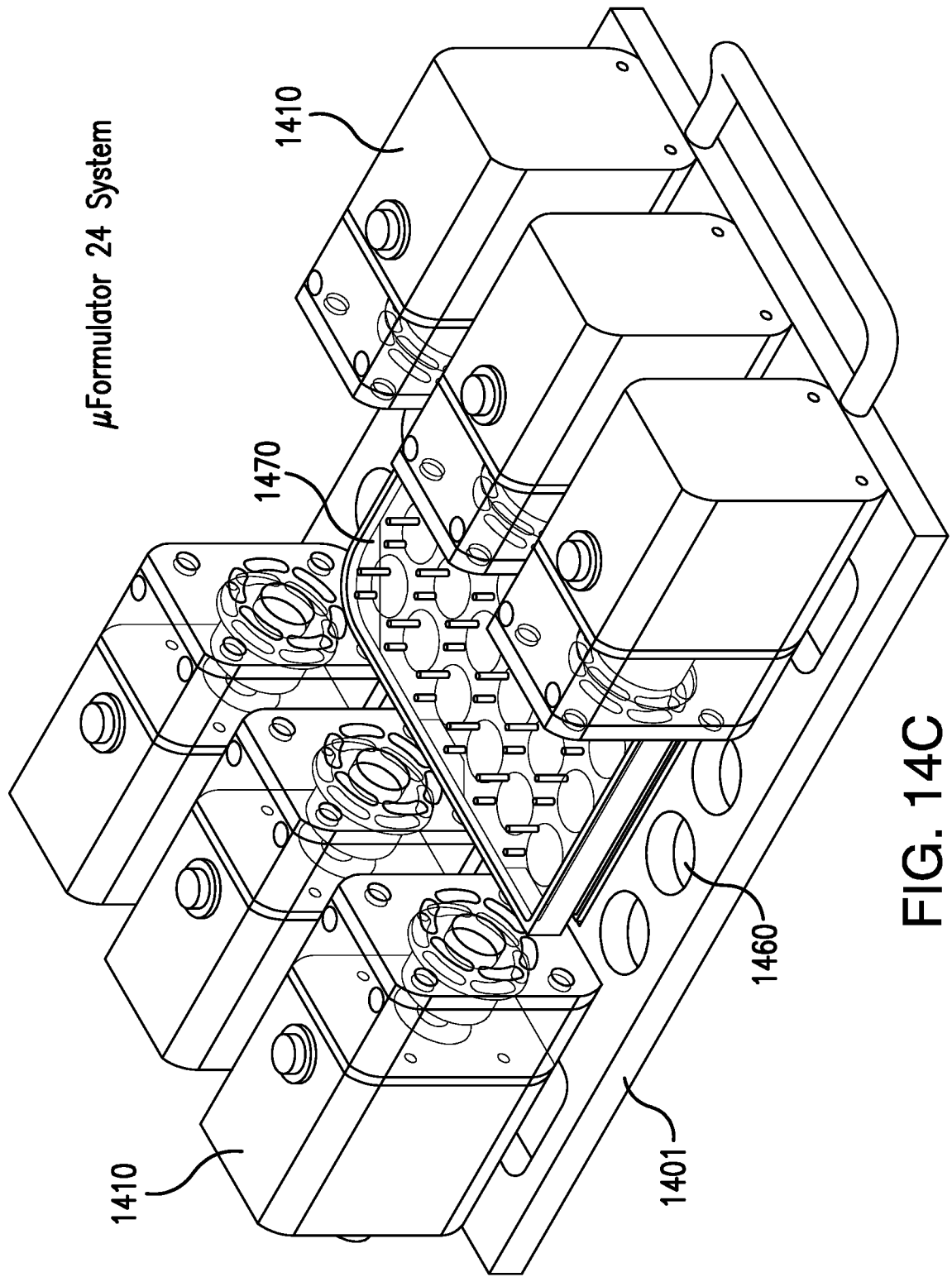
FIGS. 14C-14D show μFormulator 24 systems according to one embodiment of the invention

FIG. 14C shows a 24-well microformulator system according to one embodiment of the invention. In this exemplary embodiment, the 24-well microformulator system includes six motor positions 1410: 4 valves and 2 pumps, which works with the enclosed motor cartridge designs. The 24-well microformulator system also has six vial positions 1460, and a machined polycarbonate well plate (24 well) lid 1470 with two needles per well, clear epoxy cast in place, intubated with Tygon of matched length (not shown). All these devices and components are disposed on a platform 1401. The compact design is all stainless steel and HDPE construction, and handles are bendable to facilitate lifting off flat surface.

Figure 14D:
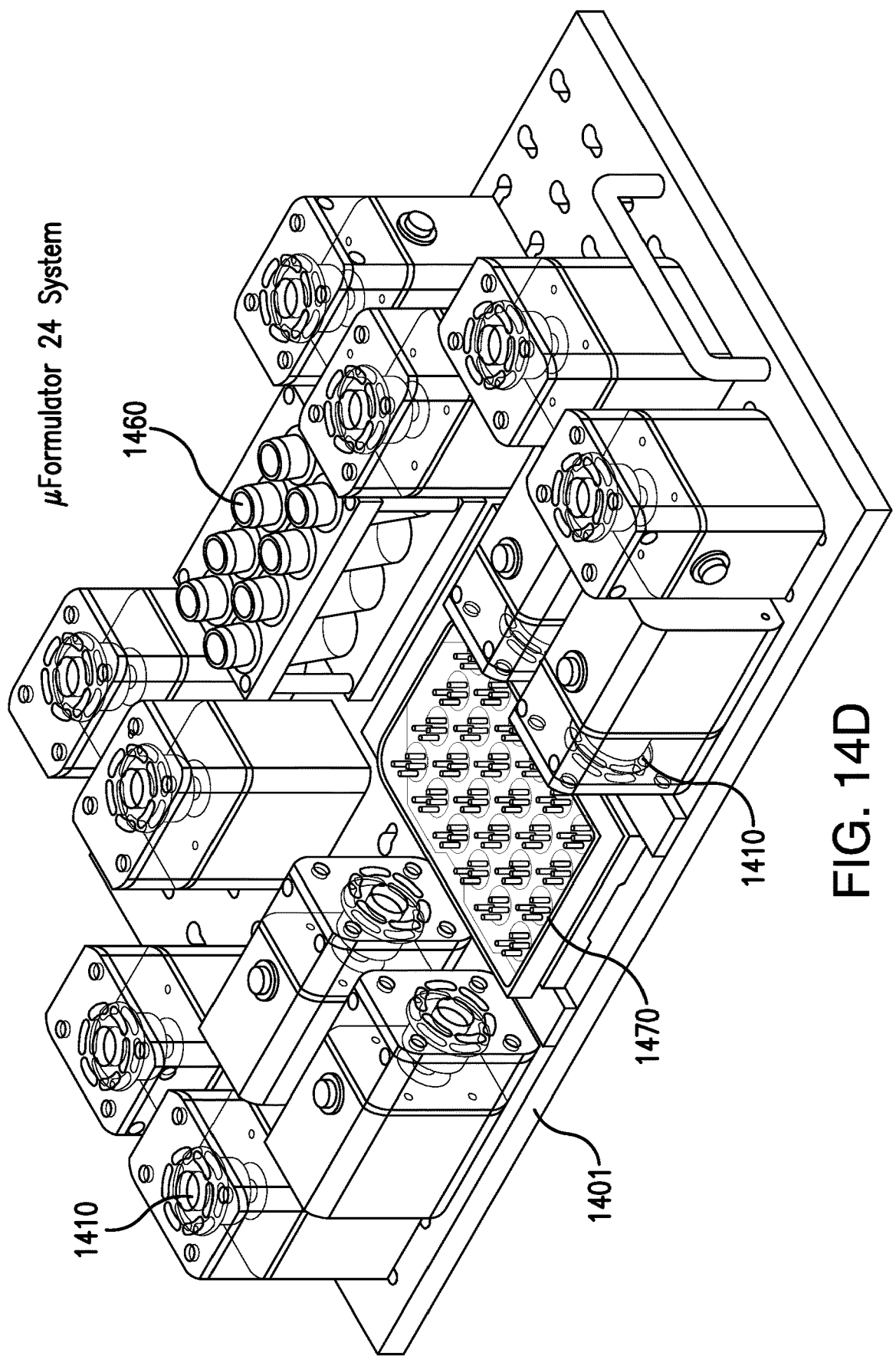

FIG. 14D shows a 24-transwell microformulator system according to one embodiment of the invention. In this exemplary embodiment, the 24-transwell microformulator system includes twelve motor positions 1410: four sets that comprise two valves and one pump; eight vial positions 1460; and a machined polycarbonate well plate lid (e.g., compatible with a 24-well HTS Transwell insert) 1470, with four needles per well—two outside and two inside transwell and clear epoxy cast in place, intubated with Tygon of matched length (not shown). All components are distributed over and attached to platform 1401. The compact design is all stainless steel and HDPE construction, and vertical handles decrease footprint but still easy to carry. Further, the 24-transwell microformulator is portable.

Figure 14E:
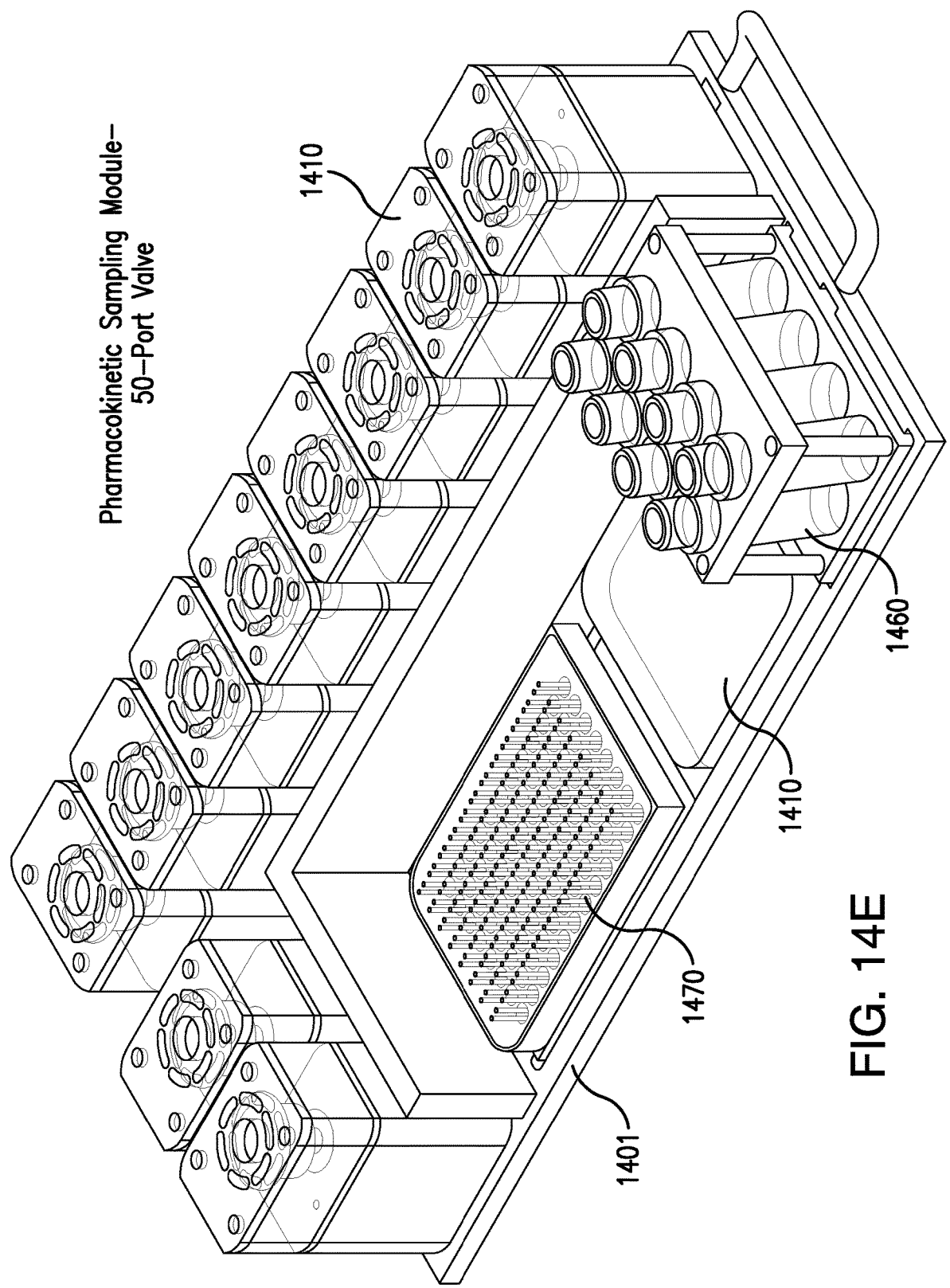

FIG. 14E shows a pharmacokinetic sampling module according to one embodiment of the invention. In certain embodiments, the pharmacokinetic sampling module is designed to deliver time-varying media to one or more NVUs in holder 1410, and the pumps and valves are configured so as to deliver samples of the bioreactor effluent to well plate 1470 at time intervals of user choosing. In one embodiment, the modules that are mounted to base 1401 are divided into three functional segments: pharmacokinetic (PK) drug delivery (leading to the NVU), the NVU, and sample collection into the well plate 1470. Tubing is not shown.

As disclosed above, the make-before-break valve allows for dynamic switching between straight and drug-containing media without causing downstream flow variation. For the PK drug delivery: fluids are drawn from vials through the make-before-break valve by the pump that leads to the NVU. For the sample collection: fluids exit the NVU under their own pressure to a pair of wells (one for the top and one for the bottom chamber of the NVU) on the well plate. This separation prevents upstream flow disturbance. From these wells the fluids are drawn up and transported to a large collection vial though two valves in series. When time comes to take a sample the flow is momentarily diverted to a sample well.

In this exemplary embodiment shown in FIG. 14E, the pharmacokinetic sampling module includes ten motor positions 1410: six valves and four pumps, eight vial positions 1460 with each vial at 10° angle to assist in full uptake from vial, and a single square Petri dish position 1410 for NVU. The pharmacokinetic sampling module is designed with an adapter for pucks. The pharmacokinetic sampling module also includes a machined polycarbonate well plate (96 well) lid 1470, with one needle per well (2 wells are passthrough hence have 2 needles), and clear epoxy cast in place, intubated with Tygon of matched length. The pharmacokinetic sampling module is all stainless steel and HDPE, with Bent handles to facilitate lifting off flat surface, a thermally conscious layout. The pharmacokinetic sampling module is also designed for multiple per incubator shelf.

Figure 14F:
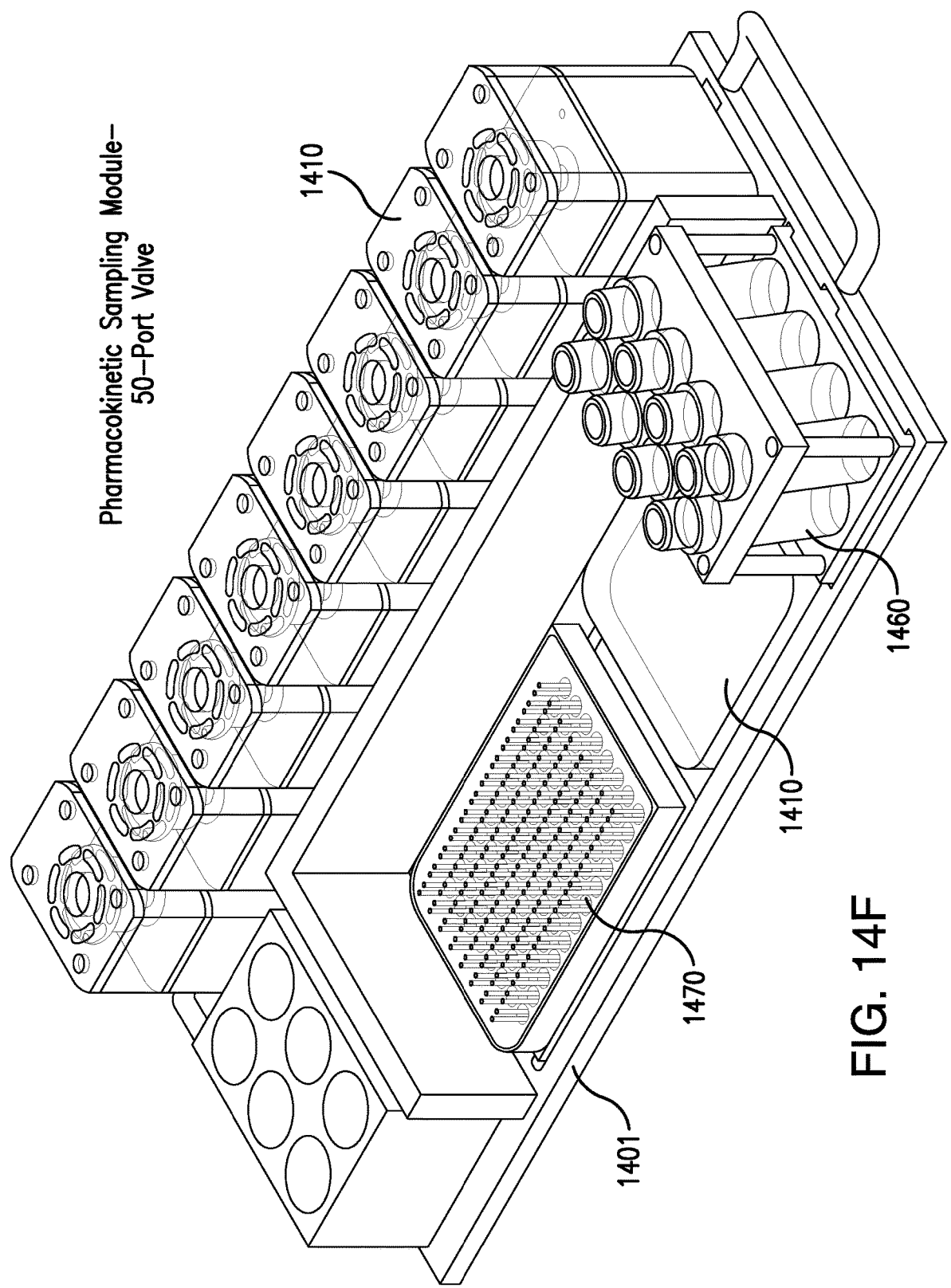

FIG. 14F shows a pharmacokinetic sampling module according to one embodiment of the invention. In certain embodiments, the pharmacokinetic sampling module—the 50-port valve is designed to have identical features to current valve option.

In this exemplary embodiment shown in FIG. 14F, the pharmacokinetic sampling module includes two fewer valves (8 motors total) 1410 by addressing sample wells with two 50-port valves instead of four 25-port ones, eight vials 1460 plus 6 Falcon tubes or other accessory, a polycarbonate lid 1470 with embedded needles. All stainless steel and HDPE design with user is in mind. Such design allows for additional space for Falcon tubes for long-run autonomous perfusion or other accessories.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A fluidic device, comprising:
a fluidic chip comprising a body having a first surface and an opposite, second surface, one or more channels formed in the body in fluidic communications with input ports and output ports for transferring one or more fluids between the input ports and the output ports, and a fluidic chip registration means formed on the first surface for aligning the fluidic chip with a support structure; and
an actuator configured to engage with the one or more channels at the second surface of the body for selectively and individually transferring the one or more fluids through the one or more channels from at least one of the input ports to at least one of the output ports at desired flowrates, such that flow directions of the one or more fluids through the one or more channels are reversible,
wherein the fluidic chip registration means is configured such that the fluidic chip is allowed for multiple fluidic chip orientations while maintaining automatic and precise mechanical alignment to the support structure.

2. The fluidic device of claim 1, further comprising a motor to operably drive the actuator to be activated or deactivated.

3. The fluidic device of claim 1, wherein the body of the fluidic chip comprises a first layer and a second layer, each layer having a first surface and an opposite, second surface, wherein the one or more channels are grooved on a first surface of the second layer, a second surface of the first layer is planar and bonded to the first surface of the second layer to seal an open side of the one or more channels in the first surface of the second layer, and the second layer is elastomeric, such that compression of the actuator on a second surface of the second layer causes at least one of the one or more channels in the second layer to be occluded, wherein the first and second surfaces of the body are coincident with the first surface of the first layer and the second surface of the second layer, respectively.

4. The fluidic device of claim 1, wherein the fluidic chip is configured such that one or more plug-in accessories are addable in or removable from the fluidic chip, wherein the one or more plug-in accessories comprise capacitors, adjustable fluidic resistors, electrical or electrochemical sensors, photosensors for detecting or tracking bubbles for either bubble detection or for determining flow rates, flowmeters, manifolds, overpressure relief (blow-off) valves, check valves, bubble traps, injection ports, bioreactors, or a combination of them.

5. A fluidic device, comprising:
a fluidic chip comprising a body having a first surface and an opposite, second surface, one or more channels formed in the body in fluidic communications with input ports and output ports for transferring one or more fluids between the input ports and the output ports, and a fluidic chip registration means formed on the first surface for aligning the fluidic chip with a support structure; and
an actuator configured to engage with the one or more channels at the second surface of the body for selectively and individually transferring the one or more fluids through the one or more channels from at least one of the input ports to at least one of the output ports at desired flowrates,
wherein the fluidic chip registration means comprises at least one protrusion that is protruded from the first surface of the body.

6. The fluidic device of claim 5, wherein the fluidic chip registration means is configured such that the fluidic chip is allowed for multiple fluidic chip orientations while maintaining automatic and precise mechanical alignment to the support structure.

7. The fluidic device of claim 5, wherein the least one protrusion is configured to fluidically communicate the one or more channels with interface ports that allow connection of external tubing to the fluidic chip through a base plate.

8. A fluidic device, comprising:
a fluidic chip comprising a body having a first surface and an opposite, second surface, one or more channels formed in the body in fluidic communications with input ports and output ports for transferring one or more fluids between the input ports and the output ports, and a fluidic chip registration means formed on the first surface for aligning the fluidic chip with a support structure; and an actuator configured to engage with the one or more channels at the second surface of the body for selectively and individually transferring the one or more fluids through the one or more channels from at least one of the input ports to at least one of the output ports at desired flowrates, wherein the fluidic chip is a circular through-plate fluidic chip.

9. The fluidic device of claim 8, being a rotary planar valve (RPV) comprising a multi-channel valve, a manifold valve, or a multi-throw valve.

10. The fluidic device of claim 9, wherein each of the one or more channels comprises one or more sub-channels connected to one or more input ports and one or more outputs, wherein all the sub-channels of the one or more channels are spaced-apart in the radial channel configuration.

11. The fluidic device of claim 10, wherein the actuator comprises
a cage defining a plurality of spaced-apart openings;
a plurality of pop-up members, each pop-up member retained in a respective opening of the cage and being vertically movable therein; and
a drivehead having a surface and at least one recess formed on the surface,
wherein the cage is placed on the second surface of the fluidic chip to constrain each pop-up member in a position immediately on a respective sub-channel, such that when a pop-up member is pressed into the second surface of the fluidic chip, a sub-channel that is immediately on the pop-up member is compressed, otherwise, said sub-channel is uncompressed; and
wherein the drivehead is rotatably engaged with the cage such that as the drivehead rotates at a position, any selected pop-up members positioned in the at least one recess arise to create open sub-channels corresponding to the selected pop-up members, thereby selectively unoccluding or occluding fluid flows through desired sub-channels.

12. The fluidic device of claim 11, wherein the at least one recess comprises a plurality of tangential ovoid recesses.

13. The fluidic device of claim 12, wherein the plurality of tangential ovoid recesses is configured to ensure that there is no "off" position for the plurality of pop-up members while switching from one input port to another input port where both input sub-channels connected to said two input ports are closed at the same time.

14. The fluidic device of claim 11, wherein the fluidic chip and the actuator are configured such that there are actuated balls that open and close channels upon which they reside, unactuated balls underneath which channels are always closed, and absent balls underneath which channels are always open, thereby partitioning the valve into a plurality of independent fluid-containing regions separated by the unactuated balls, each region having its own inlet/outlet ports, a group of channels, and actuated balls such that by a selection of the actuated balls, flows to or from the ports within said region are dynamically controllable, which allowing a plurality of isolated fluidic circuits to exist on a single chip.

15. A fluidic device, comprising:
a fluidic chip comprising a body having a first surface and an opposite, second surface, one or more channels formed in the body in fluidic communications with input ports and output ports for transferring one or more fluids between the input ports and the output ports, and a fluidic chip registration means formed on the first surface for aligning the fluidic chip with a support structure; and
an actuator configured to engage with the one or more channels at the second surface of the body for selectively and individually transferring the one or more fluids through the one or more channels from at least one of the input ports to at least one of the output ports at desired flowrates,
wherein the actuator comprises a plurality of rolling members and a driving member configured such that when the driving member rotates, the plurality of rolling members rolls along the one or more channels so as to selectively and individually transferring the one or more fluids through the one or more channels at the desired flowrates.

16. The fluidic device of claim 15, being a capacitive pump, wherein the one or more channels comprise one channel having a middle, circumferential portion with two end portions, each end portion being coupled to a port through a chamber or a bubble trap, wherein the chamber or bubble trap operably function as capacitor to reduce flow and pressure transients associated with the rolling members of the actuator rolling on or off said channel.

17. The fluidic device of claim 16, wherein the capacitor is a shunt capacitor, or a bubble trap capacitor.

18. The fluidic device of claim 16, wherein the two chambers are identical to or different from one another, and are in any one of geometric shapes.

19. The fluidic device of claim 16, wherein the fluidic chip further comprises a ridge formed on the second surface of the body in relation to said channel for allowing the actuator to gradually engage and disengage with said channel and a working fluid to prevent backflow and reducing pulsatility.

20. The fluidic device of claim 19, wherein the ridge is ramps with angles for a start and an end of the ramp formed at each end of the ridge for eliminating backflow and stopping flow as the rolling members enter and leave the ridge.

* * * * *

UNITED STATES PATENT AND TRADEMARK OFFICE
CERTIFICATE OF CORRECTION

PATENT NO. : 11,465,144 B2
APPLICATION NO. : 17/269349
DATED : October 11, 2022
INVENTOR(S) : David K. Schaffer et al.

It is certified that error appears in the above-identified patent and that said Letters Patent is hereby corrected as shown below:

In the Specification

Column 2, Lines 27-38:
Reading "This invention was made with government support under Grant Nos. 5UG3TR002097-02, U01CA202229 and HHSN271201700044C awarded by the National Institutes of Health, Grant No. 83573601 awarded by the U. S. Environmental Protection Agency, Grant No. 2017-17081500003 awarded by the Intelligence Advanced Research Projects Activity, and Grant No. CBMXCEL-XL1-2-001 awarded by the Defense Threat Reduction Agency through Subcontract 468746 by Los Alamos National Laboratory (LANL). The government has certain rights in the invention."

Should read as follows:
-- This invention was made with government support under Grant Nos. TR002097, CA202229 and HHSN271201700044C awarded by the National Institutes of Health, Grant No. 83573601 awarded by the U. S. Environmental Protection Agency, Grant No. 2017-17081500003 awarded by the Intelligence Advanced Research Projects Activity, and Grant No. CBMXCEL-XL1-2-001 awarded by the Defense Threat Reduction Agency through Subcontract 468746 by Los Alamos National Laboratory (LANL). The government has certain rights in the invention. --

Signed and Sealed this
Fifteenth Day of October, 2024

Katherine Kelly Vidal
*Director of the United States Patent and Trademark Office*